US009463924B1

(12) United States Patent
Volin

(10) Patent No.: US 9,463,924 B1
(45) Date of Patent: Oct. 11, 2016

(54) UNIQUE BIODEGRADABLE EIGHT-STACKED-REINFORCED-HANDLE BAG, HAVING EIGHT STACKED-REINFORCED HANDLES, MULTIPLE TRIPLE-LOCKING LATCHES, MULTIPLE TRIPLE-LOCKING BRACES, MULTIPLE QUADRUPLE-LOCKING WALLS, AND MULTIPLE DOUBLE-LOCKING DOORS

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 0 days.

(21) Appl. No.: 14/708,265

(22) Filed: May 10, 2015

Related U.S. Application Data

(60) Provisional application No. 62/138,378, filed on Mar. 25, 2015.

(51) Int. Cl.
*B65D 30/02* (2006.01)
*B65F 1/00* (2006.01)
*B65D 33/16* (2006.01)
(Continued)

(52) U.S. Cl.
CPC ......... *B65F 1/0006* (2013.01); *B65D 33/1691* (2013.01); *B65D 33/243* (2013.01); *B65D 5/0254* (2013.01); *B65F 2240/138* (2013.01); *B65F 2250/105* (2013.01)

(58) Field of Classification Search
CPC ............ B65D 5/0005; B65D 5/46096; B65D 5/0254; B65D 5/2057; B65D 5/10; B65D 33/24; B65D 33/243; B65D 33/246; B65F 1/0006; B65F 2220/106
USPC ................ 383/1, 15, 9, 10, 98, 99; 229/150, 229/155–158, 138, 117.13–117.15
See application file for complete search history.

(56) References Cited

U.S. PATENT DOCUMENTS 1,410,404 A    3/1922 Haines
1,415,450 A    5/1922 Johnson
(Continued)

FOREIGN PATENT DOCUMENTS

FR    2676989 A1 * 12/1992   ............ B65B 61/14

OTHER PUBLICATIONS

Machine translation of the written description of FR 2676989 A1. Translated on Jan. 12, 2016.*

*Primary Examiner* — Jes F Pascua

(57) ABSTRACT

A unique eight-stacked-reinforced-handle eight-stacked-and-reinforced-latch biodegradable bag comprises top sections, body sections attached to the top sections, and bottom sections attached to the body sections, respectively. The bottom sections are attached together. The unique eight-stacked-reinforced-handle eight-stacked-and-reinforced-latch biodegradable bag has a plurality of openings mechanically punched in the top sections, to form eight handles and two locking braces next to the openings, to form eight locking latches and two locking doors inside the openings, and to form eight locking walls around the openings, respectively. The top sections are folded to stack and reinforce the eight handles, the eight locking latches, the two locking doors, the two locking braces, and the eight locking walls, respectively. The eight locking latches are pushed through the openings to lock together the eight handles, the eight locking latches, the two locking doors, the two locking braces, and the eight locking walls, and to lock together the top sections, respectively, to seal the unique eight-stacked-reinforced-handle eight-stacked-and-reinforced-latch biodegradable bag, securely.

7 Claims, 41 Drawing Sheets

(51) Int. Cl.
   *B65D 33/24*   (2006.01)
   *B65D 5/02*    (2006.01)

(56) References Cited

U.S. PATENT DOCUMENTS

| | | | |
|---|---|---|---|
| 1,701,097 A | | 2/1929 | Broderick |
| 1,951,011 A | | 3/1934 | Falk |
| 1,965,503 A | * | 7/1934 | Lowman ............ B65D 5/0263 206/167 |
| 1,973,956 A | | 9/1934 | Hickman |
| 2,020,804 A | | 11/1935 | Segal |
| 2,098,258 A | | 11/1937 | Rowe |
| 2,188,039 A | | 1/1940 | Farmer |
| 2,191,723 A | | 2/1940 | Mulnix |
| 2,650,016 A | | 8/1953 | McMillan |
| 2,663,491 A | * | 12/1953 | Irving ............... B65D 5/10 229/117.16 |
| 2,756,922 A | * | 7/1956 | Adams ............. B65D 33/243 229/84 |
| 2,781,161 A | * | 2/1957 | Adams ............. B65D 33/243 383/10 |
| 2,992,768 A | * | 7/1961 | Gatward .............. B65D 33/12 229/117.09 |
| 3,129,848 A | | 4/1964 | Canno |
| 3,244,355 A | * | 4/1966 | Nolen ............... B65D 5/10 229/157 |
| 3,358,903 A | | 12/1967 | De Stefano Etal |
| 3,361,333 A | | 1/1968 | Stuart |
| 3,442,437 A | | 5/1969 | Mann |
| 3,682,372 A | | 8/1972 | Rodley |
| 3,690,221 A | | 9/1972 | Schmeddling |
| 3,938,731 A | * | 2/1976 | Ross, Jr. ............ B30B 9/3053 229/117.16 |
| 4,243,171 A | | 1/1981 | Prin |
| 4,412,645 A | | 11/1983 | Lepisto |
| 4,524,459 A | | 6/1985 | Titchenal |
| 4,561,107 A | | 12/1985 | Herder |
| 4,966,286 A | | 10/1990 | Muckenfuhs |
| 5,080,253 A | | 1/1992 | Zieke |
| 5,104,235 A | | 4/1992 | Bronstrup |
| 5,393,022 A | | 2/1995 | Palumbo |
| 5,580,173 A | | 12/1996 | Sebastian |
| 5,758,971 A | * | 6/1998 | Goglio ............... B65D 31/10 383/10 |
| 5,760,118 A | | 6/1998 | Sinclair |
| 5,779,049 A | * | 7/1998 | Werby ............... B65D 5/326 206/449 |
| 5,882,117 A | | 3/1999 | Laffon |
| 5,975,411 A | * | 11/1999 | Windolph, III ...... B65D 5/0005 229/101 |
| 6,007,246 A | | 12/1999 | Kinigakis |
| 6,053,635 A | | 4/2000 | Anderson |
| 6,164,826 A | | 12/2000 | Petkovsek |
| 6,237,840 B1 | * | 5/2001 | Grabowski ............ B65D 5/16 229/117.16 |
| 6,302,320 B1 | * | 10/2001 | Stout ............... B65D 5/46192 229/117.13 |
| 6,481,183 B1 | | 11/2002 | Schmidt |
| 6,810,651 B1 | | 11/2004 | Washington |
| 6,960,374 B1 | | 11/2005 | Terada |
| 6,984,426 B2 | | 1/2006 | Miksic |
| 7,011,448 B2 | | 3/2006 | Olin |
| 7,237,753 B2 | | 7/2007 | Metcalfe |
| 7,625,026 B2 | | 12/2009 | Lau |
| 7,958,920 B1 | | 6/2011 | Olsson |
| 7,976,083 B2 | | 7/2011 | Black |
| 8,449,185 B1 | | 5/2013 | Koon |
| 8,579,184 B2 | * | 11/2013 | Pettersson ............ B65D 5/4608 229/117.13 |
| 8,747,971 B2 | | 6/2014 | Bastioli |
| 8,850,778 B2 | | 10/2014 | Jansen |
| 8,882,060 B2 | | 11/2014 | Vaughn |
| 8,919,836 B2 | | 12/2014 | Joseph-De Saram |
| 8,925,984 B2 | | 1/2015 | Joseph-De Saram |
| 8,992,085 B2 | | 3/2015 | Olin |
| 2003/0106895 A1 | | 6/2003 | Kalal |
| 2006/0273143 A1 | * | 12/2006 | Finch ............... B65D 5/0005 229/117.01 |
| 2006/0279097 A1 | | 12/2006 | Jones |
| 2008/0181538 A1 | * | 7/2008 | Shaw ............... B65D 33/34 383/5 |

\* cited by examiner

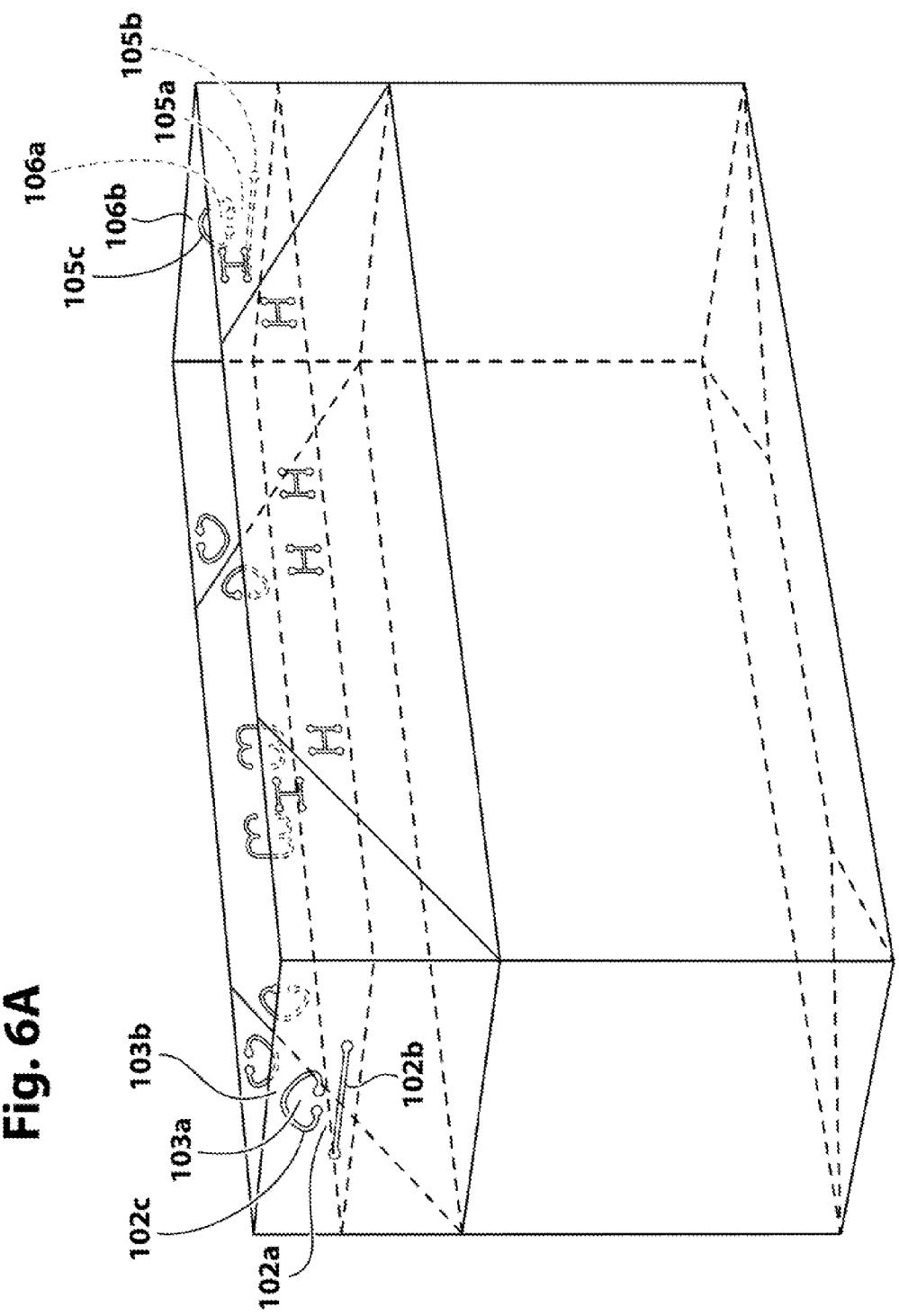

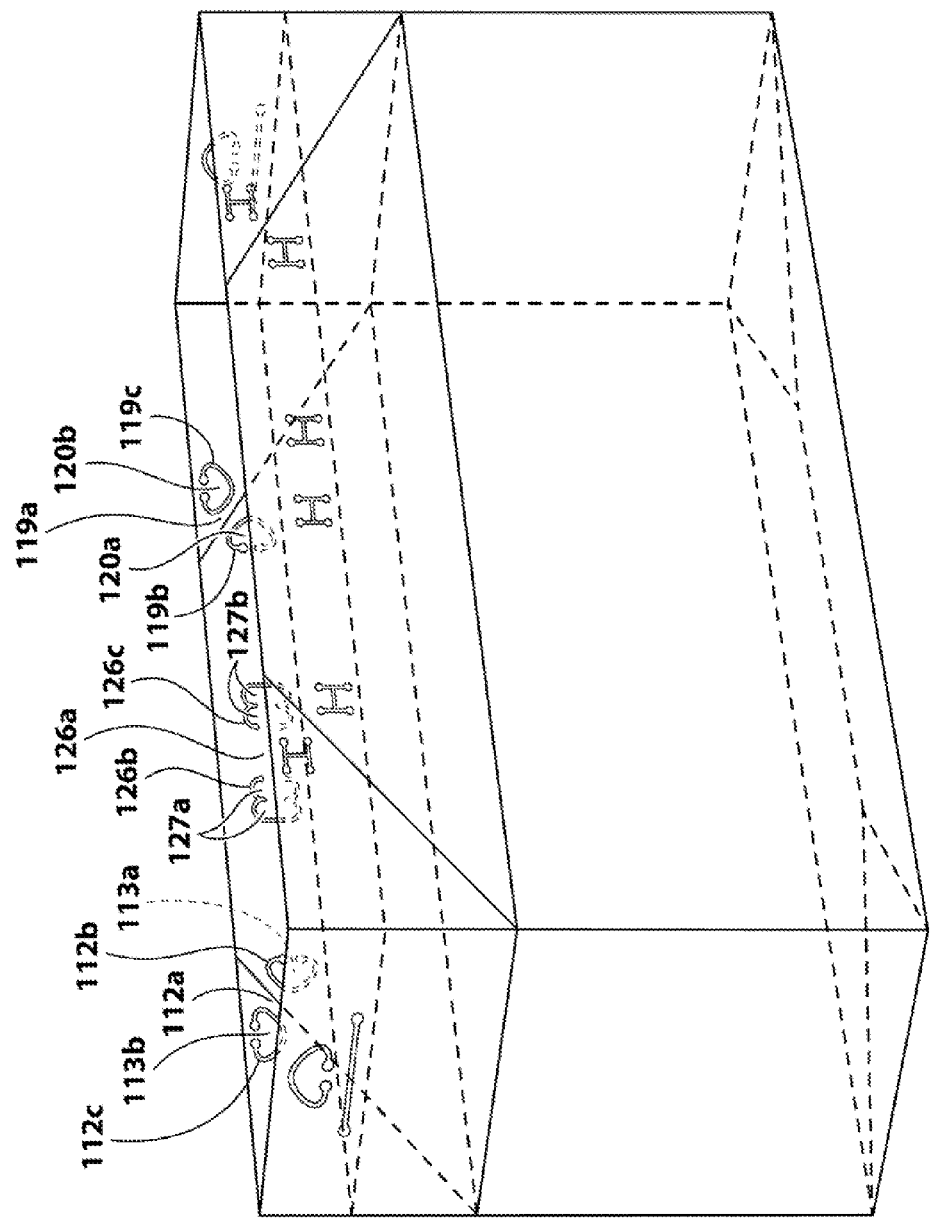

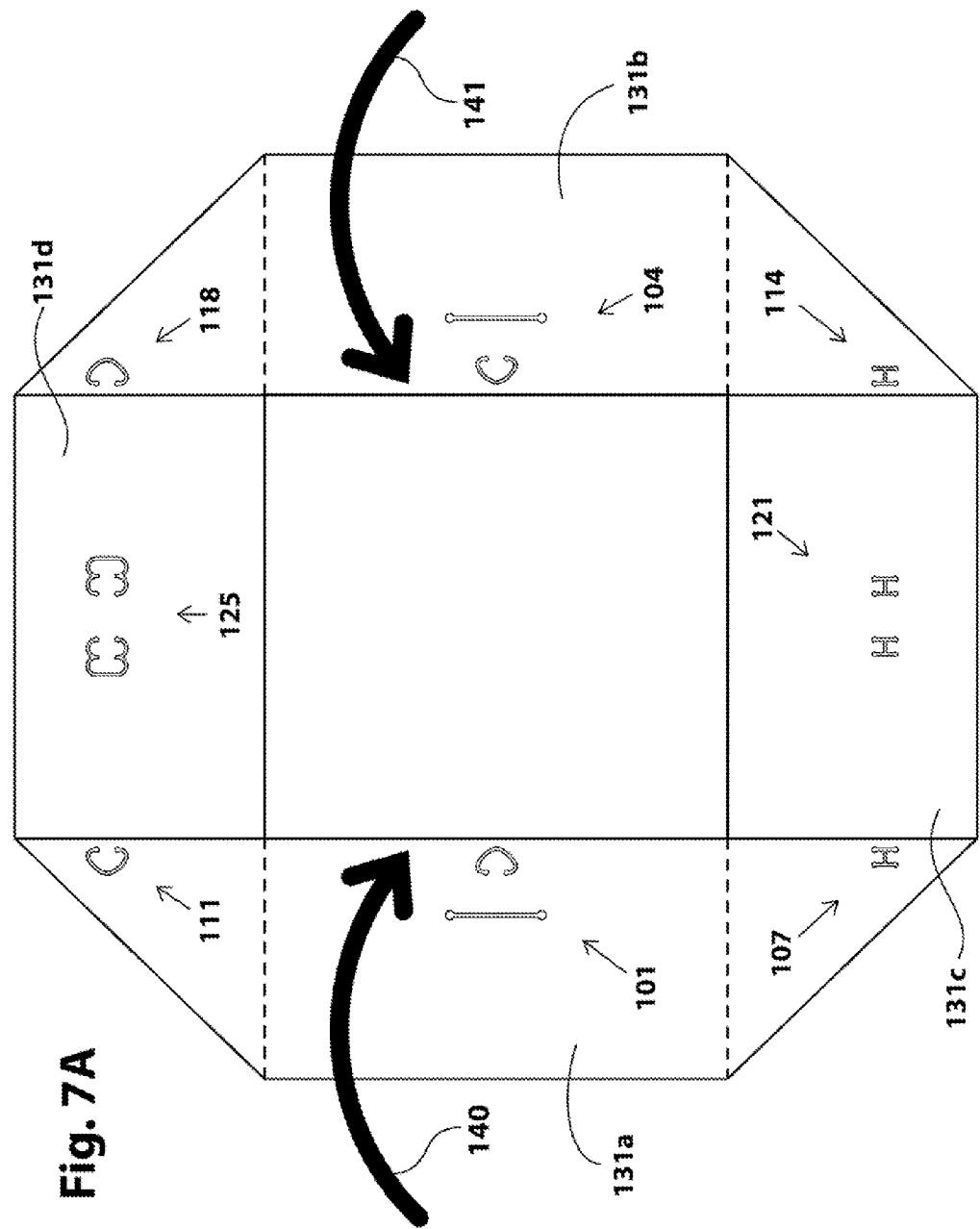

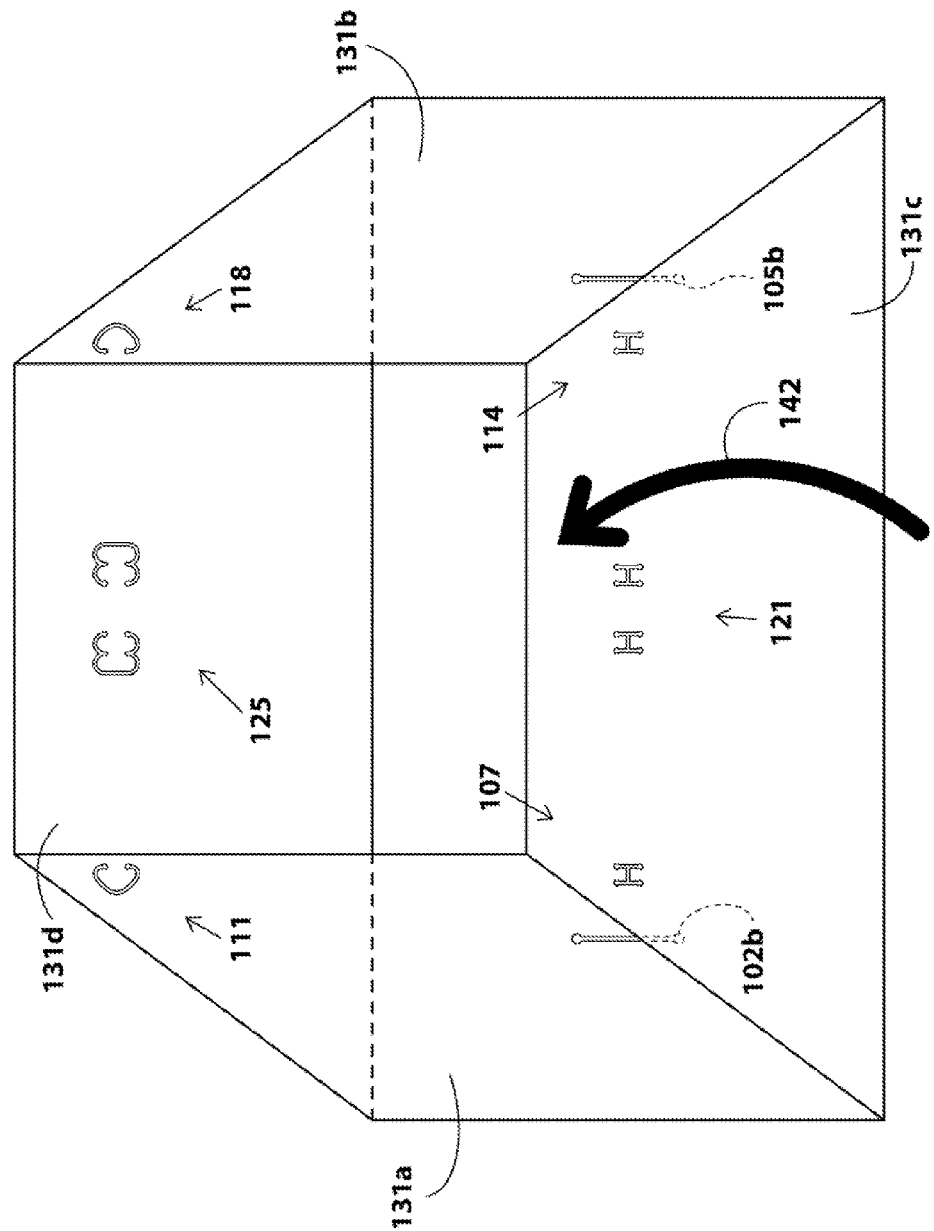

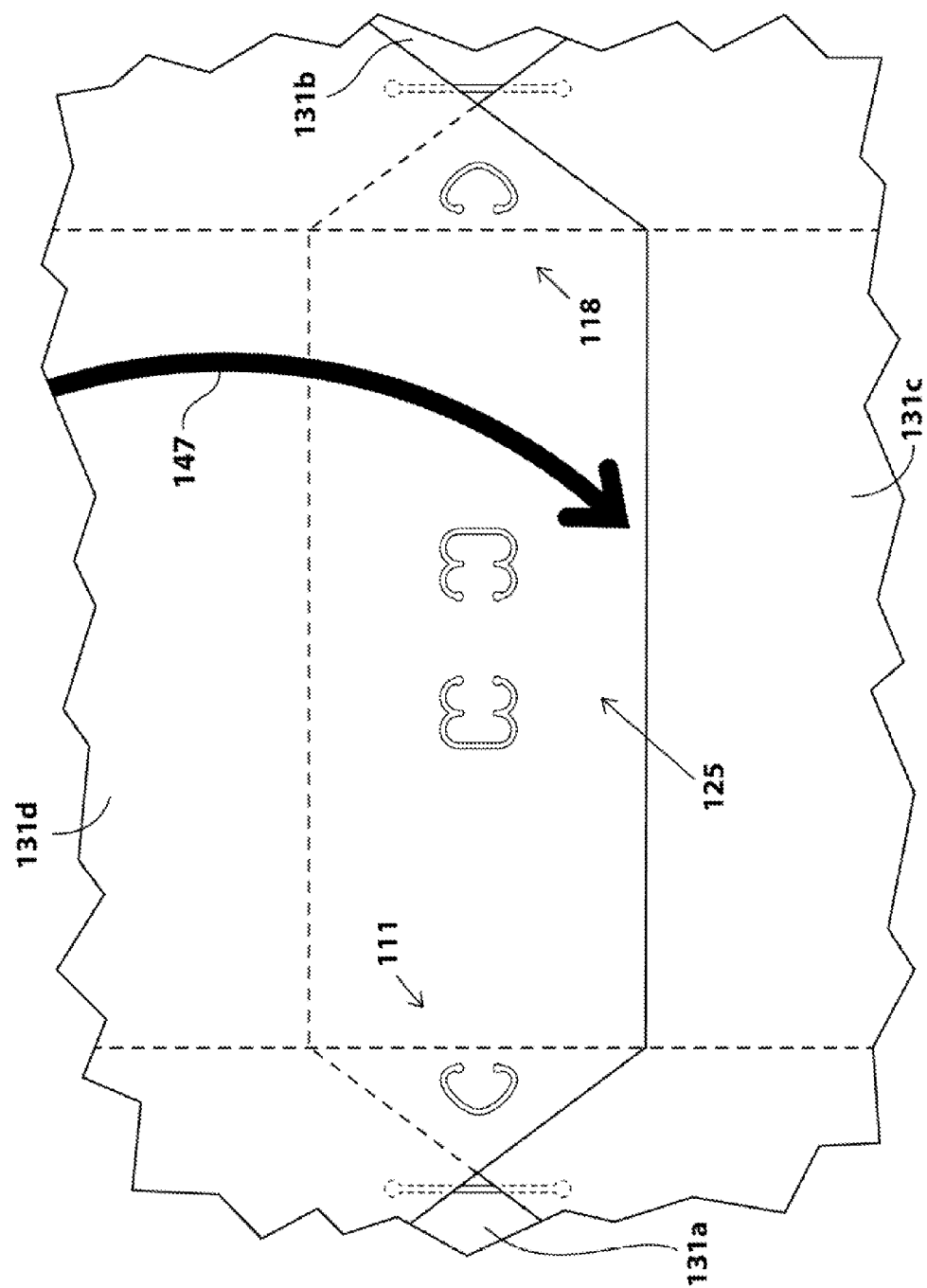

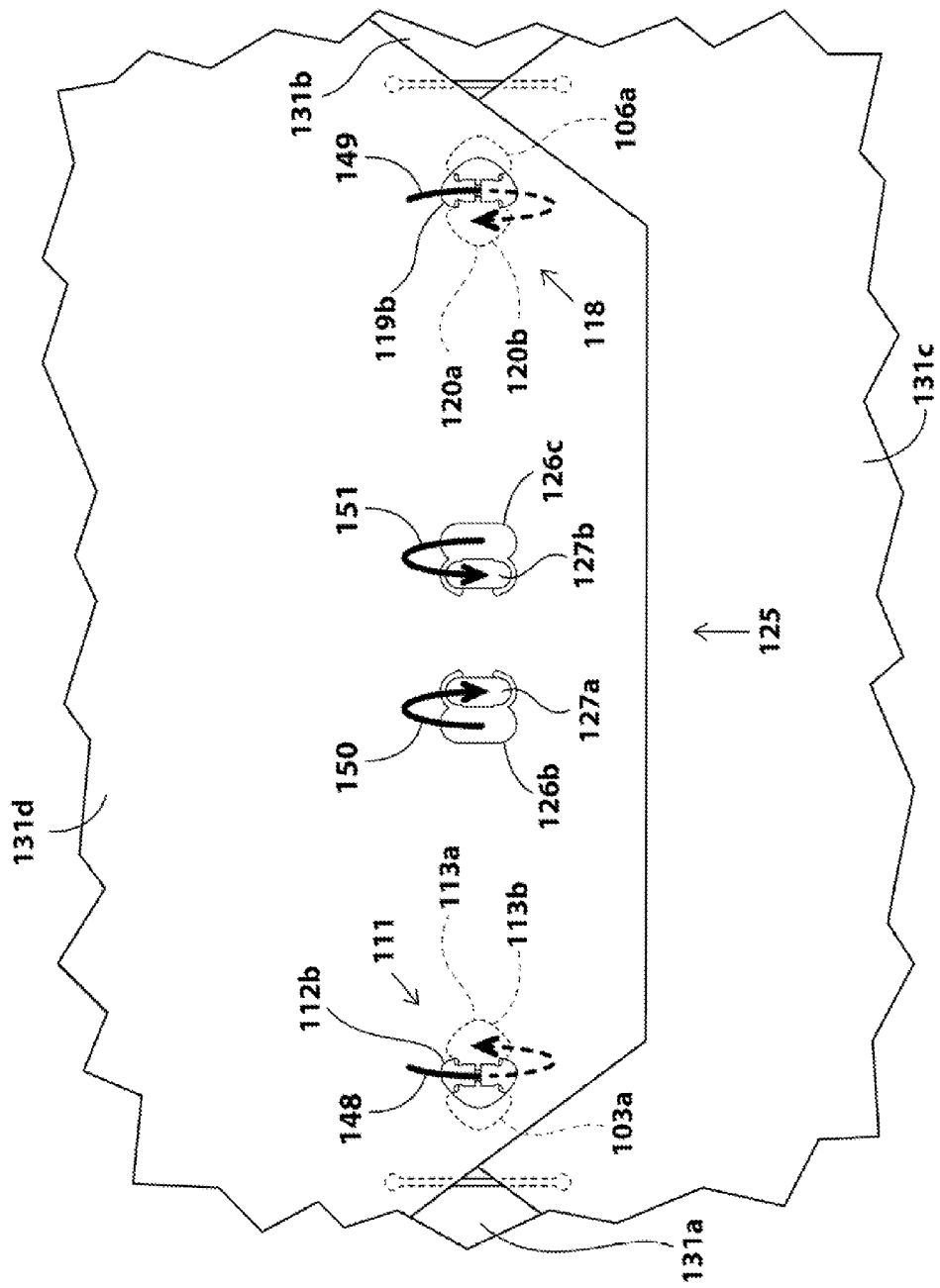

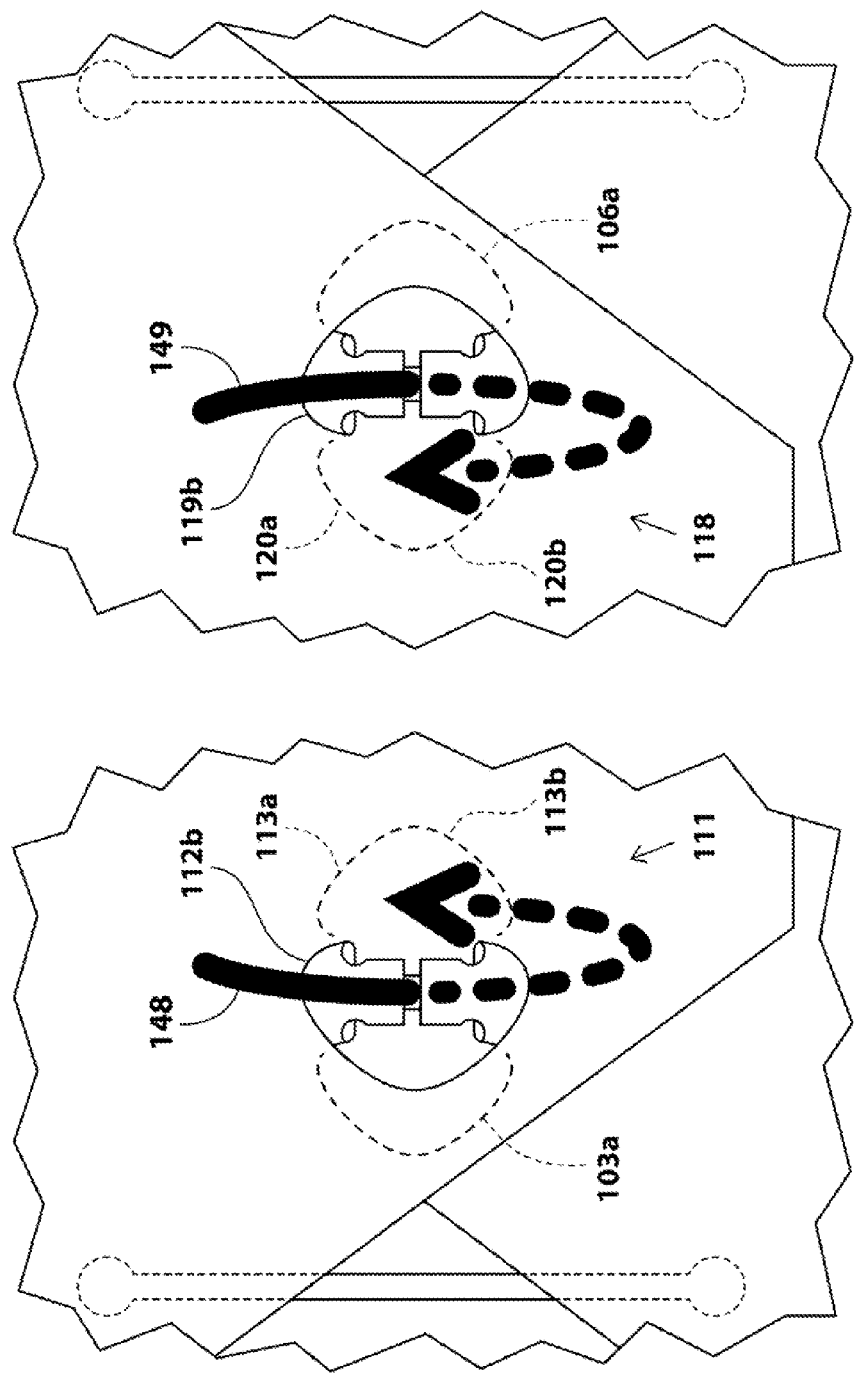

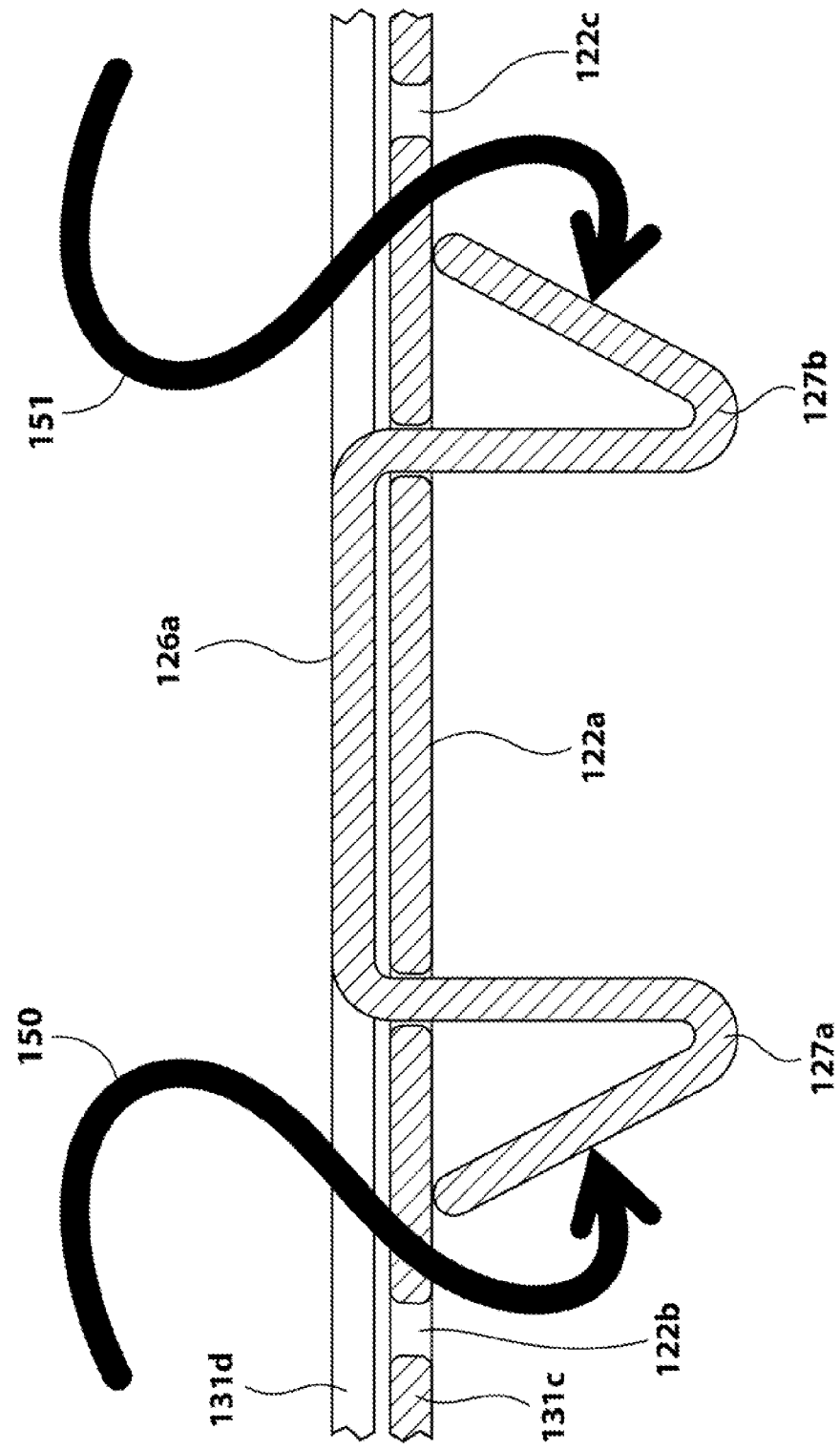

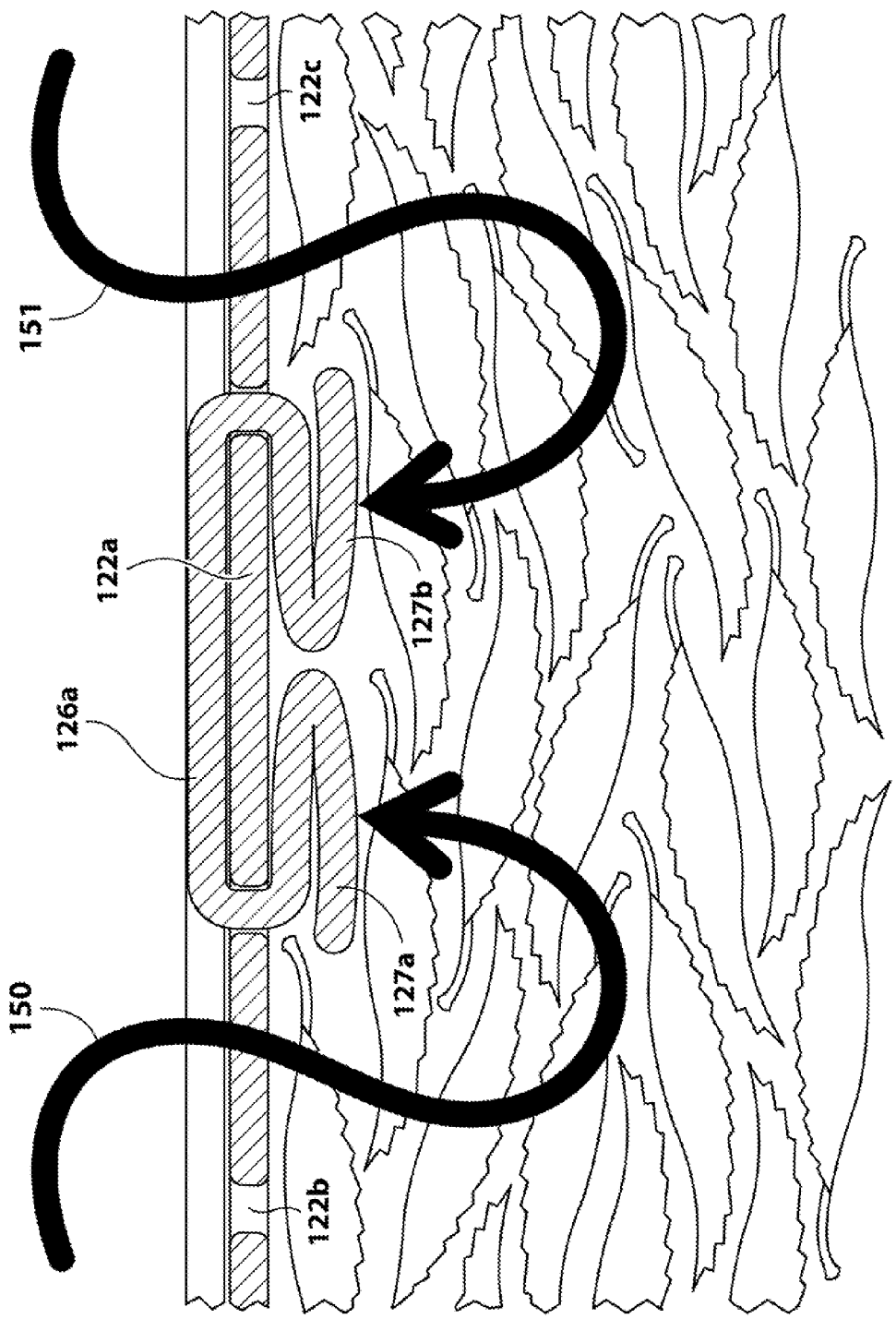

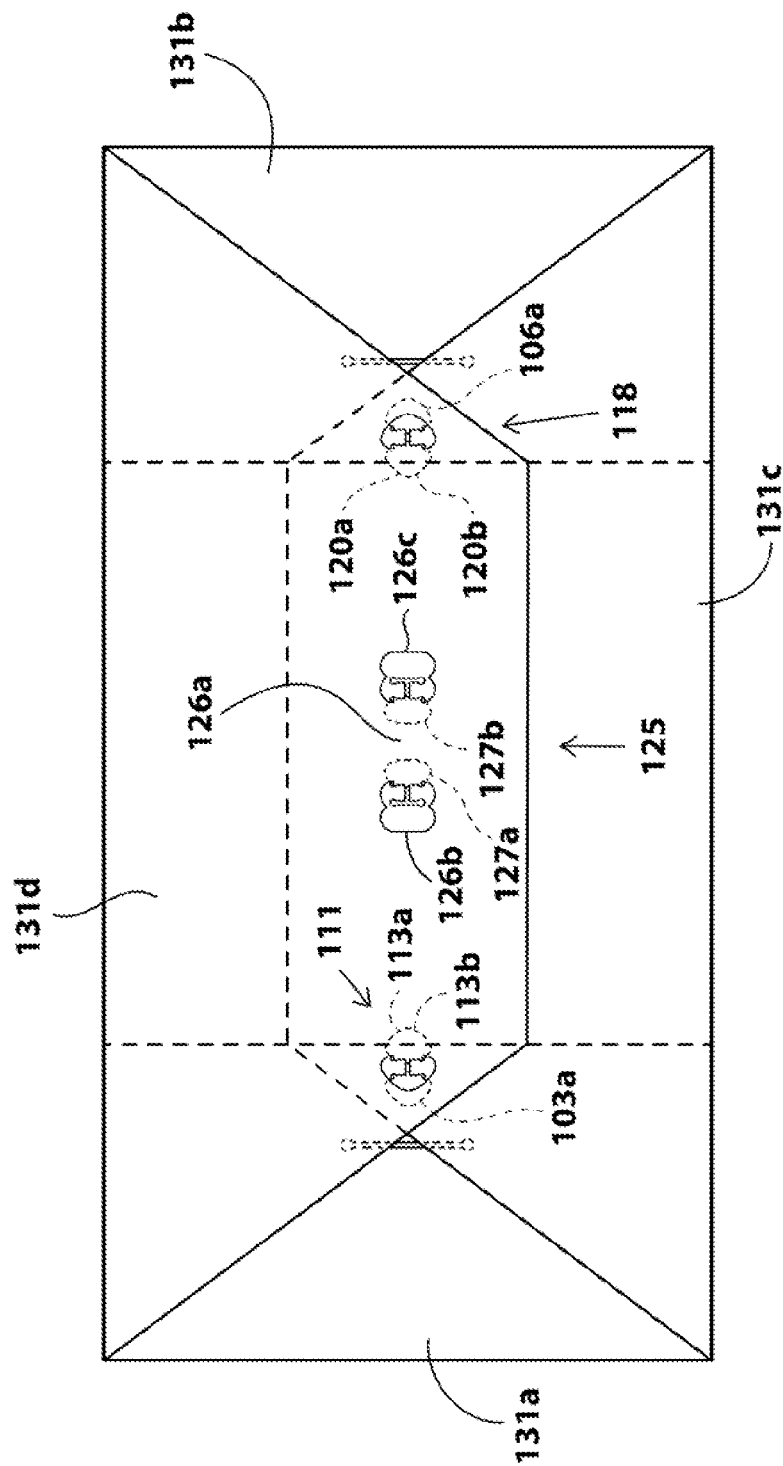

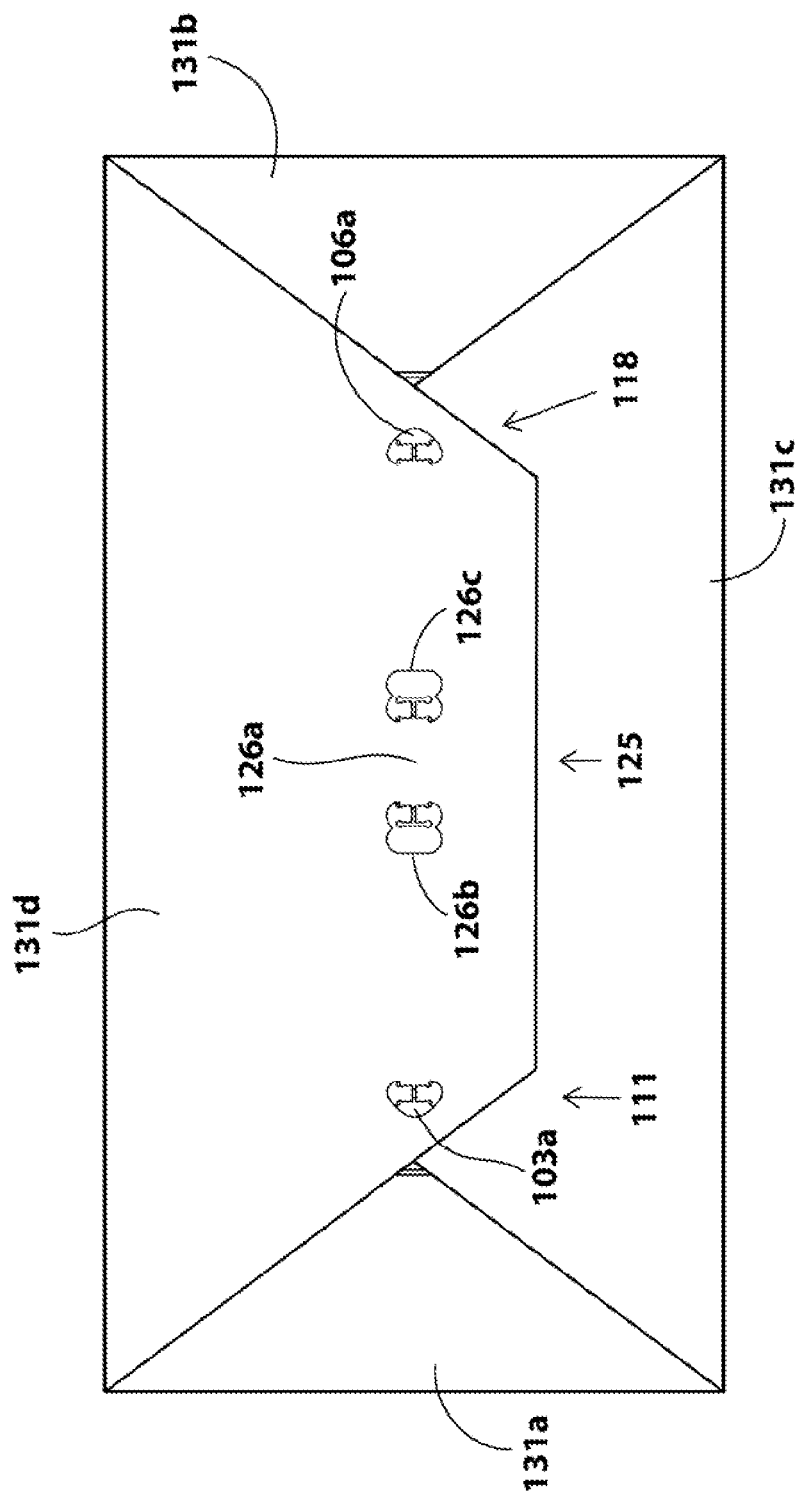

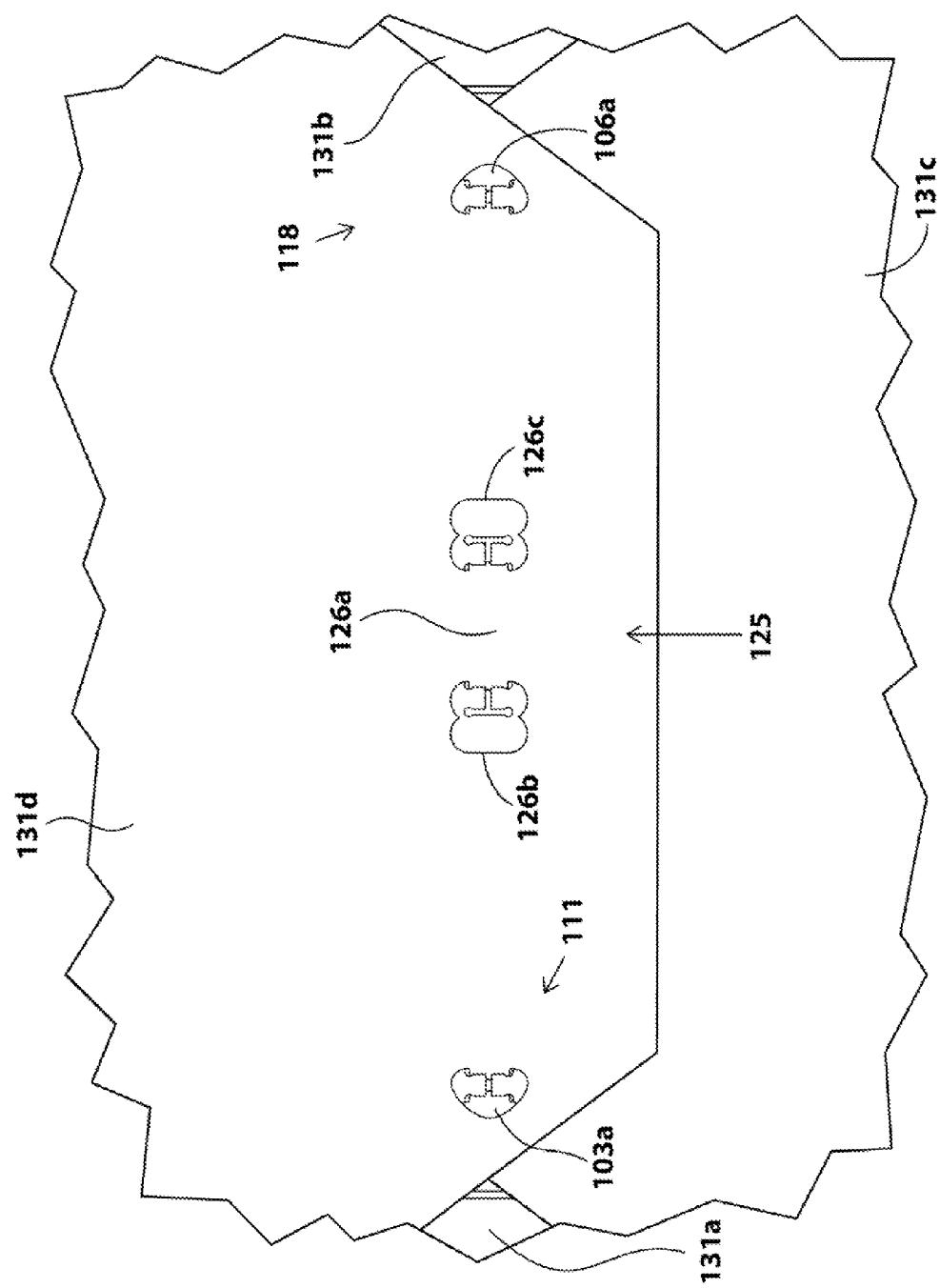

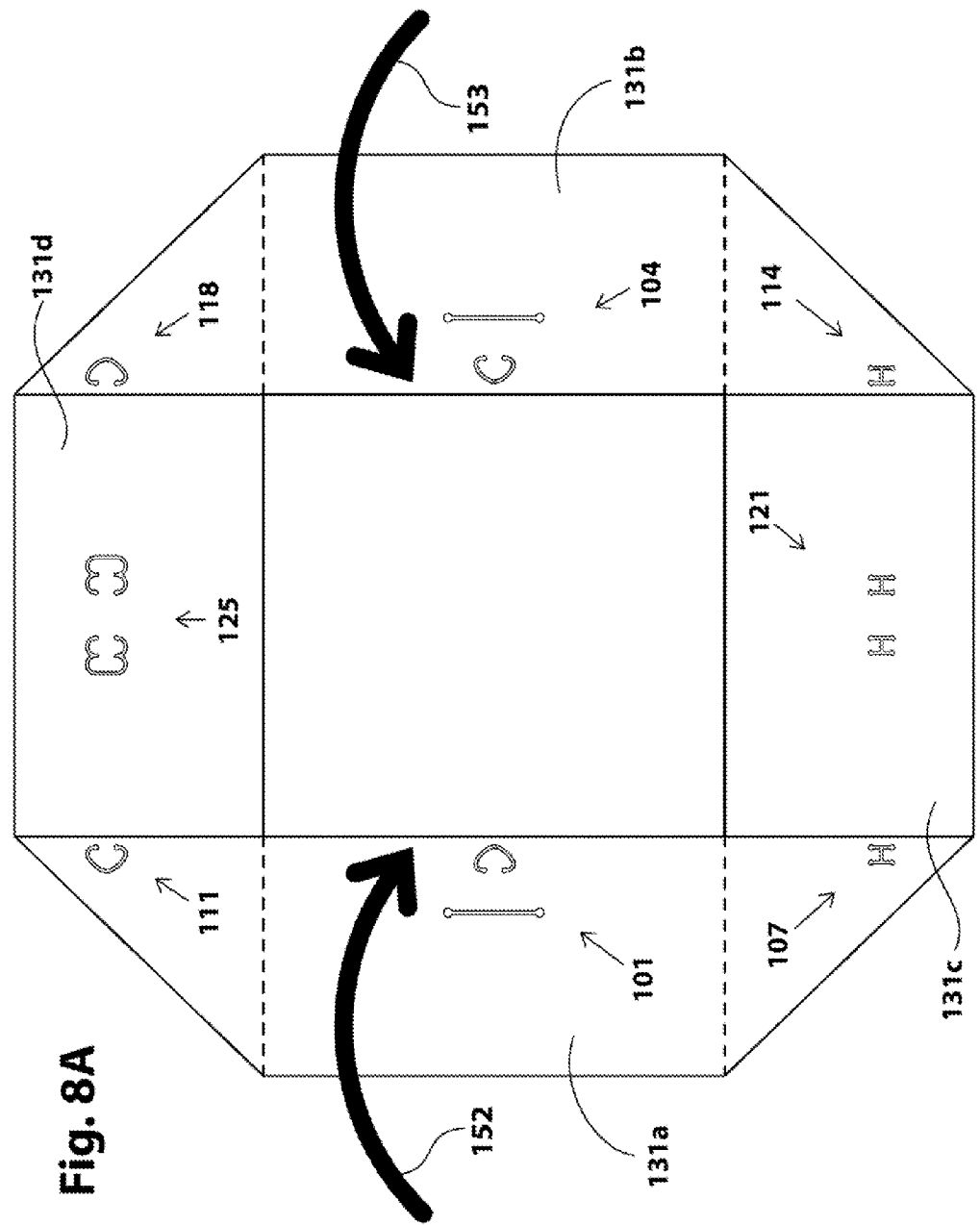

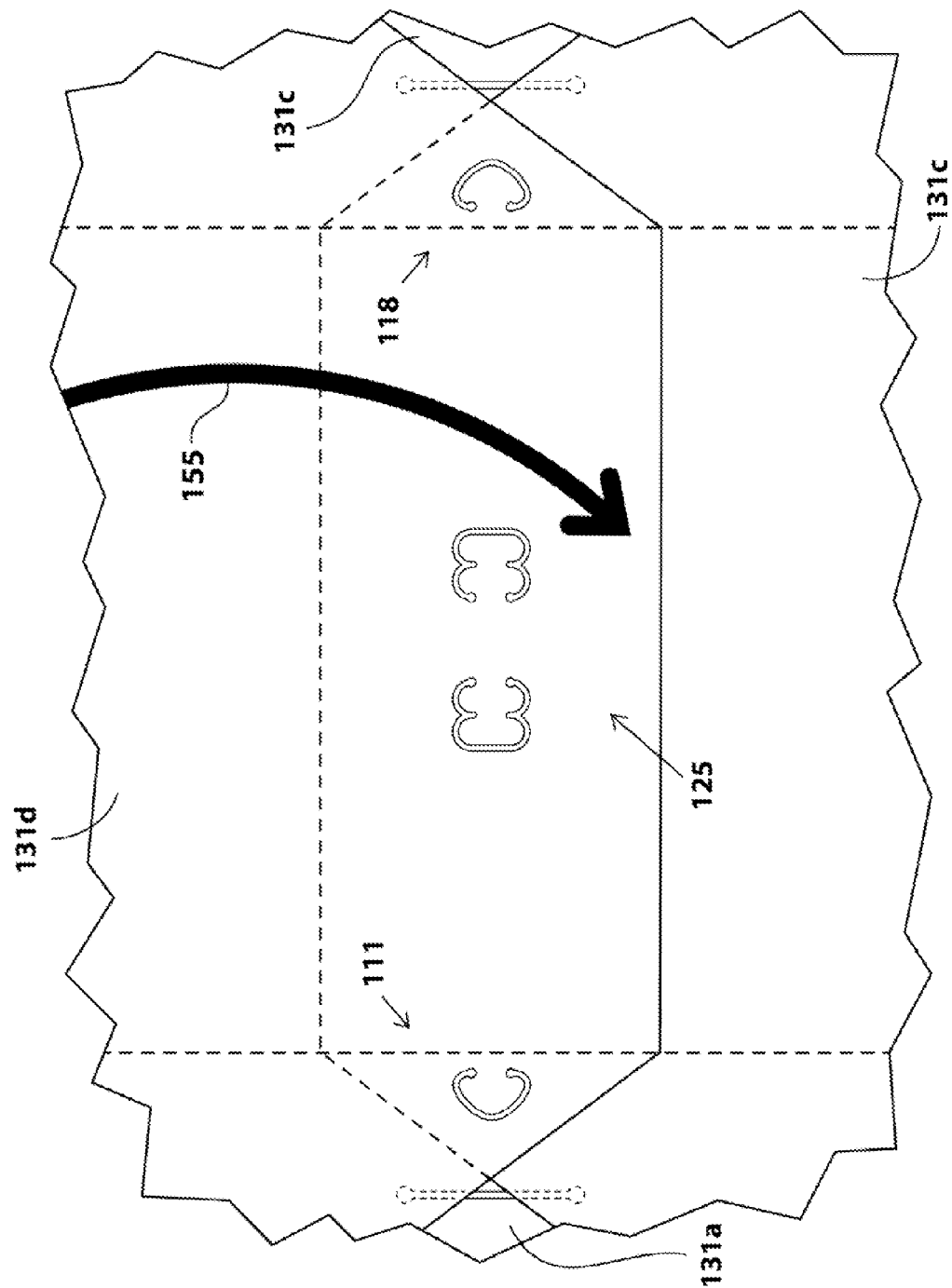

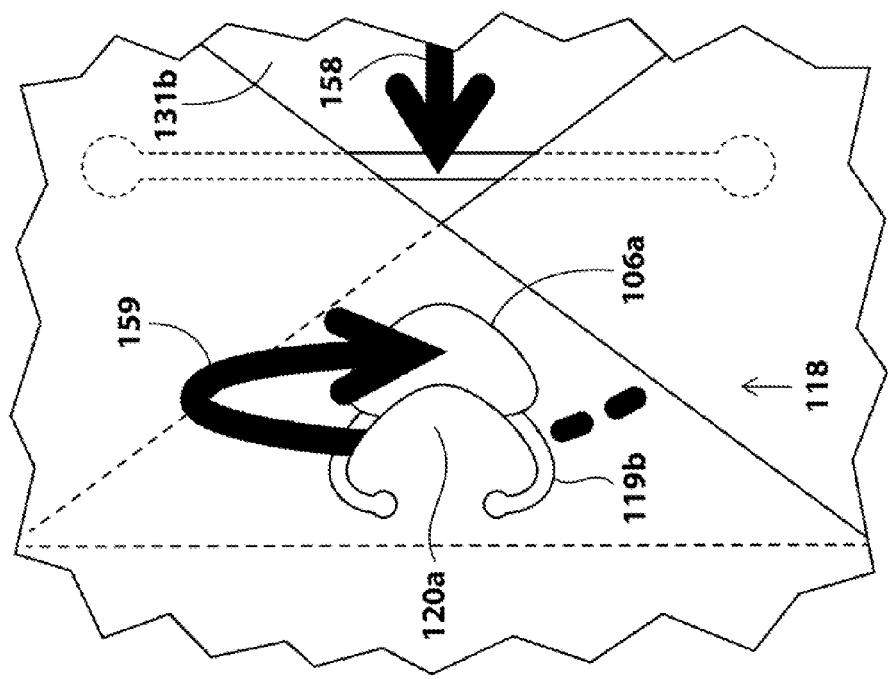
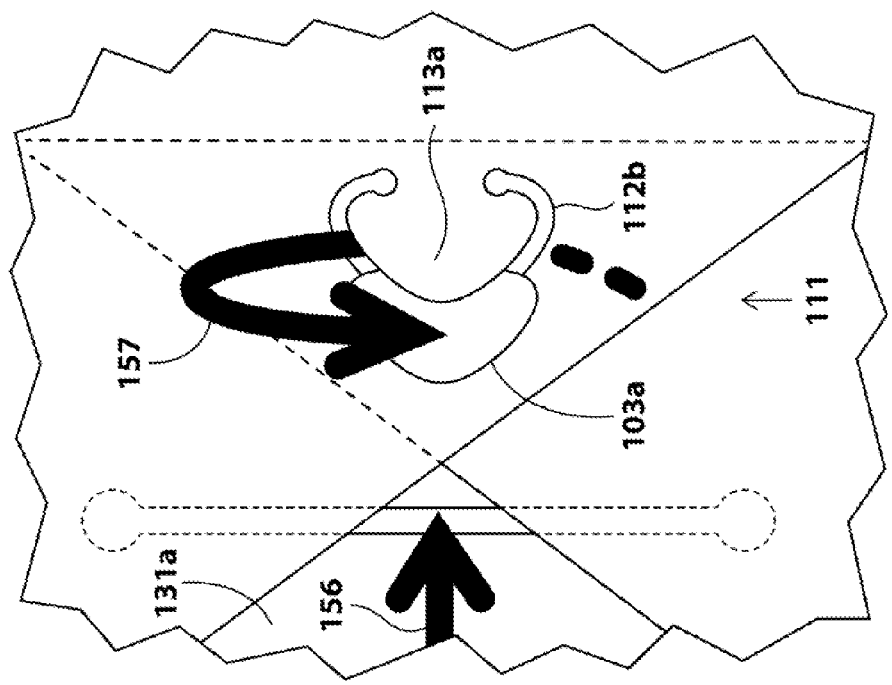

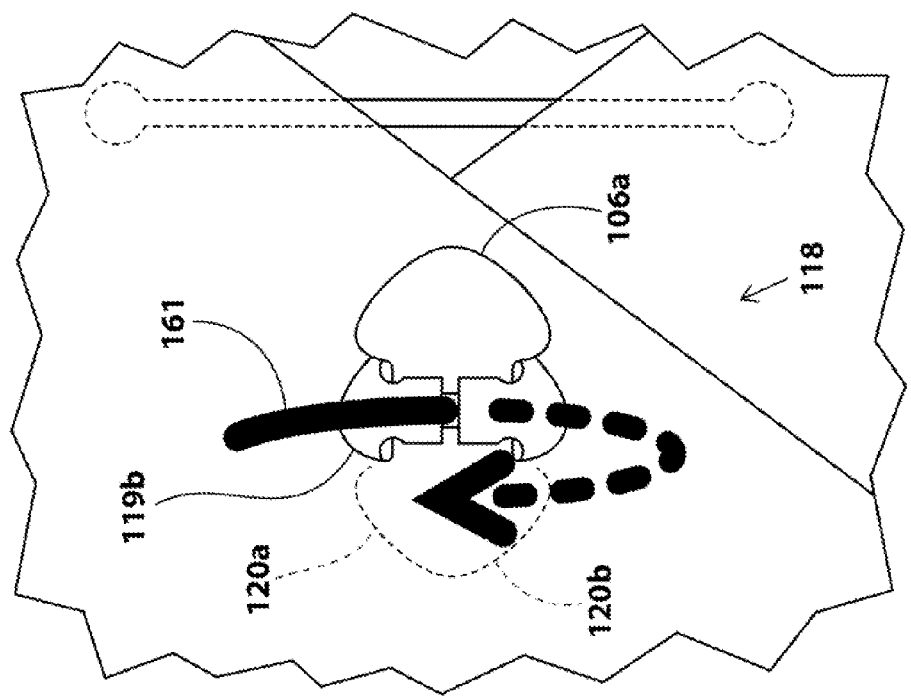
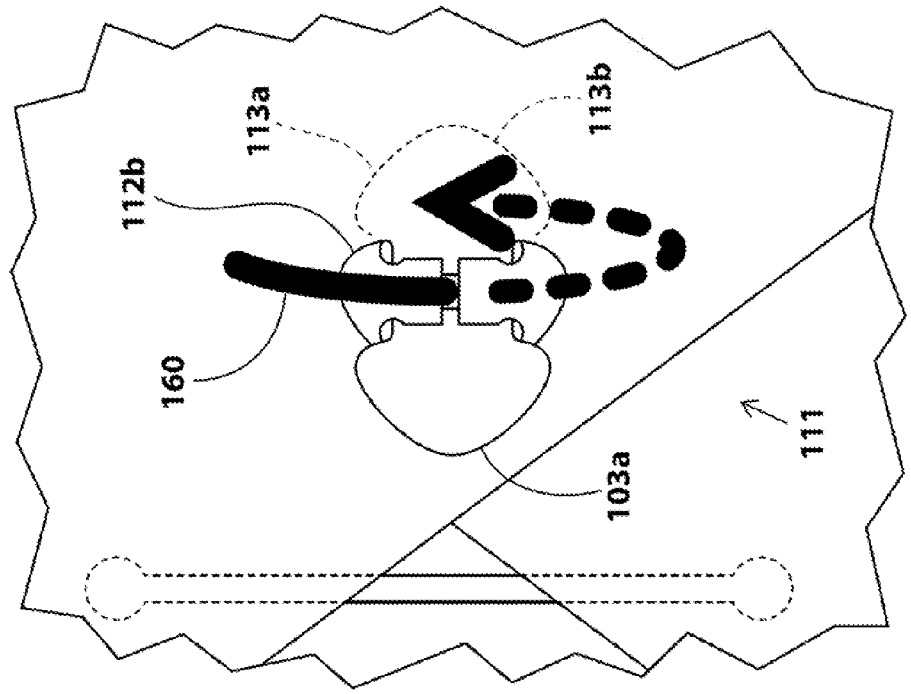

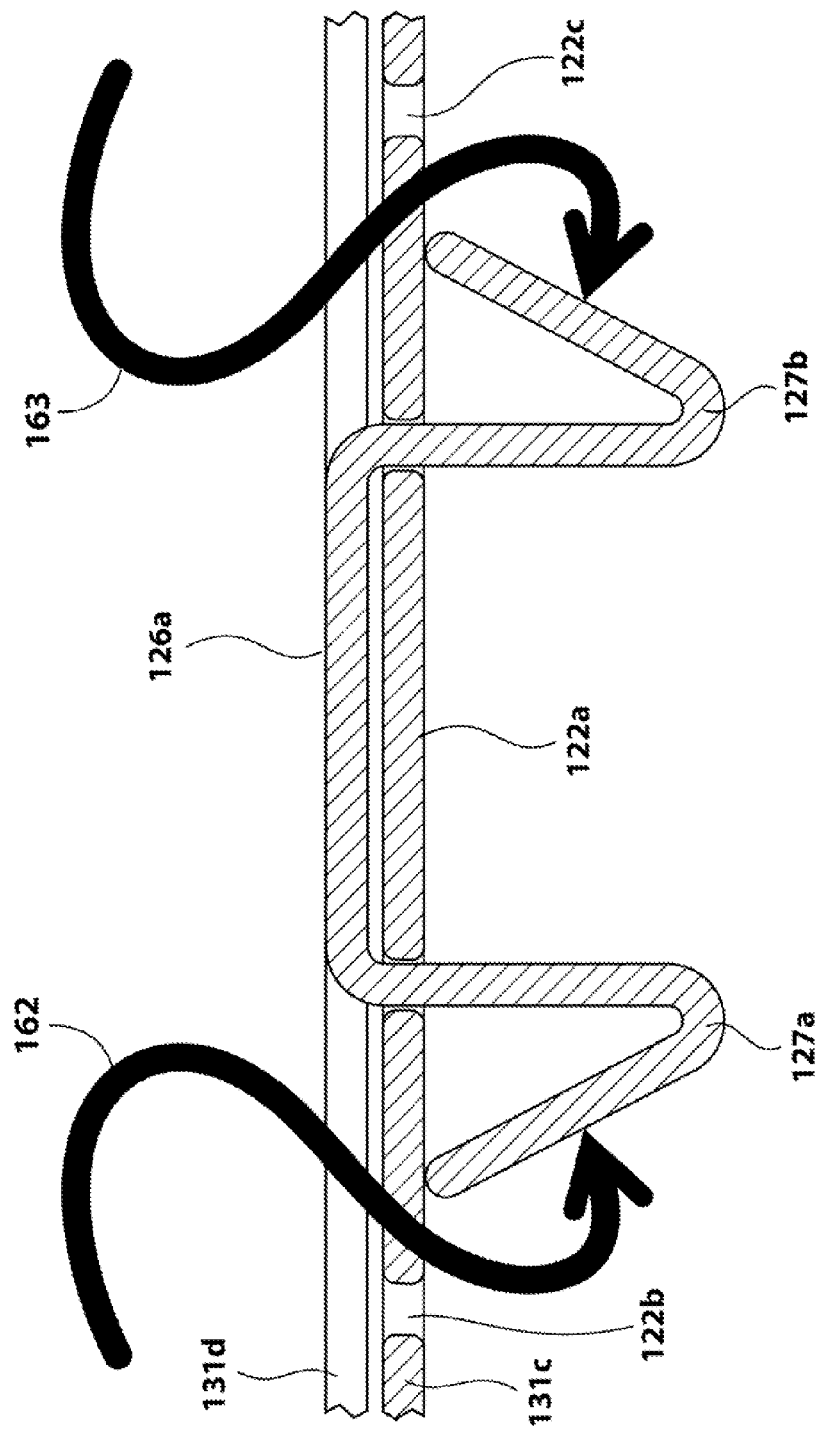

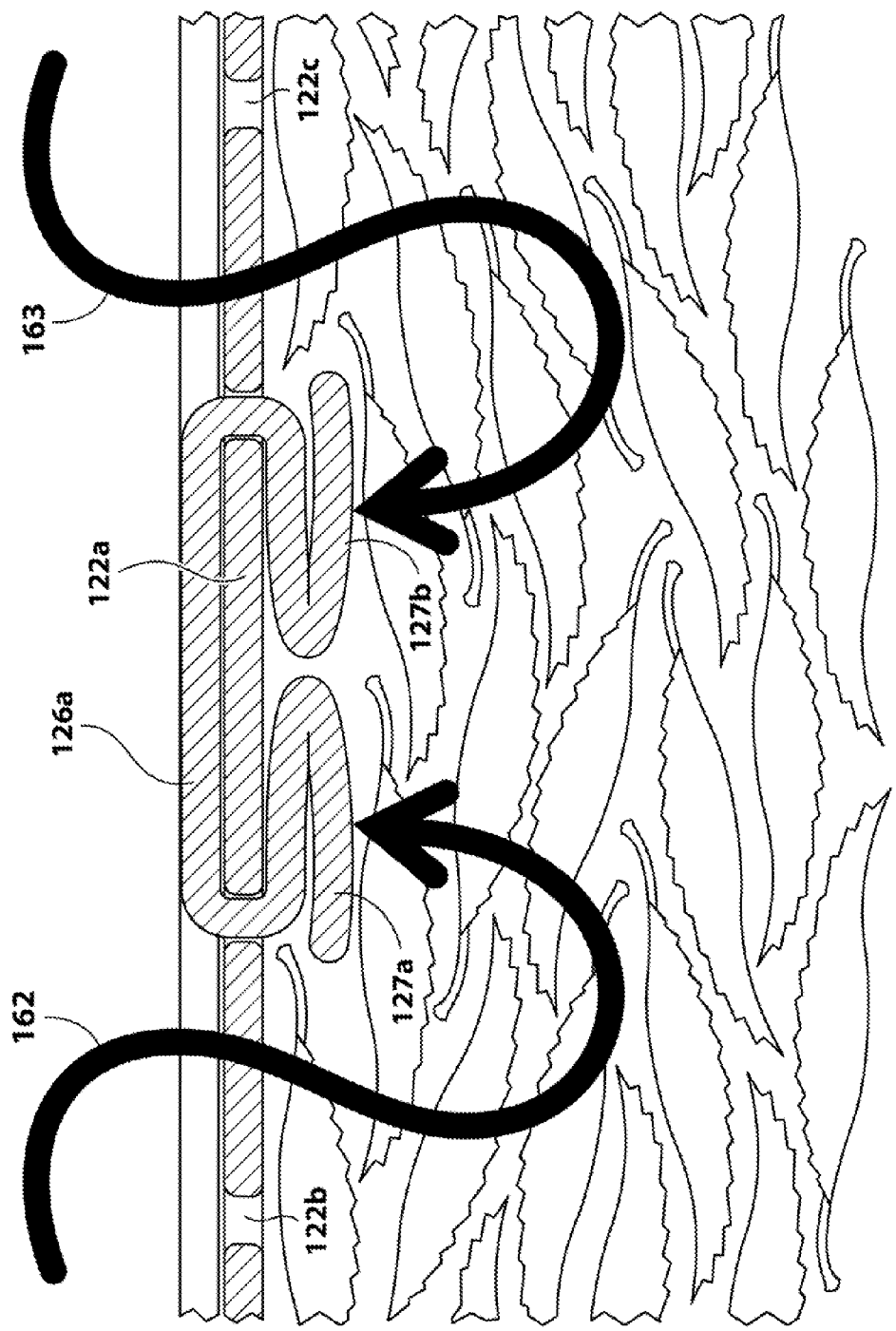

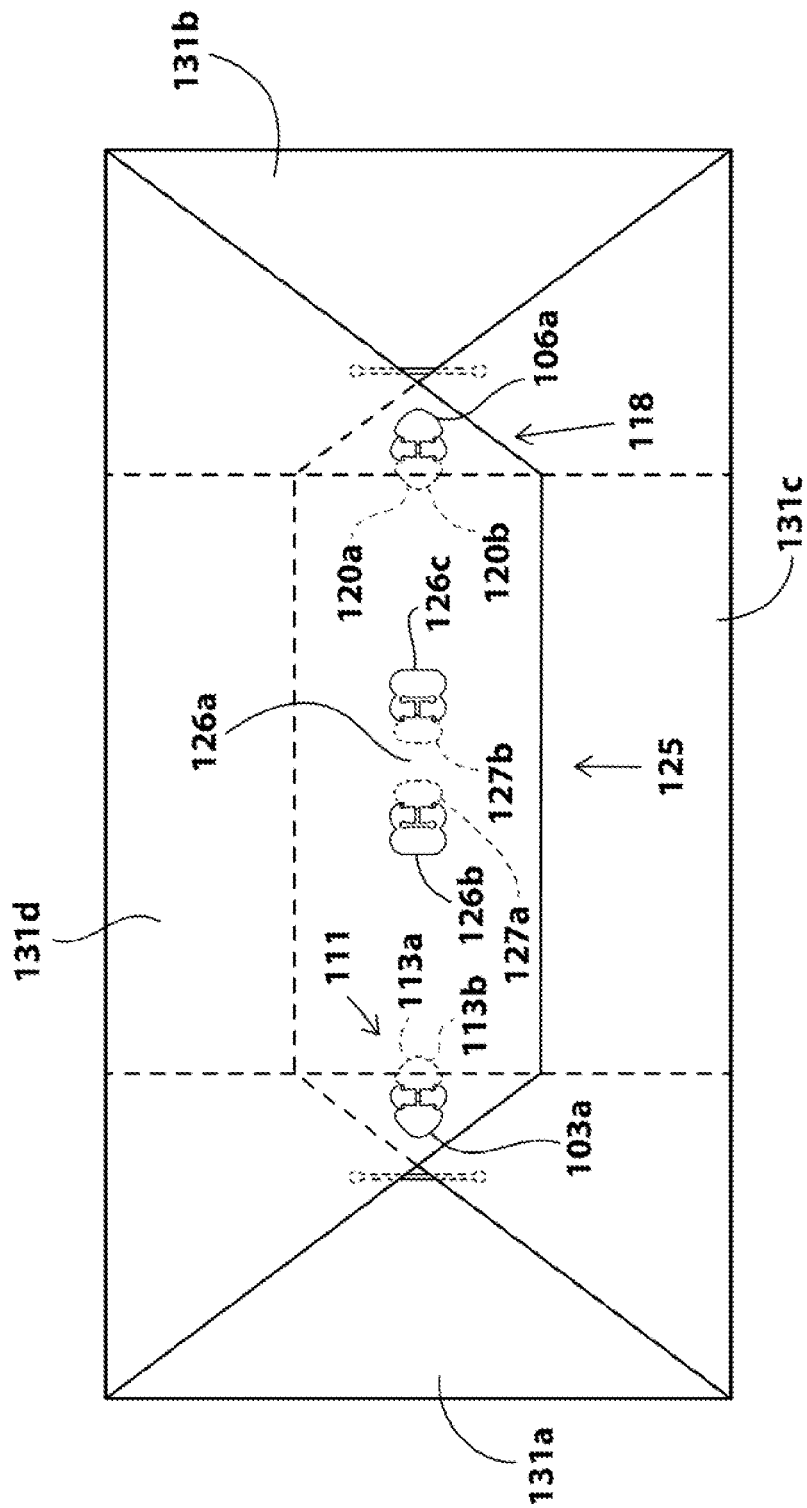

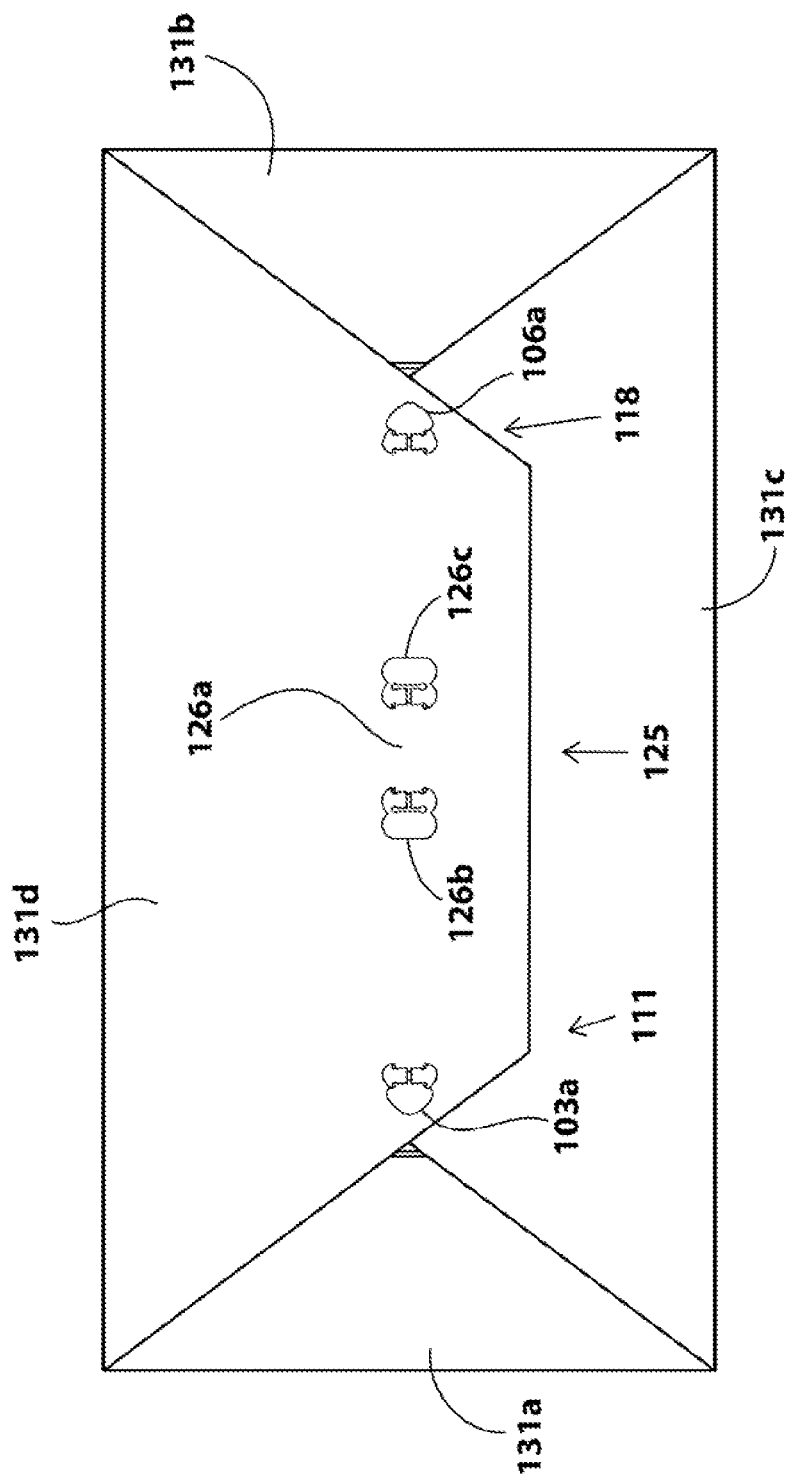

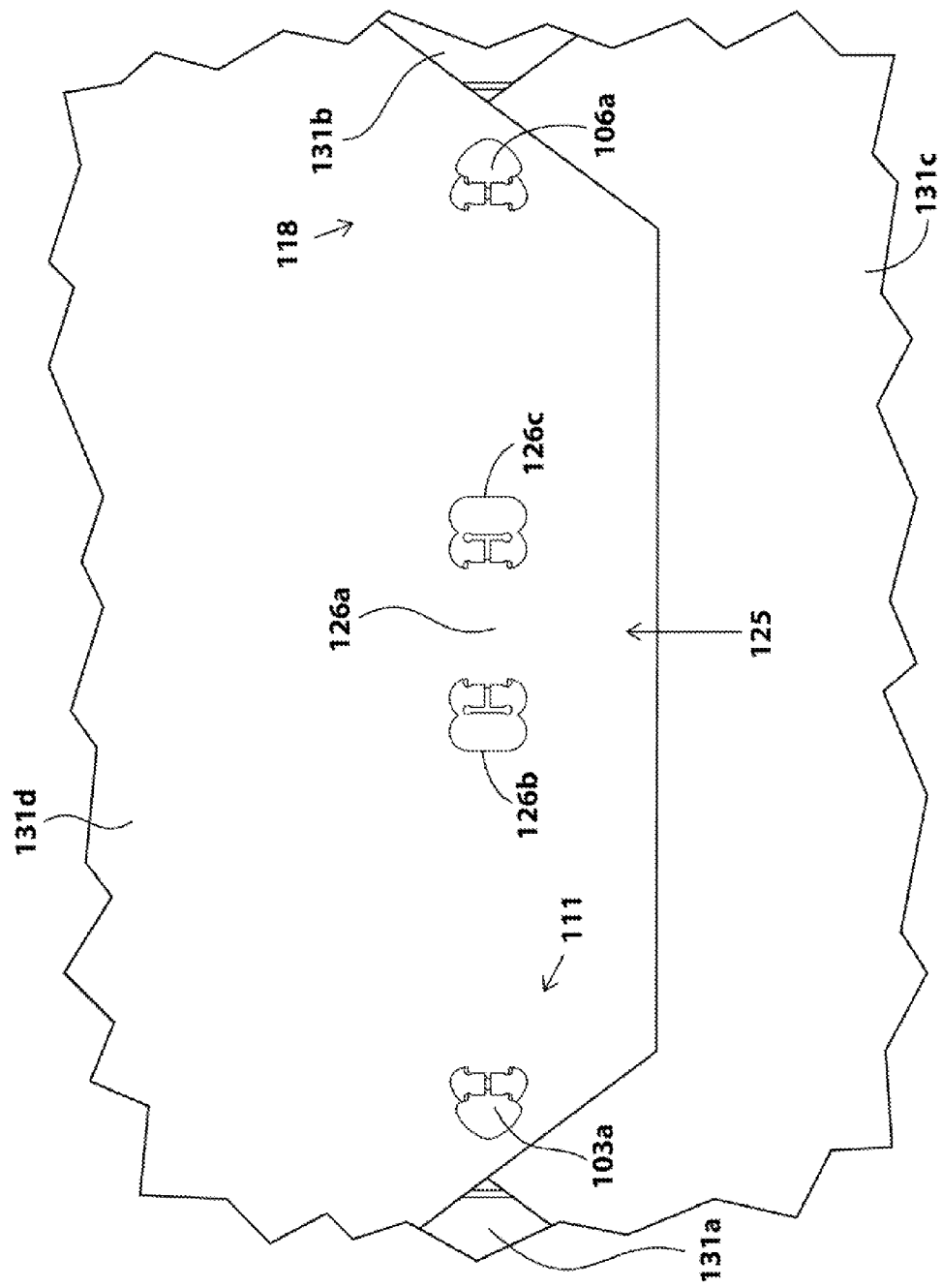

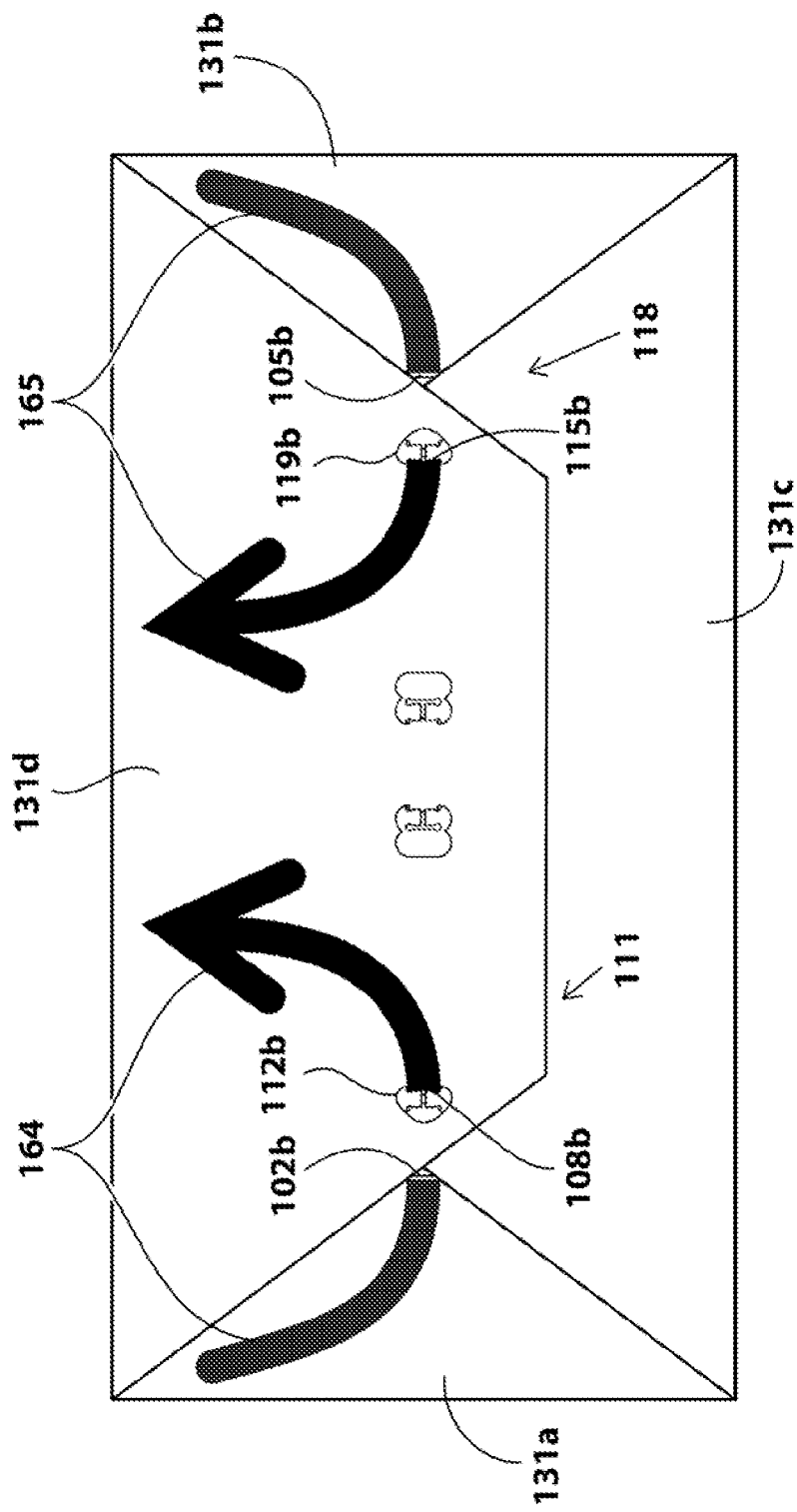

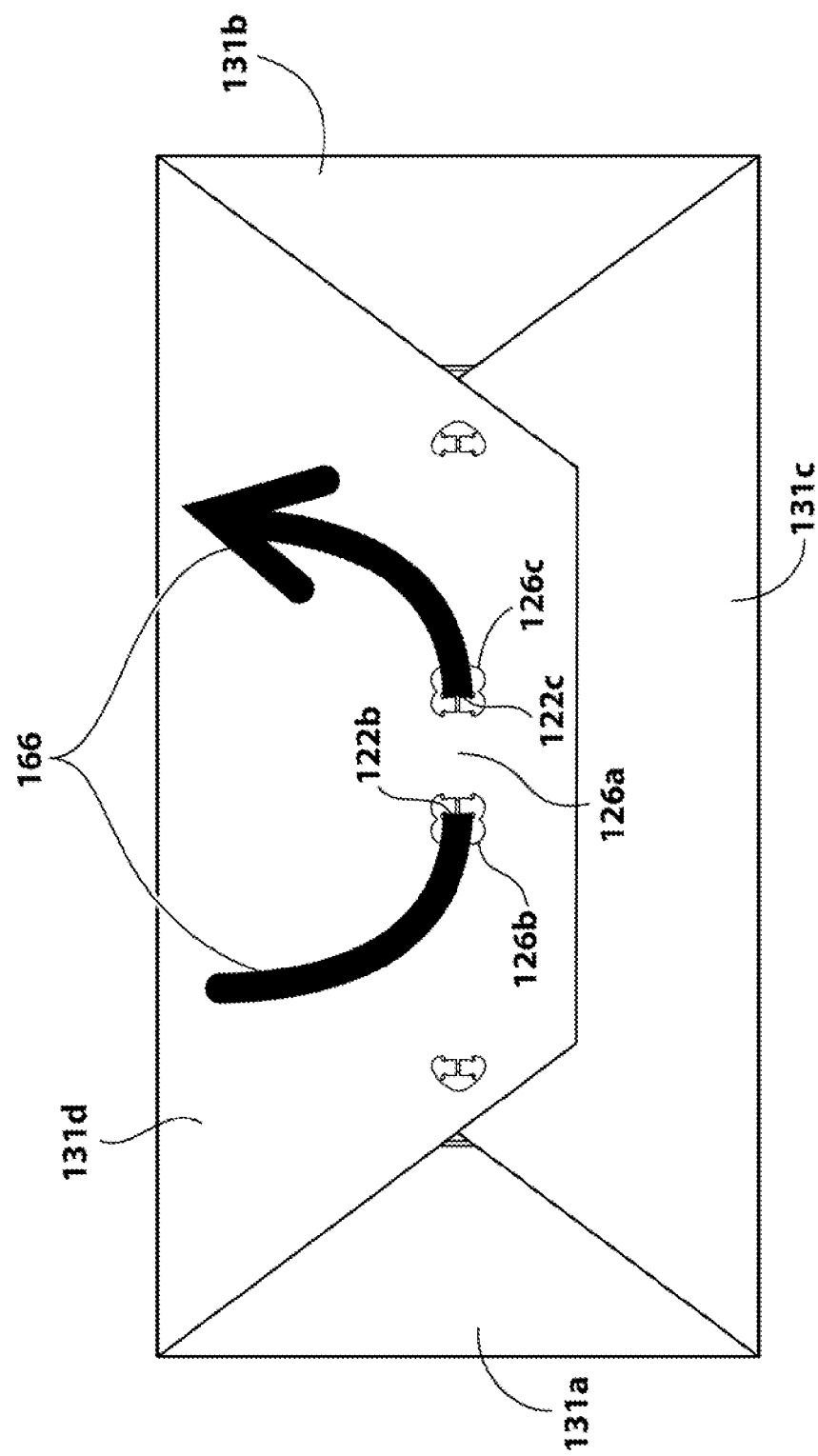

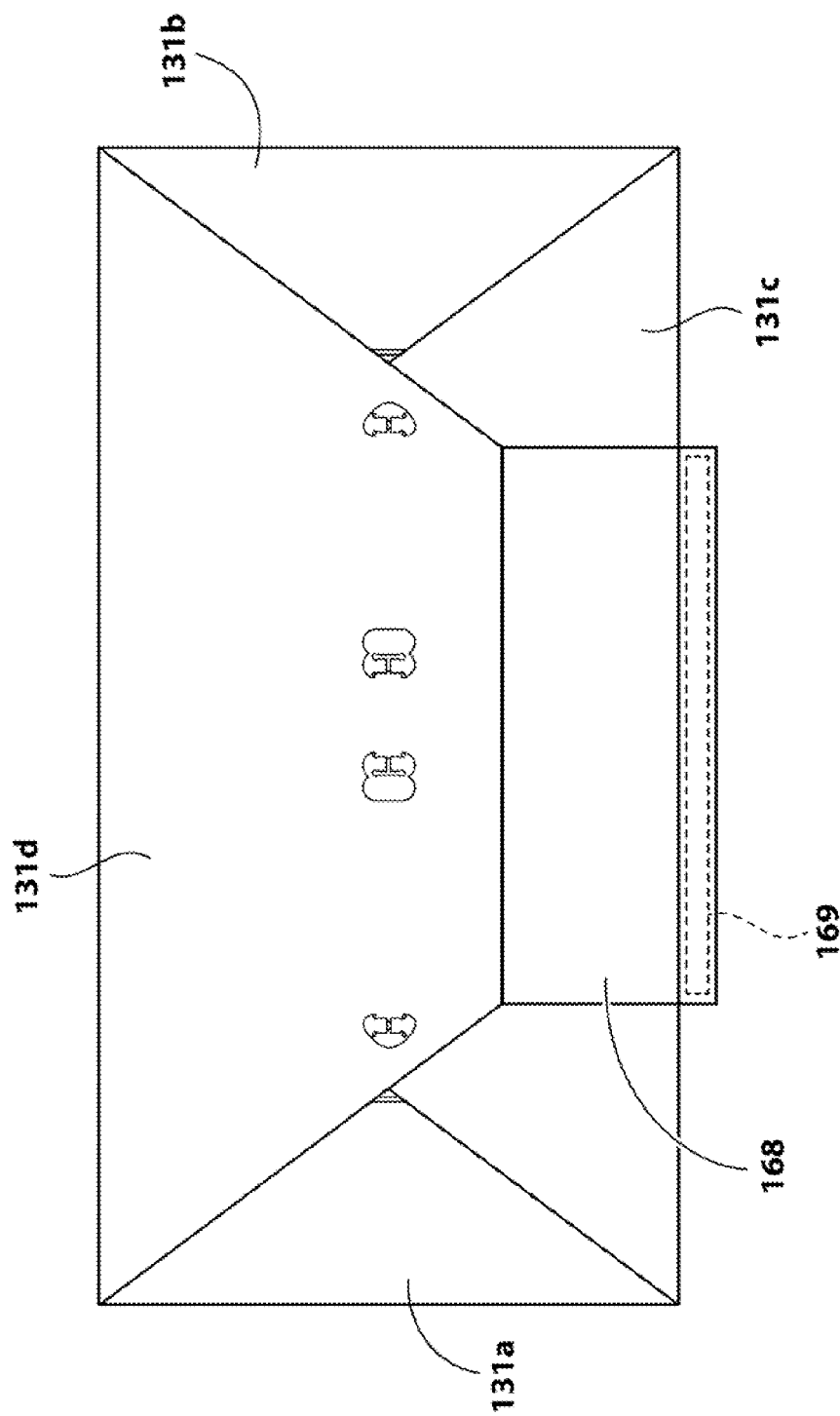

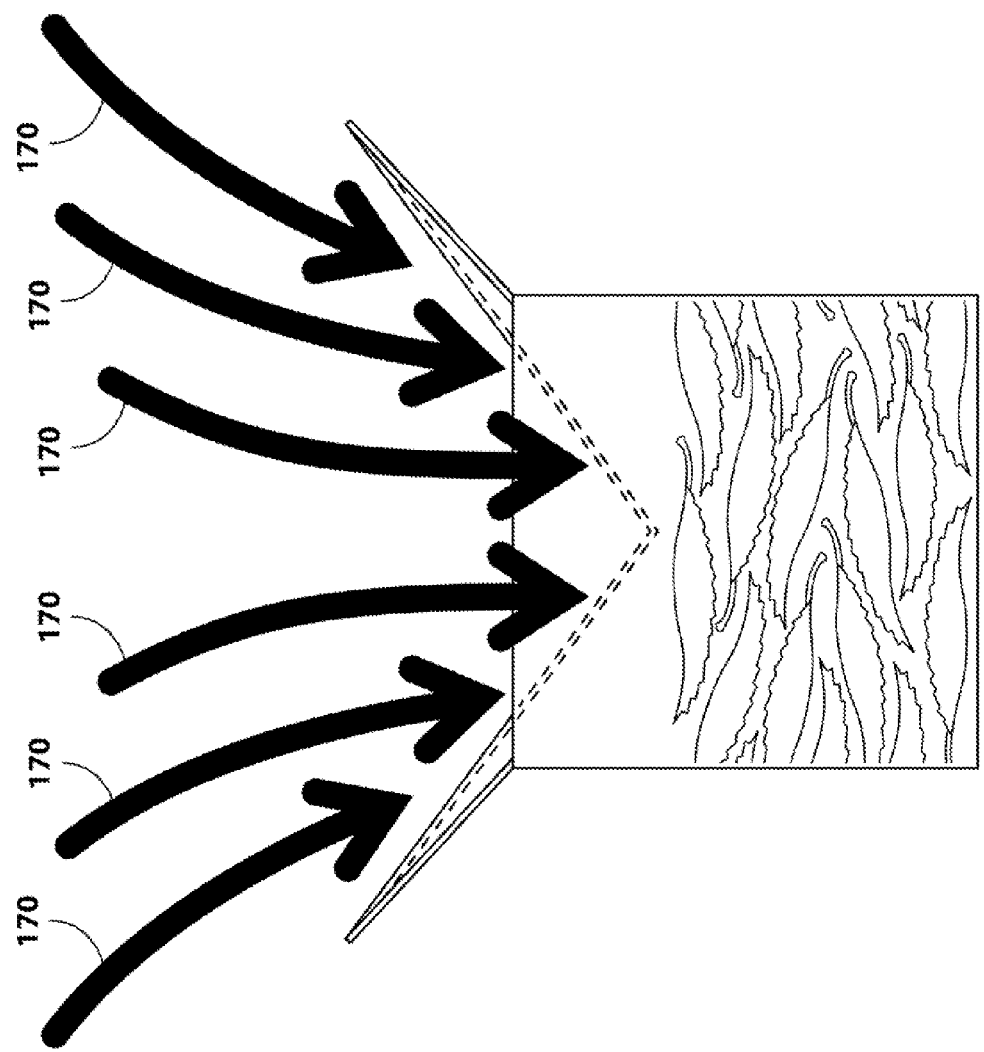

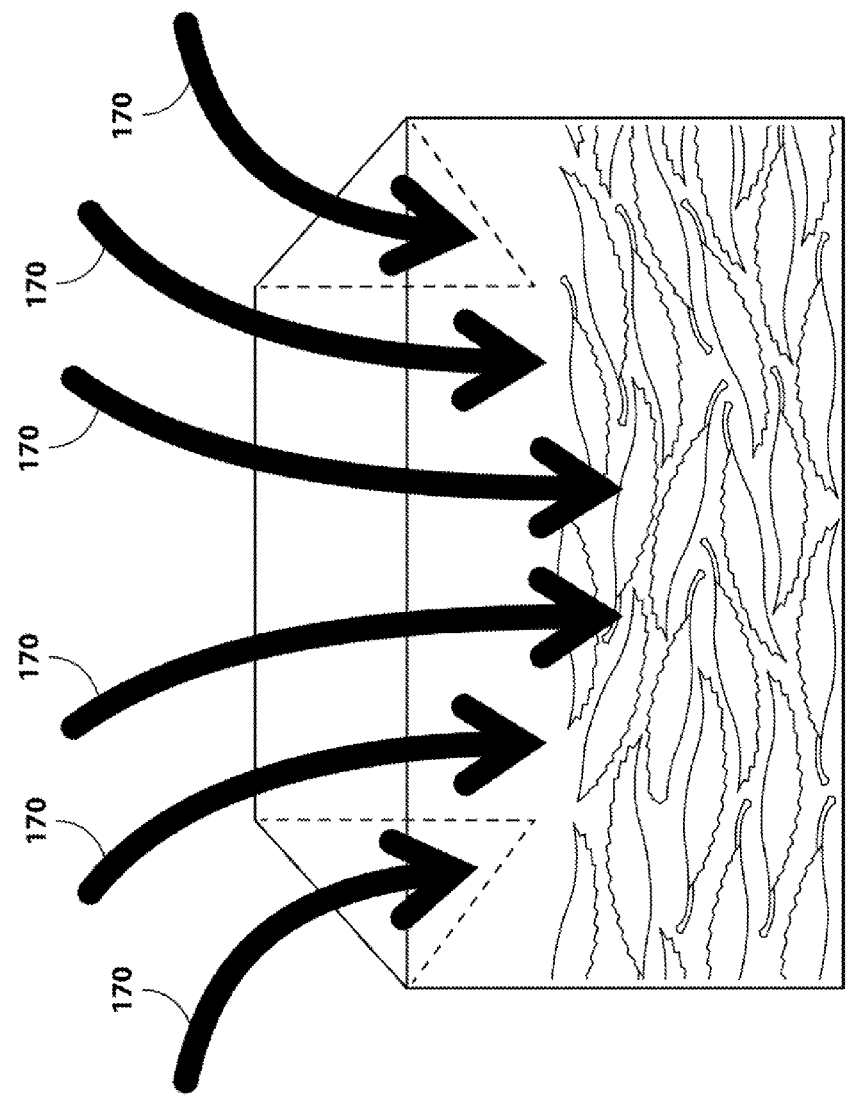

UNIQUE BIODEGRADABLE EIGHT-STACKED-REINFORCED-HANDLE BAG, HAVING EIGHT STACKED-REINFORCED HANDLES, MULTIPLE TRIPLE-LOCKING LATCHES, MULTIPLE TRIPLE-LOCKING BRACES, MULTIPLE QUADRUPLE-LOCKING WALLS, AND MULTIPLE DOUBLE-LOCKING DOORS

1. FIELD OF THE INVENTION

The present invention relates to a unique eight-stacked-and-reinforced-handle eight-stacked-and-reinforced-latch biodegradable bag for debris and garden, which is cheap to produce, is easy to ship as one unit, requires no assembly, and can be quickly and easily be sealed, securely. Particularly, the present invention relates to a unique eight-stacked-and-reinforced-handle eight-stacked-and-reinforced-latch biodegradable bag, having:
   a) Eight stacked and reinforced handles,
   b) Eight stacked and reinforced locking latches,
   c) Six stacked and reinforced locking doors,
   d) Left and right locking braces, and
   e) Eight stacked and reinforced locking walls.

2. DESCRIPTION OF THE PRIOR ART

A number of debris and garden bags have been introduced.
U.S. Pat. No. 1,410,404, patented 1922 Mar. 21, to E. D. Haines;
U.S. Pat. No. 1,415,450, patented 1922 May 9, to F. L. Johnson;
U.S. Pat. No. 1,701,097, patented 1929 Feb. 5, to M. T. Broderick;
U.S. Pat. No. 1,951,011, patented 1934 Mar. 13, to T. S. Falk;
U.S. Pat. No. 1,973,956, patented 1934 Sep. 18, to J. J. Hickman;
U.S. Pat. No. 2,020,804, patented 1935 Nov. 12, to H. R. Segal;
U.S. Pat. No. 2,098,258, patented 1937 Nov. 9, to W. W. Rowe;
U.S. Pat. No. 2,188,039, patented 1940 Jan. 23, to J. A. Farmer;
U.S. Pat. No. 2,191,723, patented 1940 Feb. 27, to E. C. Mulnix;
U.S. Pat. No. 2,650,016, patented 1953 Aug. 25, to H. I. McMillan;
U.S. Pat. No. 3,129,848, patented 1964 Apr. 21, to L. E. Canno;
U.S. Pat. No. 3,358,903, patented 1967 Dec. 19, to P. J. De Stefano Etal;
U.S. Pat. No. 3,361,333, patented 1968 Jan. 2, to J. T. Stuart;
U.S. Pat. No. 3,442,437, patented 1969 May 6, to C. R. Mann;
U.S. Pat. No. 3,682,372, patented 1972 Aug. 8, to Frederick T. Rodley;
U.S. Pat. No. 3,690,221, patented 1972 Sep. 12, to Herbert Schmeddling;
U.S. Pat. No. 4,243,171, patented 1981 Jan. 6, to Jean-Claude Prin;
U.S. Pat. No. 4,412,645, patented 1983 Nov. 1, to J. George Lepisto;
U.S. Pat. No. 4,524,459, patented 1985 Jun. 18, to Oliver R. Titchenal;
U.S. Pat. No. 4,561,107, patented 1985 Dec. 24, to Kornelis Herder;
U.S. Pat. No. 4,966,286, patented 1990 Oct. 30, to Delmar R. Muckenfuhs;
U.S. Pat. No. 5,080,253, patented 1992 Jan. 14, to Larry M. Zieke;
U.S. Pat. No. 5,104,235, patented 1992 Apr. 14, to Hans J. Bronstrup, N. Kotter;
U.S. Pat. No. 5,393,022, patented 1995 Feb. 28, to Dominick P. Palumbo;
U.S. Pat. No. 5,580,173, patented 1996 Dec. 3, to James Sebastian;
U.S. Pat. No. 5,760,118, patented 1998 Jun. 2, to Richard G. Sinclair, Edward S;
U.S. Pat. No. 5,882,117, patented 1999 Mar. 16, to Thierry Laffon;
U.S. Pat. No. 6,007,246, patented 1999 Dec. 28, to Panagiotis Kinigakis, Christie L. L.;
U.S. Pat. No. 6,053,635, patented 2000 Apr. 25, to Richard F. Anderson, Mark A. Steele;
U.S. Pat. No. 6,164,826, patented 2000 Dec. 26, to Gregory L. Petkovsed;
U.S. Pat. No. 6,481,183, patented 2002 Nov. 19, to John A. Schmidt;
U.S. Pat. No. 6,810,651, patented 2004 Nov. 2, to Sandra M. Washington;
U.S. Pat. No. 6,960,374, patented 2005 Nov. 1, to Shigenori Terada, Jun Takagi;
U.S. Pat. No. 6,984,426, patented 2006 Jan. 10, to Boris A. Miksic, Pasko Vela;
U.S. Pat. No. 7,011,448, patented 2006 Mar. 14, to Alan D. Olin;
U.S. Pat. No. 7,237,753, patented 2007 Jul. 3, to Donna Metcalfe;
U.S. Pat. No. 7,625,026, patented 2009 Dec. 1, to Tung Yan Lau;
U.S. Pat. No. 7,958,920, patented 2011 Jun. 14, to Tiffany E. Olsson;
U.S. Pat. No. 7,976,083, patented 2011 Jul. 12, to Joseph D. Black, Andrew J. Mistler, III,
U.S. Pat. No. 8,449,185, patented 2013 May 28, to Larry D. Koon;
U.S. Pat. No. 8,747,971, patented 2014 Jun. 10, to Catia Bastioli, Gianfranco Del Tredici;
U.S. Pat. No. 8,850,778, patented 2014 Oct. 7, to Mark E. Jansen;
U.S. Pat. No. 8,882,060, patented 2014 Nov. 11, to Teresa Gail Vaughn, John D. Corbitt;
U.S. Pat. No. 8,919,836, patented 2014 Dec. 30, to Praveena Joseph-de Saram, Markus M.
U.S. Pat. No. 8,925,984, patented 2015 Jan. 6, to Praveena Joseph-de Saram, Markus M.;
U.S. Pat. No. 8,992,085, patented 2015 Mar. 31, to Alan D. Olin, Diana S. Olin;
U.S. Publication. No. 20030106895, Published 2003 Jun. 12, to Richard K. Kalal; and
U.S. Publication. No. 20060279097, published 2006 Dec. 14, to Robert J. and Michael J. disclose a variety of inventions related to debris and garden bags.
The prior art have failed to solve many problems associated with such debris or garden bag, as follows:
1) No prior art mentions or discloses any eight-stacked-and-reinforced-handle eight-stacked-and-reinforced-latch biodegradable bag, having eight stacked and reinforced handles (side handles, front handles, and rear handles), which can be:
  a) Formed by folding all four top sections of the eight-stacked-and-reinforced-handle eight-stacked-and-reinforced-latch biodegradable bag on top of one another to be reinforced,
  b) Folded individually to be reinforced,
  c) Stacked on top of each other to be reinforced,
  d) Latched together into one unit to be reinforced, and
  e) Latched together into one unit to provide easy and comfort of operation.
Therefore, the prior art:
  a) Are difficult to carry,
  b) Require additional hardware to seal,
  c) Require additional tools to produce additional hardware,
  d) Require additional production costs, and
  e) Cause personal injuries from using additional tools to produce additional hardware.

2) No prior art mentions or discloses any eight-stacked-and-reinforced-handle eight-stacked-and-reinforced-latch biodegradable bag, having all eight stacked and reinforced handles (side handles, front handles, and rear handles) additionally reinforced with reinforcing device, which can:
  a) Strengthen all eight stacked and reinforced handles (side handles, front handles, and rear handles), to prevent them from being torn, and to securely carry the weight of the content of the eight-stacked-and-reinforced-handle eight-stacked-and-reinforced-latch biodegradable bag.
  b) Strengthen all eight stacked and reinforced locking latches (side latches, front latches, and rear latches), to prevent them from being torn, and to securely seal the eight-stacked-and-reinforced-handle eight-stacked-and-reinforced-latch biodegradable bag,
  c) Strengthen all six stacked and reinforced locking doors (left doors, middle doors, and right doors), to prevent them from being torn, and to securely lock all eight stacked and reinforced locking latches,
  d) Strengthen two stacked and reinforced locking braces (left and right braces), to prevent them from being torn, and to securely lock all eight stacked and reinforced locking latches, and
  e) Strengthen all eight stacked and reinforced locking walls (side walls, front walls, and rear walls), to prevent them from being torn, and to securely lock all eight stacked and reinforced locking latches.
Therefore, the prior art:
  a) Don't securely seal themselves,
  b) Fail to prevent themselves from accidentally unlocking themselves and popping open following closure, and
  c) Cause accidental releasing of the content of the prior art.

3) No prior art mentions or discloses any eight-stacked-and-reinforced-handle eight-stacked-and-reinforced-latch biodegradable bag, having eight stacked and reinforced handles (side handles, front handles, and rear handles), which can:
  a) Be stacked into one unit of multiple handles,
  b) Be easily held onto to pick up and carry the eight-stacked-and-reinforced-handle eight-stacked-and-reinforced-latch biodegradable bag,
  c) Efficiently carry the weight of the content of the eight-stacked-and-reinforced-handle eight-stacked-and-reinforced-latch biodegradable bag, and
  d) Resist tearing.
Therefore, the prior art:
  a) Can easily tear,
  b) Pop open following closure, and
  c) Accidentally release the content of the prior art.

4) No prior art mentions or discloses any eight-stacked-and-reinforced-handle eight-stacked-and-reinforced-latch biodegradable bag, having its bag top forming and functioning as a long and broad funnel, which can:
  a) Provide a long and broad funnel opening for easy loading,
  b) Function as a long and broad funnel opening, to save loading time and labor,
  c) Allow the debris to quickly and easily slide into the eight-stacked-and-reinforced-handle eight-stacked-and-reinforced-latch biodegradable bag.
Therefore, the prior art:
  a) Fail to facilitate efficient bag loading, without spillage,
  b) Require additional time and labor,
  c) Require additional people to hold the prior-art bags open while loading, and
  d) Require more time and labor to load and unload.

5) No prior art mentions or discloses any eight-stacked-and-reinforced-handle eight-stacked-and-reinforced-latch biodegradable bag, having the stability achieved by resting horizontally on its long side on the ground, which can:
  a) Keep its long and broad funnel opening close to the ground,
  b) Reduce the debris-lifting distances, and
  c) Keep itself stable while loading (by resting on its long side on the ground), to prevent the eight-stacked-and-reinforced-handle eight-stacked-and-reinforced-latch biodegradable bag from tipping over, and to prevent accidental spillage of its content.
Therefore, the prior art:
  a) Require long debris-lifting distances when loading,
  b) Require long debris-reaching distances when unloading,
  c) Require more time and labor to load and unload, and
  d) Cause greater strain on one's back during loading and unloading.

6) No prior art mentions or discloses any eight-stacked-and-reinforced-handle eight-stacked-and-reinforced-latch biodegradable bag, having eight stacked and reinforced locking latches (side latches, front latches, and rear latches), which can be:
  a) All completely hidden and protected inside the eight-stacked-and-reinforced-handle eight-stacked-and-reinforced-latch biodegradable bag, to prevent eight stacked and reinforced locking latches from being torn, and to keep the eight-stacked-and-reinforced-handle eight-stacked-and-reinforced-latch biodegradable bag secured.
  b) Quickly and easily operated, to seal the eight-stacked-and-reinforced-handle eight-stacked-and-reinforced-latch biodegradable bag on the inside,
  c) Interlocked on the inside, to prevent accidental unlocking of eight stacked and reinforced locking latches.
Therefore, the prior art:
  a) Fail to protect the bag-locking mechanism from damage,
  b) Vulnerably expose the bag-locking mechanism outside the bag,
  c) Allow the bag-locking mechanism to be easily torn off, and
  d) Accidentally spill its contents.

7) No prior art mentions or discloses any eight-stacked-and-reinforced-handle eight-stacked-and-reinforced-latch biodegradable bag, having eight stacked and reinforced locking latches (side latches, front latches, and rear latches), which can:
   a) Oppositely interlock all four top sections of the eight-stacked-and-reinforced-handle eight-stacked-and-reinforced-latch biodegradable bag, to stack all its components on top of one another for added strength and efficiency, and
   b) Oppositely interlock all eight stacked and reinforced handles (side handles, front handles, and rear handles), to allow them to function as one unit.
   Therefore, the prior art:
   a) Cannot oppositely interlock their four top sections, and
   b) Cannot oppositely interlock eight stacked and reinforced handles for efficient pickup and transport.
8) No prior art mentions or discloses any eight-stacked-and-reinforced-handle eight-stacked-and-reinforced-latch biodegradable bag, having all six stacked and reinforced locking doors (left doors, middle doors, and right doors), which can:
   a) Oppositely interlock eight stacked and reinforced locking latches (side latches, front latches, and rear latches), to allow them to function as one unit, and
   b) Oppositely interlock all eight stacked and reinforced handles (side handles, front handles, and rear handles), to allow them to function as one unit.
   Therefore, the prior art:
   a) Cannot oppositely interlock eight stacked and reinforced locking latches,
   b) Cannot oppositely interlock their four top sections, and
   c) Cannot oppositely interlock eight stacked and reinforced handles for efficient pickup and transport.
9) No prior art mentions or discloses any eight-stacked-and-reinforced-handle eight-stacked-and-reinforced-latch biodegradable bag, having eight stacked and reinforced locking walls and two stacked and reinforced locking braces, which can:
   a) Oppositely interlock eight stacked and reinforced locking latches (side latches, front latches, and rear latches), to allow them to function as one unit, and
   b) Oppositely interlock all eight stacked and reinforced handles (side handles, front handles, and rear handles), to allow them to function as one unit.
   Therefore, the prior art:
   a) Cannot oppositely interlock eight stacked and reinforced locking latches,
   b) Cannot oppositely interlock their four top sections, and
   c) Cannot oppositely interlock eight stacked and reinforced handles for efficient pickup and transport.
10) No prior art mentions or discloses any eight-stacked-and-reinforced-handle eight-stacked-and-reinforced-latch biodegradable bag, having all its stacked and reinforced components (eight stacked and reinforced handles, eight stacked and reinforced locking latches, six stacked and reinforced locking doors, left and right locking braces, and eight stacked and reinforced locking walls), which can:
   a) Be mechanically punched in the eight-stacked-and-reinforced-handle eight-stacked-and-reinforced-latch biodegradable bag, to make the eight-stacked-and-reinforced-handle eight-stacked-and-reinforced-latch biodegradable bag and all its stacked and reinforced components function as one unit,
   b) Have no separate components to keep production cost affordable,
   c) Have no separate components to ship and store,
   d) Have no separate components to lose, and
   e) Have no separate components to assemble.
   Therefore, the prior art:
   a) Fail to provide the eight-stacked-and-reinforced-handle eight-stacked-and-reinforced-latch biodegradable bag, with all its stacked and reinforced components mechanically punched therein, as one unit,
   b) Fail to provide the eight-stacked-and-reinforced-handle eight-stacked-and-reinforced-latch biodegradable bag, with all its stacked and reinforced components, affordably produced,
   c) Fail to provide the eight-stacked-and-reinforced-handle eight-stacked-and-reinforced-latch biodegradable bag, with all its stacked and reinforced components, easily shipped and stored,
   d) Fail to provide the eight-stacked-and-reinforced-handle eight-stacked-and-reinforced-latch biodegradable bag, with all its stacked and reinforced components punched therein, having no separate components to lose, and
   e) Fail to provide the eight-stacked-and-reinforced-handle eight-stacked-and-reinforced-latch biodegradable bag, with all its stacked and reinforced components punched therein, requiring no assembly.

OBJECTS AND ADVANTAGES OF THE INVENTION

The present invention substantially departs from the conventional concepts and designs of the prior art. In doing so, the present invention provides a unique eight-stacked-and-reinforced-handle eight-stacked-and-reinforced-latch biodegradable bag for debris and garden, having many unique and significant features, functions, and advantages, which overcome all the disadvantages of the prior art, as follows:

1) It is an object of the present invention to provide the unique eight-stacked-and-reinforced-handle eight-stacked-and-reinforced-latch biodegradable bag, having eight stacked and reinforced handles (side handles, front handles, and rear handles), which can be:
   a) Formed by folding all four top sections of the eight-stacked-and-reinforced-handle eight-stacked-and-reinforced-latch biodegradable bag on top of one another to be reinforced,
   b) Folded individually to be reinforced,
   c) Stacked on top of each other to be reinforced,
   d) Latched together into one unit to be reinforced, and
   e) Latched together into one unit to provide easy and comfort of operation.
   Therefore, the unique eight-stacked-and-reinforced-handle eight-stacked-and-reinforced-latch biodegradable bag can:
   a) Be easy to carry,
   b) Eliminate additional hardware to seal,
   c) Eliminate additional tools to produce additional hardware,
   d) Eliminate additional production costs, and
   e) Eliminate personal injuries from using additional tools to produce additional hardware.
2) It is another object of the present invention to provide the unique eight-stacked-and-reinforced-handle eight-stacked-and-reinforced-latch biodegradable bag, having all eight stacked and reinforced handles (side handles, front handles, and rear handles) additionally reinforced with reinforcing device, which can:
   a) Strengthen all eight stacked and reinforced handles (side handles, front handles, and rear handles), to prevent them from being torn, and to securely carry the weight of the content of the eight-stacked-and-reinforced-handle eight-stacked-and-reinforced-latch biodegradable bag.
- b) Strengthen all eight stacked and reinforced locking latches (side latches, front latches, and rear latches), to prevent them from being torn, and to securely seal the eight-stacked-and-reinforced-handle eight-stacked-and-reinforced-latch biodegradable bag,
- c) Strengthen all six stacked and reinforced locking doors (left doors, middle doors, and right doors), to prevent them from being torn, and to securely lock all eight stacked and reinforced locking latches,
- d) Strengthen two stacked and reinforced locking braces (left and right braces), to prevent them from being torn, and to securely lock all eight stacked and reinforced locking latches, and
- e) Strengthen all eight stacked and reinforced locking walls (side walls, front walls, and rear walls), to prevent them from being torn, and to securely lock all eight stacked and reinforced locking latches.

Therefore, the unique eight-stacked-and-reinforced-handle eight-stacked-and-reinforced-latch biodegradable bag can:
- a) Securely seal themselves,
- b) Prevent themselves from accidentally unlocking themselves and popping open following closure, and
- c) Prevent accidental releasing of its content.

3) It is a further object of the present invention to provide the unique eight-stacked-and-reinforced-handle eight-stacked-and-reinforced-latch biodegradable bag, having eight stacked and reinforced handles (side handles, front handles, and rear handles), which can:
- a) Be stacked into one unit of multiple handles,
- b) Be easily held onto to pick up and carry the eight-stacked-and-reinforced-handle eight-stacked-and-reinforced-latch biodegradable bag,
- c) Efficiently carry the weight of the content of the eight-stacked-and-reinforced-handle eight-stacked-and-reinforced-latch biodegradable bag, and
- d) Resist tearing.

Therefore, the unique eight-stacked-and-reinforced-handle eight-stacked-and-reinforced-latch biodegradable bag can:
- a) Resist tear,
- b) Be sealed securely following closure, and
- c) Prevent accidental releasing of its content.

4) It is an even further object of the present invention to provide the unique eight-stacked-and-reinforced-handle eight-stacked-and-reinforced-latch biodegradable bag, having its bag top forming and functioning as a long and broad funnel, which can:
- a) Provide a long and broad funnel opening for easy loading,
- b) Function as a long and broad funnel opening, to save loading time and labor,
- c) Allow the debris to quickly and easily slide into the eight-stacked-and-reinforced-handle eight-stacked-and-reinforced-latch biodegradable bag.

Therefore, the unique eight-stacked-and-reinforced-handle eight-stacked-and-reinforced-latch biodegradable bag can:
- a) Facilitate efficient bag loading, without spillage,
- b) Save time and labor,
- c) Eliminate the need for additional people to hold the bag open while loading, and
- d) Require less time and labor to load and unload.

5) It is another object of the present invention to provide the unique eight-stacked-and-reinforced-handle eight-stacked-and-reinforced-latch biodegradable bag, having the stability achieved by resting horizontally on its long side on the ground, which can:
- a) Keep its long and broad funnel opening close to the ground,
- b) Reduce the debris-lifting distances, and
- c) Keep itself stable while loading (by resting on its long side on the ground), to prevent the eight-stacked-and-reinforced-handle eight-stacked-and-reinforced-latch biodegradable bag from tipping over, and to prevent accidental spillage of its content.

Therefore, the unique eight-stacked-and-reinforced-handle eight-stacked-and-reinforced-latch biodegradable bag can:
- a) Provide easy loading,
- b) Provide easy unloading,
- c) Require less time and labor to load and unload, and
- d) Save one's back during loading and unloading.

6) It is yet another object of the present invention to provide the unique eight-stacked-and-reinforced-handle eight-stacked-and-reinforced-latch biodegradable bag, having eight stacked and reinforced locking latches (side latches, front latches, and rear latches), which can be:
- a) All completely hidden and protected inside the eight-stacked-and-reinforced-handle eight-stacked-and-reinforced-latch biodegradable bag, to prevent eight stacked and reinforced locking latches from being torn, and to keep the eight-stacked-and-reinforced-handle eight-stacked-and-reinforced-latch biodegradable bag secured.
- b) Quickly and easily operated, to seal the eight-stacked-and-reinforced-handle eight-stacked-and-reinforced-latch biodegradable bag on the inside,
- c) Interlocked on the inside, to prevent accidental unlocking of eight stacked and reinforced locking latches.

Therefore, the unique eight-stacked-and-reinforced-handle eight-stacked-and-reinforced-latch biodegradable bag can:
- a) Protect the bag-locking mechanism from damage,
- b) Hide and protect the bag-locking mechanism completely inside the eight-stacked-and-reinforced-handle eight-stacked-and-reinforced-latch biodegradable bag,
- c) Prevent the bag-locking mechanism from being torn off, and
- d) Prevent accidental spillage of its contents.

7) It is still yet another object of the present invention to provide the unique eight-stacked-and-reinforced-handle eight-stacked-and-reinforced-latch biodegradable bag, having eight stacked and reinforced locking latches (side latches, front latches, and rear latches), which can:
- a) Oppositely interlock all four top sections of the eight-stacked-and-reinforced-handle eight-stacked-and-reinforced-latch biodegradable bag, to stack all its components on top of one another for added strength and efficiency, and
- b) Oppositely interlock all eight stacked and reinforced handles (side handles, front handles, and rear handles), to allow them to function as one unit.

Therefore, the unique eight-stacked-and-reinforced-handle eight-stacked-and-reinforced-latch biodegradable bag can:
- a) Oppositely interlock its four top sections, and
- b) Oppositely interlock eight stacked and reinforced handles for efficient pickup and transport.

8) It is still yet a further object of the present invention to provide the unique eight-stacked-and-reinforced-handle eight-stacked-and-reinforced-latch biodegradable bag, having all six stacked and reinforced locking doors (left doors, middle doors, and right doors), which can:
   a) Oppositely interlock eight stacked and reinforced locking latches (side latches, front latches, and rear latches), to allow them to function as one unit, and
   b) Oppositely interlock all eight stacked and reinforced handles (side handles, front handles, and rear handles), to allow them to function as one unit.

Therefore, the unique eight-stacked-and-reinforced-handle eight-stacked-and-reinforced-latch biodegradable bag can:
   a) Oppositely interlock eight stacked and reinforced locking latches,
   b) Oppositely interlock its four top sections, and
   c) Oppositely interlock eight stacked and reinforced handles for efficient pickup and transport.

9) It is still yet an even further object of the present invention to provide the unique eight-stacked-and-reinforced-handle eight-stacked-and-reinforced-latch biodegradable bag, having eight stacked and reinforced locking walls and two stacked and reinforced locking braces, which can:
   a) Oppositely interlock eight stacked and reinforced locking latches (side latches, front latches, and rear latches), to allow them to function as one unit, and
   b) Oppositely interlock all eight stacked and reinforced handles (side handles, front handles, and rear handles), to allow them to function as one unit.

Therefore, the unique eight-stacked-and-reinforced-handle eight-stacked-and-reinforced-latch biodegradable bag can:
   a) Oppositely interlock eight stacked and reinforced locking latches,
   b) Oppositely interlock its four top sections, and
   c) Oppositely interlock eight stacked and reinforced handles for efficient pickup and transport.

10) It is still yet an even further object of the present invention to provide the unique eight-stacked-and-reinforced-handle eight-stacked-and-reinforced-latch biodegradable bag, having all its stacked and reinforced components (eight stacked and reinforced handles, eight stacked and reinforced locking latches, six stacked and reinforced locking doors, left and right locking braces, and eight stacked and reinforced locking walls), which can:
   a) Be mechanically punched in the eight-stacked-and-reinforced-handle eight-stacked-and-reinforced-latch biodegradable bag, to make the eight-stacked-and-reinforced-handle eight-stacked-and-reinforced-latch biodegradable bag and all its stacked and reinforced components function as one unit,
   b) Have no separate components to keep production cost affordable,
   c) Have no separate components to ship and store,
   d) Have no separate components to lose, and
   e) Have no separate components to assemble.

Therefore, the unique eight-stacked-and-reinforced-handle eight-stacked-and-reinforced-latch biodegradable bag can:
   a) Provide the eight-stacked-and-reinforced-handle eight-stacked-and-reinforced-latch biodegradable bag, with all its stacked and reinforced components mechanically punched therein, as one unit,
   b) Provide the eight-stacked-and-reinforced-handle eight-stacked-and-reinforced-latch biodegradable bag, with all its stacked and reinforced components, affordably produced,
   c) Provide the eight-stacked-and-reinforced-handle eight-stacked-and-reinforced-latch biodegradable bag, with all its stacked and reinforced components, easily shipped and stored,
   d) Provide the eight-stacked-and-reinforced-handle eight-stacked-and-reinforced-latch biodegradable bag, with all its stacked and reinforced components punched therein, having no separate components to lose, and
   e) Provide the eight-stacked-and-reinforced-handle eight-stacked-and-reinforced-latch biodegradable bag, with all its stacked and reinforced components punched therein, requiring no assembly.

Other objects and advantages of the present invention will become apparent from a consideration of the accompanying drawings and ensuing description.

BRIEF DESCRIPTION OF THE DRAWINGS

FIGS. 3, 4, 5, 6A, 6B, and 6C illustrate perspective views of a unique eight-stacked-reinforced-handle eight-stacked-and-reinforced-latch biodegradable bag, having eight stacked-reinforced handles, eight triple-locking latches, six double-locking doors, two triple-locking braces, and eight quadruple-locking walls (for stacking the eight stacked-reinforced handles on one another, for locking the eight stacked-reinforced handles together to reinforce them, and for sealing the unique eight-stacked-reinforced-handle eight-stacked-and-reinforced-latch biodegradable bag securely).

FIGS. 7A, 7B, 7C, 7D, 7E, 7F, 7G, 7H, 7I, 7J, 7K, 7L, 7M, and 7N illustrate top and cross-sectional views of first method for folding, stacking, and locking eight stacked-reinforced handles together, to reinforce them and to seal the unique eight-stacked-reinforced-handle eight-stacked-and-reinforced-latch biodegradable bag securely.

FIGS. 8A, 8B, 8C, 8D, 8E, 8F, 8G, 8H, 8I, 8J, 8K, 8L, 8M, 8N, and 8O illustrate top and cross-sectional views of second method for folding, stacking, and locking eight stacked-reinforced handles together, to reinforce them and to seal the unique eight-stacked-reinforced-handle eight-stacked-and-reinforced-latch biodegradable bag securely.

FIG. 9 illustrates a top view of first method for picking up to transport the unique eight-stacked-reinforced-handle eight-stacked-and-reinforced-latch biodegradable bag.

FIG. 10 illustrates a top view of second method for picking up to transport the unique biodegradable eight-stacked-reinforced-handle bag.

FIG. 14 illustrates a top view of a biodegradable flap and a biodegradable glue to glue the biodegradable flap to the unique eight-stacked-reinforced-handle eight-stacked-and-reinforced-latch biodegradable bag.

FIGS. 15A, 15B, and 15C illustrate the top sections of the unique eight-stacked-reinforced-handle eight-stacked-and-reinforced-latch biodegradable bag functioning as a long and broad funnel.

SUMMARY OF THE INVENTION

Figure 1:
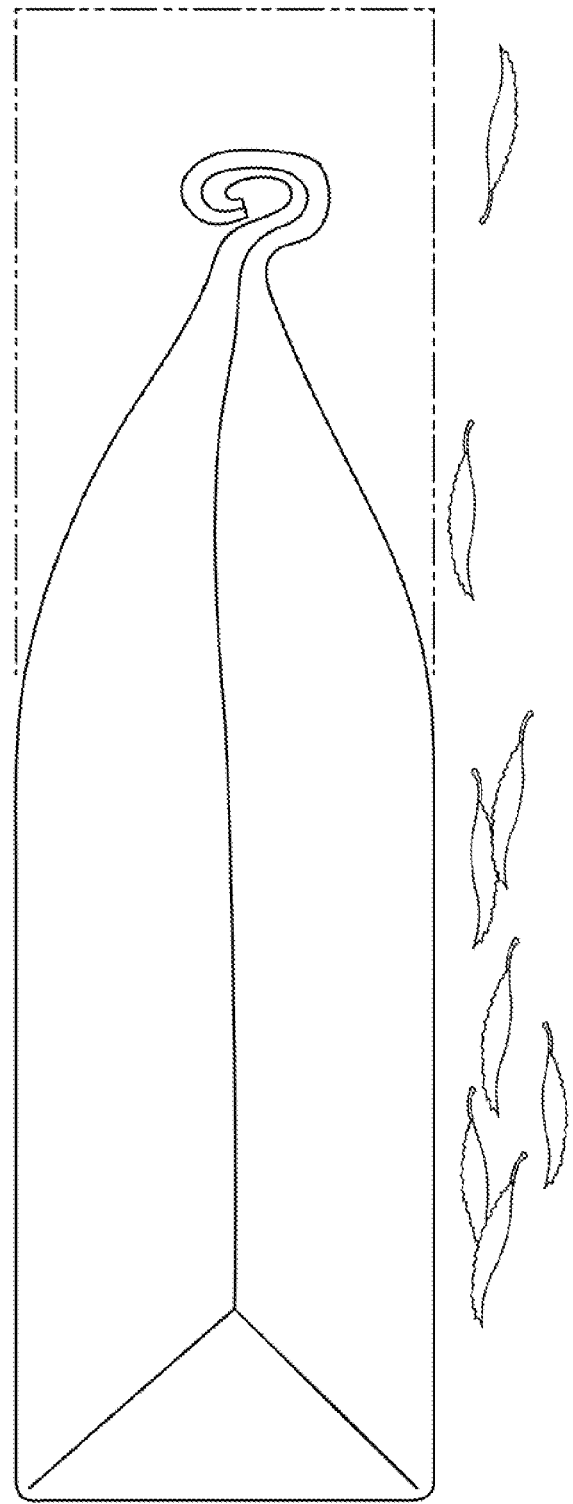
FIGS. 1 (Prior art) and 2 (Prior art) illustrate the disadvantages of the prior art.
Figure 2:
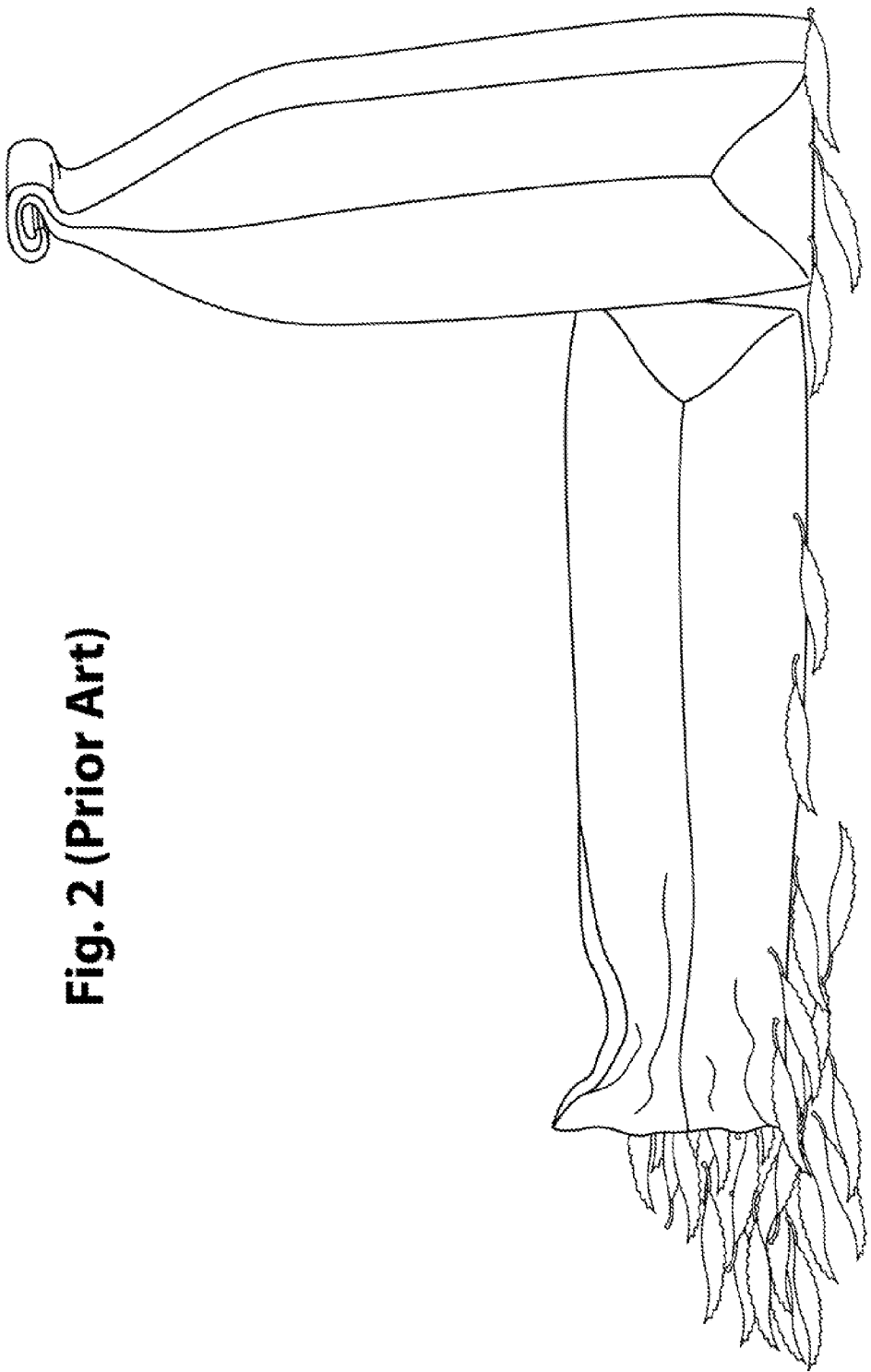
Figure 3:
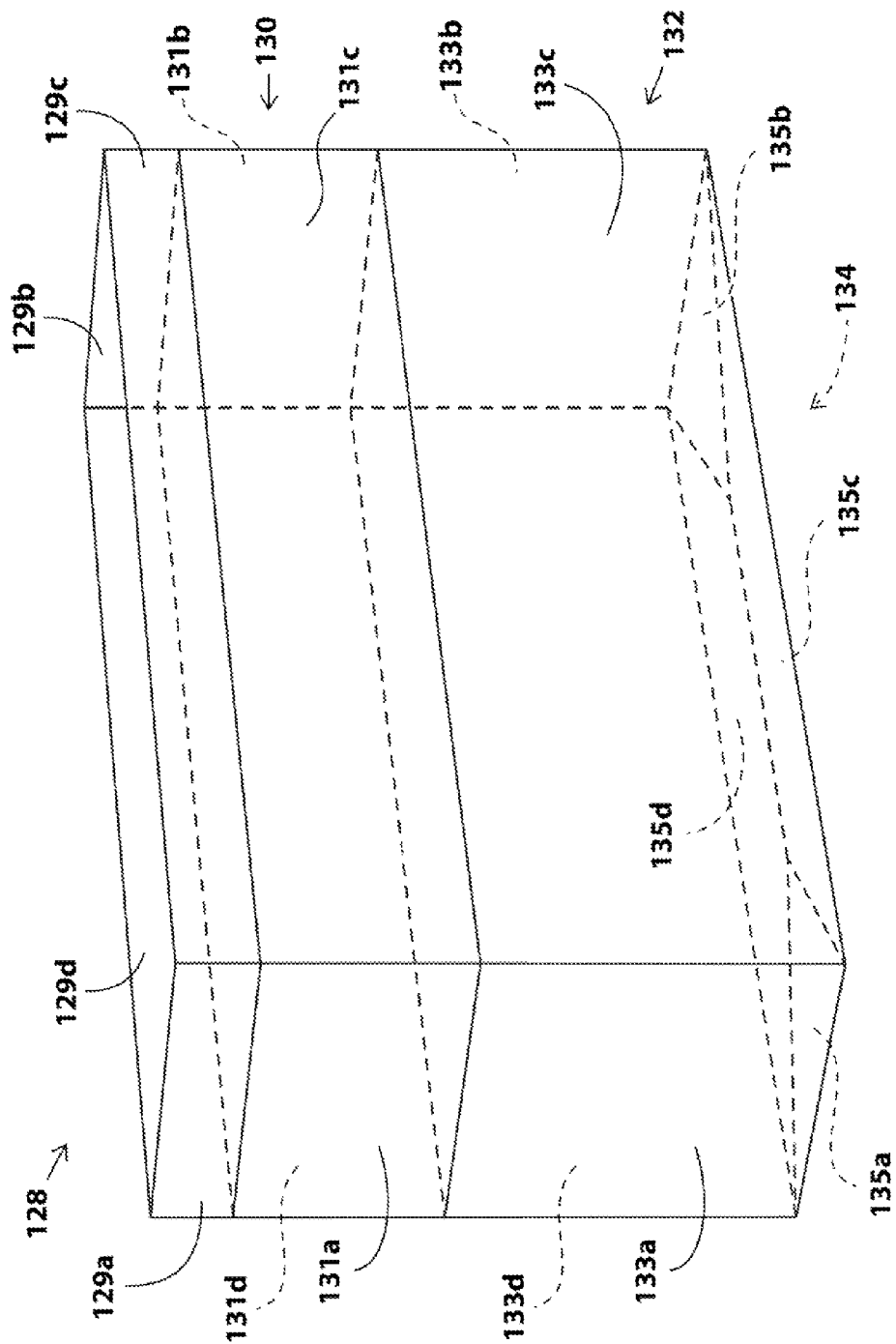
Figure 4:
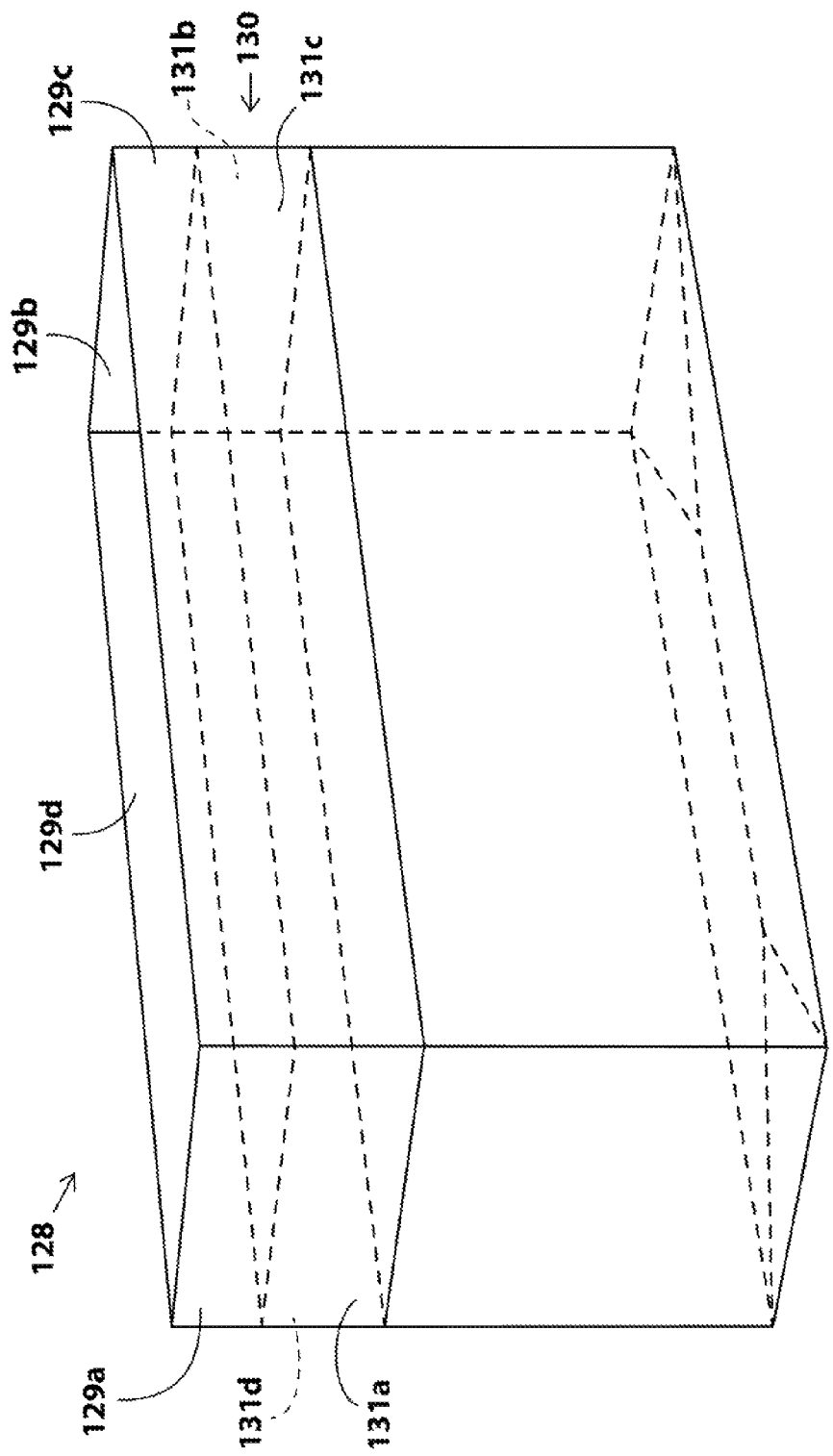
Figure 5:
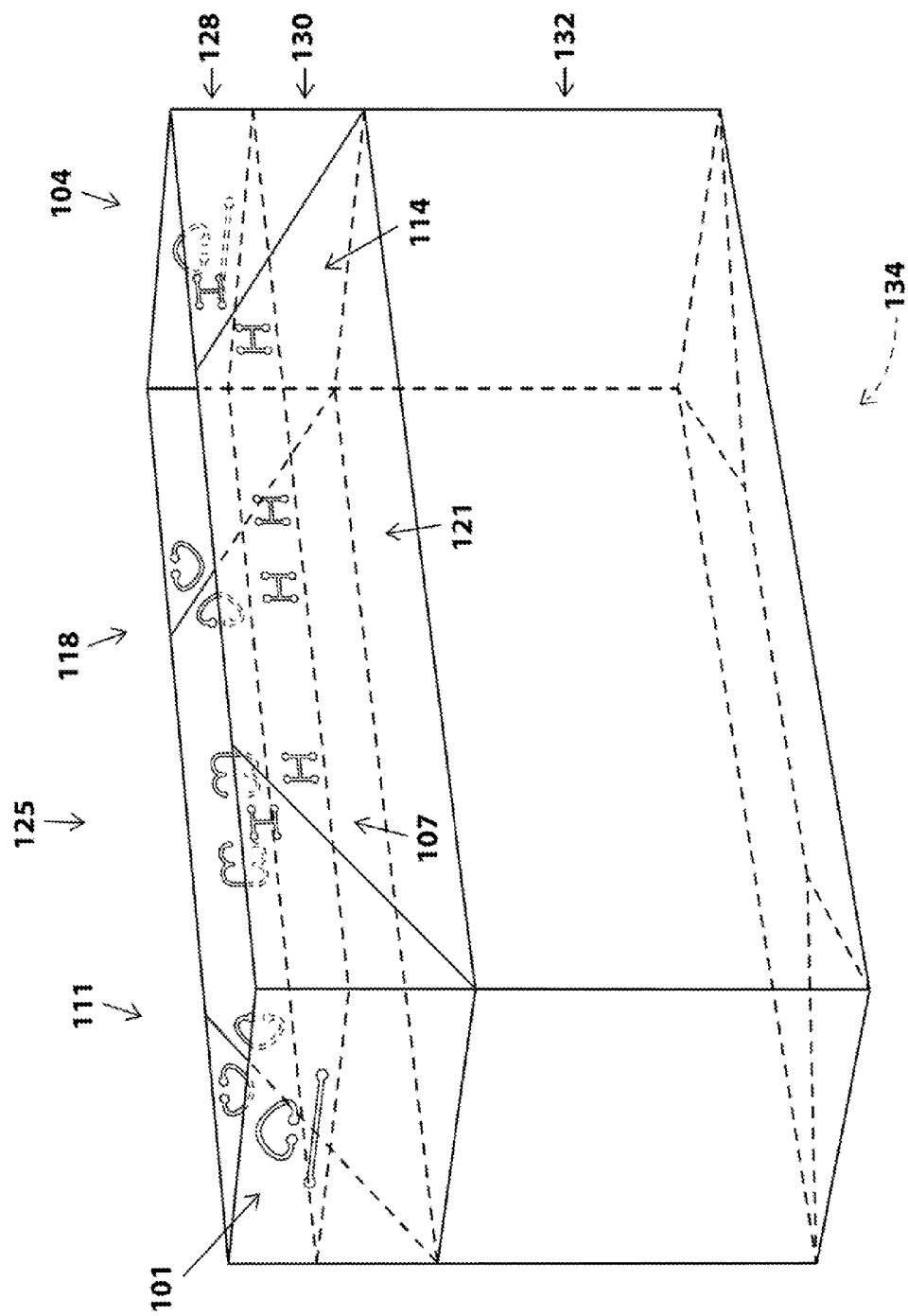

A unique eight-stacked-reinforced-handle eight-stacked-and-reinforced-latch biodegradable bag comprises top sections, body sections attached to the top sections, and bottom sections attached to the body sections, respectively. The bottom sections are attached together. The unique eight-stacked-and-reinforced-handle eight-stacked-and-reinforced-latch biodegradable bag has a plurality of openings mechanically punched in the top sections, to form eight handles and two locking braces next to the openings, to form eight locking latches and two locking doors inside the openings, and to form eight locking walls around the openings, respectively.

The top sections are folded to stack and reinforce the eight handles, the eight locking latches, the two locking doors, the two locking braces, and the eight locking walls, respectively. The eight locking latches are pushed through the openings to lock together the eight handles, the eight locking latches, the two locking doors, the two locking braces, and the eight locking walls, and to lock together the top sections, respectively, to seal the unique eight-stacked-and-reinforced-handle eight-stacked-and-reinforced-latch biodegradable bag, securely.

DETAILED DESCRIPTION OF THE INVENTION

Component

Referring to FIGS. 3, 4, 5, 6A, 6B, and 6C, a unique eight-stacked-reinforced-handle eight-stacked-and-reinforced-latch biodegradable bag, having eight stacked and reinforced handles, eight stacked and reinforced triple-locking latches, six stacked and reinforced double-locking doors, two stacked and reinforced triple-locking braces, and eight stacked and reinforced quadruple-locking walls (all of which are stacked on one another, reinforced, and locked together as one unit, to efficiently seal the unique eight-stacked-reinforced-handle eight-stacked-and-reinforced-latch biodegradable bag securely, and to efficiently carry the content of the unique eight-stacked-reinforced-handle eight-stacked-and-reinforced-latch biodegradable bag), comprises:

1) Left-side triple-locking-latch handle system 101 comprising:
2) Left-side handle 102a,
3) Left-side first handle opening 102b,
4) Left-side second handle opening 102c,
5) Left-side triple-locking latch 103a,
6) Left-side triple-locking brace 103b;
7) Right-side triple-locking-latch handle system 104, comprising:
8) Right-side handle 105a,
9) Right-side first handle opening 105b,
10) Right-side second handle opening 105c,
11) Right-side triple-locking latch 106a,
12) Right-side triple-locking brace 106b;
13) Left-front quadruple-locking-wall double-locking-door handle system 107, comprising:
14) Left-front handle 108a,
15) Left-front first handle opening 108b,
16) Left-front second handle opening 108c,
17) Left-front first quadruple-locking walls 109a,
18) Left-front second quadruple-locking walls 109b,
19) Left-front first double-locking doors 110a,
20) Left-front second double-locking doors 110b;
21) Left-rear triple-locking-latch handle system 111, comprising:
22) Left-rear handle 112a,
23) Left-rear first handle opening 112b,
24) Left-rear second handle opening 112c,
25) Left-rear first triple-locking latch 113a,
26) Left-rear second triple-locking latch 113b;
27) Right-front quadruple-locking-wall double-locking-door handle system 114, comprising:
28) Right-front handle 115a,
29) Right-front first handle opening 115b,
30) Right-front second handle opening 115c,
31) Right-front first quadruple-locking walls 116a,
32) Right-front second quadruple-locking walls 116b,
33) Right-front first double-locking doors 117a,
34) Right-front second double-locking doors 117b;
35) Right-rear triple-locking-latch handle system 118, comprising:
36) Right-rear handle 119a,
37) Right-rear first handle opening 119b,
38) Right-rear second handle opening 119c,
39) Right-rear first triple-locking latch 120a,
40) Right-rear second triple-locking latch 120b;
41) Middle-front quadruple-locking-wall double-locking-door handle system 121, comprising:
42) Middle-front handle 122a,
43) Middle-front first handle opening 122b,
44) Middle-front second handle opening 122c,
45) Middle-front first quadruple-locking walls 123a,
46) Middle-front second quadruple-locking walls 123b,
47) Middle-front first double-locking doors 124a,
48) Middle-front second double-locking doors 124b;
49) Middle-rear springable-quadruple-locking-latch handle system 125, comprising:
50) Middle-rear handle 126a,
51) Middle-rear first handle opening 126b,
52) Middle-rear second handle opening 126c,
53) Middle-rear first springable-quadruple-locking latch 127a,
54) Middle-rear second springable-quadruple-locking latch 127b;
55) Reinforcing-strip system 128, comprising:
56) Reinforcing-strip left section 129a,
57) Reinforcing-strip right section 129b,
58) Reinforcing-strip front section 129c,
59) Reinforcing-strip rear section 129d;
60) Bag-top system 130, comprising:
61) Bag-top left section 131a,
62) Bag-top right section 131b,
63) Bag-top front section 131c,
64) Bag-top rear section 131d;
65) Bag-body system 132, comprising:
66) Bag-body left section 133a,
67) Bag-body right section 133b,
68) Bag-body front section 133c,
69) Bag-body rear section 133d; and
70) Bag-bottom system 134, comprising:
71) Bag-bottom left section 135a, 72) Bag-bottom right section 135*b*,
73) Bag-bottom front section 135*c*,
74) Bag-bottom rear section 135*d*.

Material

Referring to FIGS. 3, 4, 5, 6A, 6B, and 6C:
1) Left-side triple-locking-latch handle system 101 is made of the combined materials of its components.
2) Left-side handle 102*a* is made of biodegradable wooden dust, fiber, pulp, powder, or paste.
3) Left-side first handle opening 102*b* is made of empty space.
4) Left-side second handle opening 102*c* is made of empty space.
5) Left-side triple-locking latch 103*a* is made of biodegradable wooden dust, fiber, pulp, powder, or paste.
6) Left-side triple-locking brace 103*b* is made of biodegradable wooden dust, fiber, pulp, powder, or paste.
7) Right-side triple-locking-latch handle system 104 is made of the combined materials of its components.
8) Right-side handle 105*a* is made of biodegradable wooden dust, fiber, pulp, powder, or paste.
9) Right-side first handle opening 105*b* is made of empty space.
10) Right-side second handle opening 105*c* is made of empty space.
11) Right-side triple-locking latch 106*a* is made of biodegradable wooden dust, fiber, pulp, powder, or paste.
12) Right-side triple-locking brace 106*b* is made of biodegradable wooden dust, fiber, pulp, powder, or paste.
13) Left-front quadruple-locking-wall double-locking-door handle system 107 is made of the combined materials of its components.
14) Left-front handle 108*a* is made of biodegradable wooden dust, fiber, pulp, powder, or paste.
15) Left-front first handle opening 108*b* is made of empty space.
16) Left-front second handle opening 108*c* is made of empty space.
17) Left-front first quadruple-locking walls 109*a* each are made of biodegradable wooden dust, fiber, pulp, powder, or paste.
18) Left-front second quadruple-locking walls 109*b* each are made of biodegradable wooden dust, fiber, pulp, powder, or paste.
19) Left-front first double-locking doors 110*a* each are made of biodegradable wooden dust, fiber, pulp, powder, or paste.
20) Left-front second double-locking doors 110*b* each are made of biodegradable wooden dust, fiber, pulp, powder, or paste.
21) Left-rear triple-locking-latch handle system 111 is made of the combined materials of its components.
22) Left-rear handle 112*a* is made of biodegradable wooden dust, fiber, pulp, powder, or paste.
23) Left-rear first handle opening 112*b* is made of empty space.
24) Left-rear second handle opening 112*c* is made of empty space.
25) Left-rear first triple-locking latch 113*a* is made of biodegradable wooden dust, fiber, pulp, powder, or paste.
26) Left-rear second triple-locking latch 113*b* is made of biodegradable wooden dust, fiber, pulp, powder, or paste.
27) Right-front quadruple-locking-wall double-locking-door handle system 114 is made of the combined materials of its components.
28) Right-front handle 115*a* is made of biodegradable wooden dust, fiber, pulp, powder, or paste.
29) Right-front first handle opening 115*b* is made of empty space.
30) Right-front second handle opening 115*c* is made of empty space.
31) Right-front first quadruple-locking walls 116*a* each are made of biodegradable wooden dust, fiber, pulp, powder, or paste.
32) Right-front second quadruple-locking walls 116*b* each are made of biodegradable wooden dust, fiber, pulp, powder, or paste.
33) Right-front first double-locking doors 117*a* each are made of biodegradable wooden dust, fiber, pulp, powder, or paste.
34) Right-front second double-locking doors 117*b* each are made of biodegradable wooden dust, fiber, pulp, powder, or paste.
35) Right-rear triple-locking-latch handle system 118 is made of the combined materials of its components.
36) Right-rear handle 119*a* is made of biodegradable wooden dust, fiber, pulp, powder, or paste.
37) Right-rear first handle opening 119*b* is made of empty space.
38) Right-rear second handle opening 119*c* is made of empty space.
39) Right-rear first triple-locking latch 120*a* is made of biodegradable wooden dust, fiber, pulp, powder, or paste.
40) Right-rear second triple-locking latch 120*b* is made of biodegradable wooden dust, fiber, pulp, powder, or paste.
41) Middle-front quadruple-locking-wall double-locking-door handle system 121 is made of the combined materials of its components.
42) Middle-front handle 122*a* is made of biodegradable wooden dust, fiber, pulp, powder, or paste.
43) Middle-front first handle opening 122*b* is made of empty space.
44) Middle-front second handle opening 122*c* is made of empty space.
45) Middle-front first quadruple-locking walls 123*a* each are made of biodegradable wooden dust, fiber, pulp, powder, or paste.
46) Middle-front second quadruple-locking walls 123*b* each are made of biodegradable wooden dust, fiber, pulp, powder, or paste.
47) Middle-front first double-locking doors 124*a* each are made of biodegradable wooden dust, fiber, pulp, powder, or paste.
48) Middle-front second double-locking doors 124*b* each are made of biodegradable wooden dust, fiber, pulp, powder, or paste.
49) Middle-rear springable-quadruple-locking-latch handle system 125 is made of the combined materials of its components.
50) Middle-rear handle 126*a* is made of biodegradable wooden dust, fiber, pulp, powder, or paste.
51) Middle-rear first handle opening 126*b* is made of empty space.
52) Middle-rear second handle opening 126*c* is made of empty space.
53) Middle-rear first springable-quadruple-locking latch 127*a* is made of biodegradable wooden dust, fiber, pulp, powder, or paste.
54) Middle-rear second springable-quadruple-locking latch 127*b* is made of biodegradable wooden dust, fiber, pulp, powder, or paste.
55) Reinforcing-strip system 128 is made of the combined materials of its components.

56) Reinforcing-strip left section 129*a* is made of biodegradable wooden dust, fiber, pulp, powder, or paste.
57) Reinforcing-strip right section 129*b* is made of biodegradable wooden dust, fiber, pulp, powder, or paste.
58) Reinforcing-strip front section 129*c* is made of biodegradable wooden dust, fiber, pulp, powder, or paste.
59) Reinforcing-strip rear section 129*d* is made of biodegradable wooden dust, fiber, pulp, powder, or paste.
60) Bag-top system 130 is made of the combined materials of its components.
61) Bag-top left section 131*a* is made of biodegradable wooden dust, fiber, pulp, powder, or paste.
62) Bag-top right section 131*b* is made of biodegradable wooden dust, fiber, pulp, powder, or paste.
63) Bag-top front section 131*c* is made of biodegradable wooden dust, fiber, pulp, powder, or paste.
64) Bag-top rear section 131*d* is made of biodegradable wooden dust, fiber, pulp, powder, or paste.
65) Bag-body system 132 is made of the combined materials of its components.
66) Bag-body left section 133*a* is made of biodegradable wooden dust, fiber, pulp, powder, or paste.
67) Bag-body right section 133*b* is made of biodegradable wooden dust, fiber, pulp, powder, or paste.
68) Bag-body front section 133*c* is made of biodegradable wooden dust, fiber, pulp, powder, or paste.
69) Bag-body rear section 133*d* is made of biodegradable wooden dust, fiber, pulp, powder, or paste.
70) Bag-bottom system 134 is made of the combined materials of its components.
71) Bag-bottom left section 135*a* is made of biodegradable wooden dust, fiber, pulp, powder, or paste.
72) Bag-bottom right section 135*b* is made of biodegradable wooden dust, fiber, pulp, powder, or paste.
73) Bag-bottom front section 135*c* is made of biodegradable wooden dust, fiber, pulp, powder, or paste.
74) Bag-bottom rear section 135*d* is made of biodegradable wooden dust, fiber, pulp, powder, or paste.

Shape

Referring to FIGS. 3, 4, 5, 6A, 6B, and 6C:
1) Left-side triple-locking-latch handle system 101 has the combined shapes of its components.
2) Left-side handle 102*a* has a rectangular shape.
3) Left-side first handle opening 102*b* has a dumbbell shape.
4) Left-side second handle opening 102*c* has a triangular shape.
5) Left-side triple-locking latch 103*a* has a triangular shape.
6) Left-side triple-locking brace 103*b* has a bridge shape.
7) Right-side triple-locking-latch handle system 104 has the combined shapes of its components.
8) Right-side handle 105*a* has a rectangular shape.
9) Right-side first handle opening 105*b* has a dumbbell shape.
10) Right-side second handle opening 105*c* has a triangular shape.
11) Right-side triple-locking latch 106*a* has a triangular shape.
12) Right-side triple-locking brace 106*b* has a bridge shape.
13) Left-front quadruple-locking-wall double-locking-door handle system 107 has the combined shapes of its components.
14) Left-front handle 108*a* has a rectangular shape.
15) Left-front first handle opening 108*b* has a rectangular shape.
16) Left-front second handle opening 108*c* has a rectangular shape.
17) Left-front first quadruple-locking walls 109*a* each have a rectangular shape.
18) Left-front second quadruple-locking walls 109*b* each have a rectangular shape.
19) Left-front first double-locking doors 110*a* each have a rectangle shape.
20) Left-front second double-locking doors 110*b* each have a rectangle shape.
21) Left-rear triple-locking-latch handle system 111 has the combined shapes of its components.
22) Left-rear handle 112*a* has a rectangular shape.
23) Left-rear first handle opening 112*b* has a triangular shape.
24) Left-rear second handle opening 112*c* has a triangular shape.
25) Left-rear first triple-locking latch 113*a* has a triangular shape.
26) Left-rear second triple-locking latch 113*b* has a triangular shape.
27) Right-front quadruple-locking-wall double-locking-door handle system 114 has the combined shapes of its components.
28) Right-front handle 115*a* has a rectangular shape.
29) Right-front first handle opening 115*b* has a rectangular shape.
30) Right-front second handle opening 115*c* has a rectangular shape.
31) Right-front first quadruple-locking walls 116*a* each have a rectangular shape.
32) Right-front second quadruple-locking walls 116*b* each have a rectangular shape.
33) Right-front first double-locking doors 117*a* each have a rectangle shape.
34) Right-front second double-locking doors 117*b* each have a rectangle shape.
35) Right-rear triple-locking-latch handle system 118 has the combined shapes of its components.
36) Right-rear handle 119*a* has a rectangular shape.
37) Right-rear first handle opening 119*b* has a triangular shape.
38) Right-rear second handle opening 119*c* has a triangular shape.
39) Right-rear first triple-locking latch 120*a* has a triangular shape.
40) Right-rear second triple-locking latch 120*b* has a triangular shape.
41) Middle-front quadruple-locking-wall double-locking-door handle system 121 has the combined shapes of its components.
42) Middle-front handle 122*a* has a rectangular shape.
43) Middle-front first handle opening 122*b* has a rectangular shape.
44) Middle-front second handle opening 122*c* has a rectangular shape.
45) Middle-front first quadruple-locking walls 123*a* each have a rectangular shape.
46) Middle-front second quadruple-locking walls 123*b* each have a rectangular shape.
47) Middle-front first double-locking doors 124*a* each have a rectangle shape.
48) Middle-front second double-locking doors 124*b* each have a rectangle shape.
49) Middle-rear springable-quadruple-locking-latch handle system 125 has the combined shapes of its components.
50) Middle-rear handle 126*a* has a rectangular shape.
51) Middle-rear first handle opening 126*b* has a triangular shape.

52) Middle-rear second handle opening 126c has a triangular shape.
53) Middle-rear first springable-quadruple-locking latch 127a has a double-rectangle shape.
54) Middle-rear second springable-quadruple-locking latch 127b has a double-rectangle shape.
55) Reinforcing-strip system 128 has the combined shapes of its components.
56) Reinforcing-strip left section 129a has a rectangular shape.
57) Reinforcing-strip right section 129b has a rectangular shape.
58) Reinforcing-strip front section 129c has a rectangular shape.
59) Reinforcing-strip rear section 129d has a rectangular shape.
60) Bag-top system 130 has the combined shapes of its components.
61) Bag-top left section 131a has a rectangular shape.
62) Bag-top right section 131b has a rectangular shape.
63) Bag-top front section 131c has a rectangular shape.
64) Bag-top rear section 131d has a rectangular shape.
65) Bag-body system 132 has the combined shapes of its components.
66) Bag-body left section 133a has a rectangular shape.
67) Bag-body right section 133b has a rectangular shape.
68) Bag-body front section 133c has a rectangular shape.
69) Bag-body rear section 133d has a rectangular shape.
70) Bag-bottom system 134 has the combined shapes of its components.
71) Bag-bottom left section 135a has a rectangular shape.
72) Bag-bottom right section 135b has a rectangular shape.
73) Bag-bottom front section 135c has a rectangular shape.
74) Bag-bottom rear section 135d has a rectangular shape.

Connection

Referring to FIGS. 3, 4, 5, 6A, 6B, and 6C:
1) Left-side triple-locking-latch handle system 101 is punched in reinforcing-strip left section 129a and bag-top left section 131a.
2) Left-side handle 102a is punched in reinforcing-strip left section 129a and bag-top left section 131a.
3) Left-side first handle opening 102b is punched in reinforcing-strip left section 129a and bag-top left section 131a, on one side of left-side handle 102a.
4) Left-side second handle opening 102c is punched in reinforcing-strip left section 129a and bag-top left section 131a, on another side of left-side handle 102a.
5) Left-side triple-locking latch 103a is punched in reinforcing-strip left section 129a and bag-top left section 131a, inside left-side second handle opening 102c.
6) Left-side triple-locking brace 103b is punched in reinforcing-strip left section 129a and bag-top left section 131a, next to left-side second handle opening 102c.
7) Right-side triple-locking-latch handle system 104 is punched in reinforcing-strip right section 129b and bag-top right section 131b.
8) Right-side handle 105a is punched in reinforcing-strip right section 129b and bag-top right section 131b.
9) Right-side first handle opening 105b is punched in reinforcing-strip right section 129b and bag-top right section 131b, on one side of right-side handle 105a.
10) Right-side second handle opening 105c is punched in reinforcing-strip right section 129b and bag-top right section 131b, on another side of right-side handle 105a.
11) Right-side triple-locking latch 106a is punched in reinforcing-strip right section 129b and bag-top right section 131b, inside right-side second handle opening 105c.
12) Right-side triple-locking brace 106b is punched in reinforcing-strip right section 129b and bag-top right section 131b, next to right-side second handle opening 105c.
13) Left-front quadruple-locking-wall double-locking-door handle system 107 is punched in reinforcing-strip front section 129c and bag-top front section 131c.
14) Left-front handle 108a is punched in reinforcing-strip front section 129c and bag-top front section 131c.
15) Left-front first handle opening 108b is punched in reinforcing-strip front section 129c and bag-top front section 131c, on one side of left-front handle 108a.
16) Left-front second handle opening 108c is punched in reinforcing-strip front section 129c and bag-top front section 131c, on another side of left-front handle 108a.
17) Left-front first quadruple-locking walls 109a each are attached to left-front first handle opening 108b.
18) Left-front second quadruple-locking walls 109b each are attached to left-front second handle opening 108c.
19) Left-front first double-locking doors 110a each are punched inside left-front first handle opening 108b.
20) Left-front second double-locking doors 110b each are punched inside left-front second handle opening 108c.
21) Left-rear triple-locking-latch handle system 111 is punched in reinforcing-strip rear section 129d and bag-top rear section 131d.
22) Left-rear handle 112a is punched in reinforcing-strip rear section 129d and bag-top rear section 131d.
23) Left-rear first handle opening 112b is punched in reinforcing-strip rear section 129d and bag-top rear section 131d, on one side of left-rear handle 112a.
24) Left-rear second handle opening 112c is punched in reinforcing-strip rear section 129d and bag-top rear section 131d, on another side of left-rear handle 112a.
25) Left-rear first triple-locking latch 113a is punched inside left-rear first handle opening 112b.
26) Left-rear second triple-locking latch 113b is punched inside left-rear second handle opening 112c.
27) Right-front quadruple-locking-wall double-locking-door handle system 114 is punched in reinforcing-strip front section 129c and bag-top front section 131c.
28) Right-front handle 115a is punched in reinforcing-strip front section 129c and bag-top front section 131c.
29) Right-front first handle opening 115b is punched in reinforcing-strip front section 129c and bag-top front section 131c, on one side of right-front handle 115a.
30) Right-front second handle opening 115c is punched in reinforcing-strip front section 129c and bag-top front section 131c, on another side of right-front handle 115a.
31) Right-front first quadruple-locking walls 116a each are attached to right-front first handle opening 115b.
32) Right-front second quadruple-locking walls 116b each are attached to right-front second handle opening 115c.
33) Right-front first double-locking doors 117a each are punched inside right-front first handle opening 115b.
34) Right-front second double-locking doors 117b each are punched inside right-front second handle opening 115c.
35) Right-rear triple-locking-latch handle system 118 is punched in reinforcing-strip rear section 129d and bag-top rear section 131d.
36) Right-rear handle 119a is punched in reinforcing-strip rear section 129d and bag-top rear section 131d.
37) Right-rear first handle opening 119b is punched in reinforcing-strip rear section 129d and bag-top rear section 131d, on one side of right-rear handle 119a.

38) Right-rear second handle opening 119c is punched in reinforcing-strip rear section 129d and bag-top rear section 131d, on another side of right-rear handle 119a.
39) Right-rear first triple-locking latch 120a is punched inside right-rear first handle opening 119b.
40) Right-rear second triple-locking latch 120b is punched inside right-rear second handle opening 119c.
41) Middle-front quadruple-locking-wall double-locking-door handle system 121 is punched in reinforcing-strip front section 129c and bag-top front section 131c.
42) Middle-front handle 122a is punched in reinforcing-strip front section 129c and bag-top front section 131c.
43) Middle-front first handle opening 122b is punched in reinforcing-strip front section 129c and bag-top front section 131c, on one side of middle-front handle 122a.
44) Middle-front second handle opening 122c is punched in reinforcing-strip front section 129c and bag-top front section 131c, on another side of middle-front handle 122a.
45) Middle-front first quadruple-locking walls 123a each are attached to middle-front first handle opening 122b.
46) Middle-front second quadruple-locking walls 123b each are attached to middle-front second handle opening 122c.
47) Middle-front first double-locking doors 124a each are punched inside middle-front first handle opening 122b.
48) Middle-front second double-locking doors 124b each are punched inside middle-front second handle opening 122c.
49) Middle-rear springable-quadruple-locking-latch handle system 125 is punched in reinforcing-strip rear section 129d and bag-top rear section 131d.
50) Middle-rear handle 126a is punched in reinforcing-strip rear section 129d and bag-top rear section 131d.
51) Middle-rear first handle opening 126b is punched in reinforcing-strip rear section 129d and bag-top rear section 131d, on one side of middle-rear handle 126a.
52) Middle-rear second handle opening 126c is punched in reinforcing-strip rear section 129d and bag-top rear section 131d, on another side of middle-rear handle 126a.
53) Middle-rear first springable-quadruple-locking latch 127a is punched in reinforcing-strip rear section 129d and bag-top rear section 131d, inside middle-rear first handle opening 126b.
54) Middle-rear second springable-quadruple-locking latch 127b is punched in reinforcing-strip rear section 129d and bag-top rear section 131d, inside middle-rear second handle opening 126c.
55) Reinforcing-strip system 128 is attached or glued to bag-top system 130.
56) Reinforcing-strip left section 129a is attached or glued to bag-top left section 131a.
57) Reinforcing-strip right section 129b is attached or glued to bag-top right section 131b.
58) Reinforcing-strip front section 129c is attached or glued to bag-top front section 131c.
59) Reinforcing-strip rear section 129d is attached or glued to bag-top rear section 131d.
60) Bag-top system 130 is attached or glued to bag-body system 132.
61) Bag-top left section 131a is attached or glued to bag-top rear section 131d.
62) Bag-top right section 131b is attached or glued to bag-top front section 131c.
63) Bag-top front section 131c is attached or glued to bag-top left section 131a.
64) Bag-top rear section 131d is attached or glued to bag-top right section 131b.
65) Bag-body system 132 is attached or glued to bag-bottom system 134.
66) Bag-body left section 133a is attached or glued to bag-body rear section 133d.
67) Bag-body right section 133b is attached or glued to bag-body front section 133c.
68) Bag-body front section 133c is attached or glued to bag-body left section 133a.
69) Bag-body rear section 133d is attached or glued to bag-body right section 133b.
70) Bag-bottom system 134 is attached or glued to bag-body system 132.
71) Bag-bottom left section 135a is attached or glued to bag-bottom rear section 135d.
72) Bag-bottom right section 135b is attached or glued to bag-bottom front section 135c.
73) Bag-bottom front section 135c is attached or glued to bag-bottom left section 135a.
74) Bag-bottom rear section 135d is attached or glued to bag-bottom right section 135b.

Function

Referring to FIGS. 3, 4, 5, 6A, 6B, and 6C:
1) Left-side triple-locking-latch handle system 101 is for:
Triple-locking left-side handle 102a in place,
Triple-locking left-front handle 108a in place;
Triple-locking left-rear handle 112a in place;
Triple-locking bag-top left section 131a in place;
Triple-locking bag-top front section 131c in place;
Triple-locking bag-top rear section 131d in place;
Triple-locking left-rear first triple-locking latch 113a in place;
Triple-locking left-rear second triple-locking latch 113b in place.
2) Left-side handle 102a is for being held on to pick up and transport the unique bag.
3) Left-side first handle opening 102b is for inserting fingers through to pick up and transport the unique bag.
4) Left-side second handle opening 102c for inserting fingers through to pick up and transport the unique bag.
5) Left-side triple-locking latch 103a is for:
Triple-locking left-side handle 102a in place,
Triple-locking left-front handle 108a in place;
Triple-locking left-rear handle 112a in place;
Triple-locking bag-top left section 131a in place;
Triple-locking bag-top front section 131c in place;
Triple-locking bag-top rear section 131d in place.
6) Left-side triple-locking brace 103b is for:
Triple-locking left-rear first triple-locking latch 113a in place;
Triple-locking left-rear second triple-locking latch 113b in place;
Triple-locking left-side handle 102a in place,
Triple-locking left-front handle 108a in place;
Triple-locking left-rear handle 112a in place;
Triple-locking bag-top left section 131a in place;
Triple-locking bag-top front section 131c in place;
Triple-locking bag-top rear section 131d in place.
7) Right-side triple-locking-latch handle system 104 is for:
Triple-locking right-side handle 105a in place,
Triple-locking right-front handle 115a in place;
Triple-locking right-rear handle 119a in place;
Triple-locking bag-top right section 131b in place;
Triple-locking bag-top front section 131c in place;
Triple-locking bag-top rear section 131d in place;
Triple-locking right-rear first triple-locking latch 120a in place;

Triple-locking right-rear second triple-locking latch 120b in place.
8) Right-side handle 105a is for being held on to pick up and transport the unique bag.
9) Right-side first handle opening 105b is for inserting fingers through to pick up and transport the unique bag.
10) Right-side second handle opening 105c is for inserting fingers through to pick up and transport the unique bag.
11) Right-side triple-locking latch 106a is for:
   Triple-locking right-side handle 105a in place,
   Triple-locking right-front handle 115a in place;
   Triple-locking right-rear handle 119a in place;
   Triple-locking bag-top right section 131b in place;
   Triple-locking bag-top front section 131c in place;
   Triple-locking bag-top rear section 131d in place.
12) Right-side triple-locking brace 106b is for:
   Triple-locking right-rear first triple-locking latch 120a in place;
   Triple-locking right-rear second triple-locking latch 120b in place;
   Triple-locking right-side handle 105a in place,
   Triple-locking right-front handle 115a in place;
   Triple-locking right-rear handle 119a in place;
   Triple-locking bag-top right section 131b in place;
   Triple-locking bag-top front section 131c in place;
   Triple-locking bag-top rear section 131d in place.
13) Left-front quadruple-locking-wall double-locking-door handle system 107 is for:
   Quadruple-locking left-rear first triple-locking latch 113a in place;
   Quadruple-locking left-rear second triple-locking latch 113b in place;
   Double-locking left-rear first triple-locking latch 113a in place;
   Double-locking left-rear second triple-locking latch 113b in place;
   Triple-locking left-side handle 102a in place,
   Triple-locking left-front handle 108a in place;
   Triple-locking left-rear handle 112a in place;
   Triple-locking bag-top left section 131a in place;
   Triple-locking bag-top front section 131c in place;
   Triple-locking bag-top rear section 131d in place.
14) Left-front handle 108a is for being held on to pick up and transport the unique bag.
15) Left-front first handle opening 108b is for inserting fingers through to pick up and transport the unique bag.
16) Left-front second handle opening 108c is for inserting fingers through to pick up and transport the unique bag.
17) Left-front first quadruple-locking walls 109a each are for:
   Quadruple-locking left-rear first triple-locking latch 113a in place;
   Quadruple-locking left-rear second triple-locking latch 113b in place.
18) Left-front second quadruple-locking walls 109b each are for:
   Quadruple-locking left-rear first triple-locking latch 113a in place;
   Quadruple-locking left-rear second triple-locking latch 113b in place.
19) Left-front first double-locking doors 110a each are for:
   Double-locking left-rear first triple-locking latch 113a in place;
   Double-locking left-rear second triple-locking latch 113b in place.
20) Left-front second double-locking doors 110b each are for:
   Double-locking left-rear first triple-locking latch 113a in place;
   Double-locking left-rear second triple-locking latch 113b in place.
21) Left-rear triple-locking-latch handle system 111 is for:
   Triple-locking left-side handle 102a in place,
   Triple-locking left-front handle 108a in place;
   Triple-locking left-rear handle 112a in place;
   Triple-locking bag-top left section 131a in place;
   Triple-locking bag-top front section 131c in place;
   Triple-locking bag-top rear section 131d in place.
22) Left-rear handle 112a is for being held on to pick up and transport the unique bag.
23) Left-rear first handle opening 112b is for inserting fingers through to pick up and transport the unique bag.
24) Left-rear second handle opening 112c is for inserting fingers through to pick up and transport the unique bag.
25) Left-rear first triple-locking latch 113a is for:
   Triple-locking left-side handle 102a in place,
   Triple-locking left-front handle 108a in place;
   Triple-locking left-rear handle 112a in place;
   Triple-locking bag-top left section 131a in place;
   Triple-locking bag-top front section 131c in place;
   Triple-locking bag-top rear section 131d in place.
26) Left-rear second triple-locking latch 113b is for:
   Triple-locking left-side handle 102a in place,
   Triple-locking left-front handle 108a in place;
   Triple-locking left-rear handle 112a in place;
   Triple-locking bag-top left section 131a in place;
   Triple-locking bag-top front section 131c in place;
   Triple-locking bag-top rear section 131d in place.
27) Right-front quadruple-locking-wall double-locking-door handle system 114 is for:
   Quadruple-locking right-rear first triple-locking latch 120a in place;
   Quadruple-locking right-rear second triple-locking latch 120b in place;
   Double-locking right-rear first triple-locking latch 120a in place;
   Double-locking right-rear second triple-locking latch 120b in place;
   Triple-locking right-side handle 105a in place,
   Triple-locking right-front handle 115a in place;
   Triple-locking right-rear handle 119a in place;
   Triple-locking bag-top right section 131b in place;
   Triple-locking bag-top front section 131c in place;
   Triple-locking bag-top rear section 131d in place.
28) Right-front handle 115a is for being held on to pick up and transport the unique bag.
29) Right-front first handle opening 115b is for inserting fingers through to pick up and transport the unique bag.
30) Right-front second handle opening 115c is for inserting fingers through to pick up and transport the unique bag.
31) Right-front first quadruple-locking walls 116a each are for:
   Quadruple-locking right-rear first triple-locking latch 120a in place;
   Quadruple-locking right-rear second triple-locking latch 120b in place.
32) Right-front second quadruple-locking walls 116b each are for:
   Quadruple-locking right-rear first triple-locking latch 120a in place;
   Quadruple-locking right-rear second triple-locking latch 120b in place.
33) Right-front first double-locking doors 117a each are for:

23

Double-locking right-rear first triple-locking latch 120*a* in place;
Double-locking right-rear second triple-locking latch 120*b* in place.
34) Right-front second double-locking doors 117*b* each are for:
Double-locking right-rear first triple-locking latch 120*a* in place;
Double-locking right-rear second triple-locking latch 120*b* in place.
35) Right-rear triple-locking-latch handle system 118 is for:
Triple-locking right-side handle 105*a* in place,
Triple-locking right-front handle 115*a* in place;
Triple-locking right-rear handle 119*a* in place;
Triple-locking bag-top right section 131*b* in place;
Triple-locking bag-top front section 131*c* in place;
Triple-locking bag-top rear section 131*d* in place.
36) Right-rear handle 119*a* is for being held on to pick up and transport the unique bag.
37) Right-rear first handle opening 119*b* is for for inserting fingers through to pick up and transport the unique bag.
38) Right-rear second handle opening 119*c* is for for inserting fingers through to pick up and transport the unique bag.
39) Right-rear first triple-locking latch 120*a* is for:
Triple-locking right-side handle 105*a* in place,
Triple-locking right-front handle 115*a* in place;
Triple-locking right-rear handle 119*a* in place;
Triple-locking bag-top right section 131*b* in place;
Triple-locking bag-top front section 131*c* in place;
Triple-locking bag-top rear section 131*d* in place.
40) Right-rear second triple-locking latch 120*b* is for:
Triple-locking right-side handle 105*a* in place,
Triple-locking right-front handle 115*a* in place;
Triple-locking right-rear handle 119*a* in place;
Triple-locking bag-top right section 131*b* in place;
Triple-locking bag-top front section 131*c* in place;
Triple-locking bag-top rear section 131*d* in place.
41) Middle-front quadruple-locking-wall double-locking-door handle system 121 is for:
Quadruple-locking middle-rear first springable-quadruple-locking latch 127*a* in place;
Quadruple-locking middle-rear second springable-quadruple-locking latch 127*b* in place;
Double-locking middle-rear first springable-quadruple-locking latch 127*a* in place;
Double-locking middle-rear second springable-quadruple-locking latch 127*b* in place;
Quadruple-locking middle-front handle 122*a* in place;
Quadruple-locking middle-rear handle 126*a* in place;
Quadruple-locking bag-top front section 131*c* in place;
Quadruple-locking bag-top rear section 131*d* in place.
42) Middle-front handle 122*a* is for being held on to pick up and transport the unique bag.
43) Middle-front first handle opening 122*b* is for inserting fingers through to pick up and transport the unique bag.
44) Middle-front second handle opening 122*c* is for inserting fingers through to pick up and transport the unique bag.
45) Middle-front first quadruple-locking walls 123*a* each are for:
Quadruple-locking middle-rear first springable-quadruple-locking latch 127*a* in place.
46) Middle-front second quadruple-locking walls 123*b* each are for:
Quadruple-locking middle-rear second springable-quadruple-locking latch 127*b* in place.

24

47) Middle-front first double-locking doors 124*a* each are for:
Double-locking middle-rear first springable-quadruple-locking latch 127*a* in place.
48) Middle-front second double-locking doors 124*b* each are for:
Double-locking middle-rear second springable-quadruple-locking latch 127*b* in place.
49) Middle-rear springable-quadruple-locking-latch handle system 125 is for:
Quadruple-locking middle-front handle 122*a* in place;
Quadruple-locking middle-rear handle 126*a* in place;
Quadruple-locking bag-top front section 131*c* in place;
Quadruple-locking bag-top rear section 131*d* in place.
50) Middle-rear handle 126*a* is for being held on to pick up and transport the unique bag.
51) Middle-rear first handle opening 126*b* is for inserting fingers through to pick up and transport the unique bag.
52) Middle-rear second handle opening 126*c* is for inserting fingers through to pick up and transport the unique bag.
53) Middle-rear first springable-quadruple-locking latch 127*a* is for:
Quadruple-locking middle-front handle 122*a* in place;
Quadruple-locking middle-rear handle 126*a* in place;
Quadruple-locking bag-top front section 131*c* in place;
Quadruple-locking bag-top rear section 131*d* in place.
54) Middle-rear second springable-quadruple-locking latch 127*b* is for:
Quadruple-locking middle-front handle 122*a* in place;
Quadruple-locking middle-rear handle 126*a* in place;
Quadruple-locking bag-top front section 131*c* in place;
Quadruple-locking bag-top rear section 131*d* in place.
55) Reinforcing-strip system 128 is for strengthening bag-top system 130.
56) Reinforcing-strip left section 129*a* is for strengthening bag-top left section 131*a*.
57) Reinforcing-strip right section 129*b* is for strengthening bag-top right section 131*b*.
58) Reinforcing-strip front section 129*c* is for strengthening bag-top front section 131*c*.
59) Reinforcing-strip rear section 129*d* is for strengthening bag-top rear section 131*d*.
60) Bag-top system 130 is for covering the top of the unique bag.
61) Bag-top left section 131*a* is for covering the top left of the unique bag.
62) Bag-top right section 131*b* is for covering the top right of the unique bag.
63) Bag-top front section 131*c* is for covering the top front of the unique bag.
64) Bag-top rear section 131*d* is for covering the top rear of the unique bag.
65) Bag-body system 132 is for covering the body of the unique bag.
66) Bag-body left section 133*a* is for covering the body left of the unique bag.
67) Bag-body right section 133*b* is for covering the body right of the unique bag.
68) Bag-body front section 133*c* is for covering the body front of the unique bag.
69) Bag-body rear section 133*d* is for covering the body rear of the unique bag.
70) Bag-bottom system 134 is for covering the bottom of the unique bag.
71) Bag-bottom left section 135*a* is for covering the bottom left of the unique bag.

72) Bag-bottom right section 135*b* is for covering the bottom right of the unique bag.
73) Bag-bottom front section 135*c* is for covering the bottom front of the unique bag.
74) Bag-bottom rear section 135*d* is for covering the bottom rear of the unique bag.

Operation

Figure 6B:
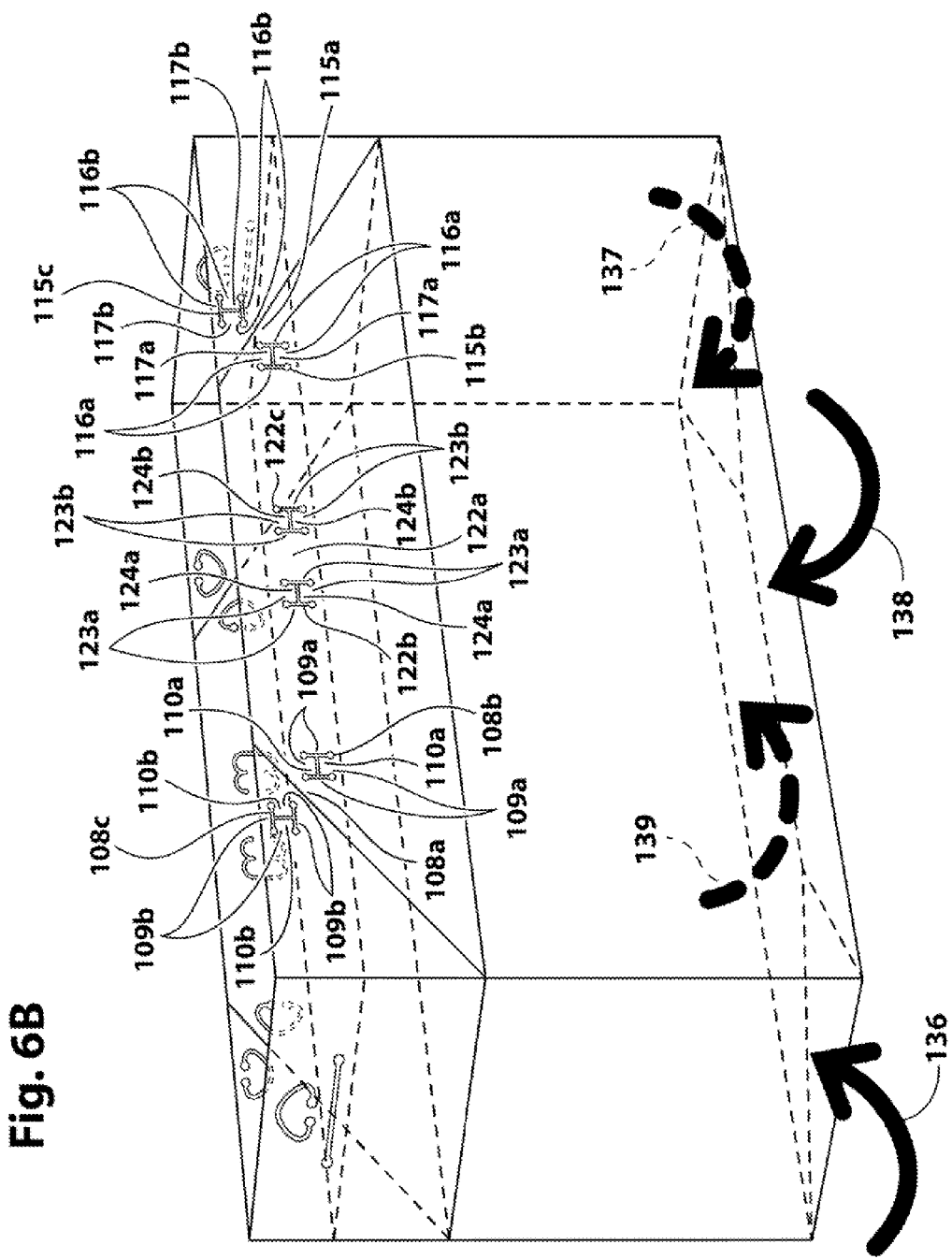

The operation of the unique eight-stacked-reinforced-handle eight-stacked-and-reinforced-latch biodegradable bag, having eight stacked and reinforced handles, eight stacked and reinforced triple-locking latches, six stacked and reinforced double-locking doors, two stacked and reinforced triple-locking braces, and eight stacked and reinforced quadruple-locking walls (all of which are stacked on one another, reinforced, and locked together as one unit, to efficiently seal the unique eight-stacked-reinforced-handle eight-stacked-and-reinforced-latch biodegradable bag securely, and to efficiently carry the content of the unique eight-stacked-reinforced-handle eight-stacked-and-reinforced-latch biodegradable bag), comprises:

Method for Folding and Sealing the Bottom of the Unique Eight-Stacked-Reinforced-Handle Eight-Stacked-and-Reinforced-Latch Biodegradable Bag (Referring to FIG. 6B)

1) Folding bag-bottom left section 135*a*, in the direction of arrow 136;
2) Folding bag-bottom right section 135*b*, in the direction of arrow 137;
3) Folding bag-bottom front section 135*c*, in the direction of arrow 138;
4) Folding bag-bottom rear section 135*d*, in the direction of arrow 139; and
5) Gluing bag-bottom left section 135*a*, bag-bottom right section 135*b*, bag-bottom front section 135*c*, and bag-bottom rear section 135*d* together.

Figure 7C:
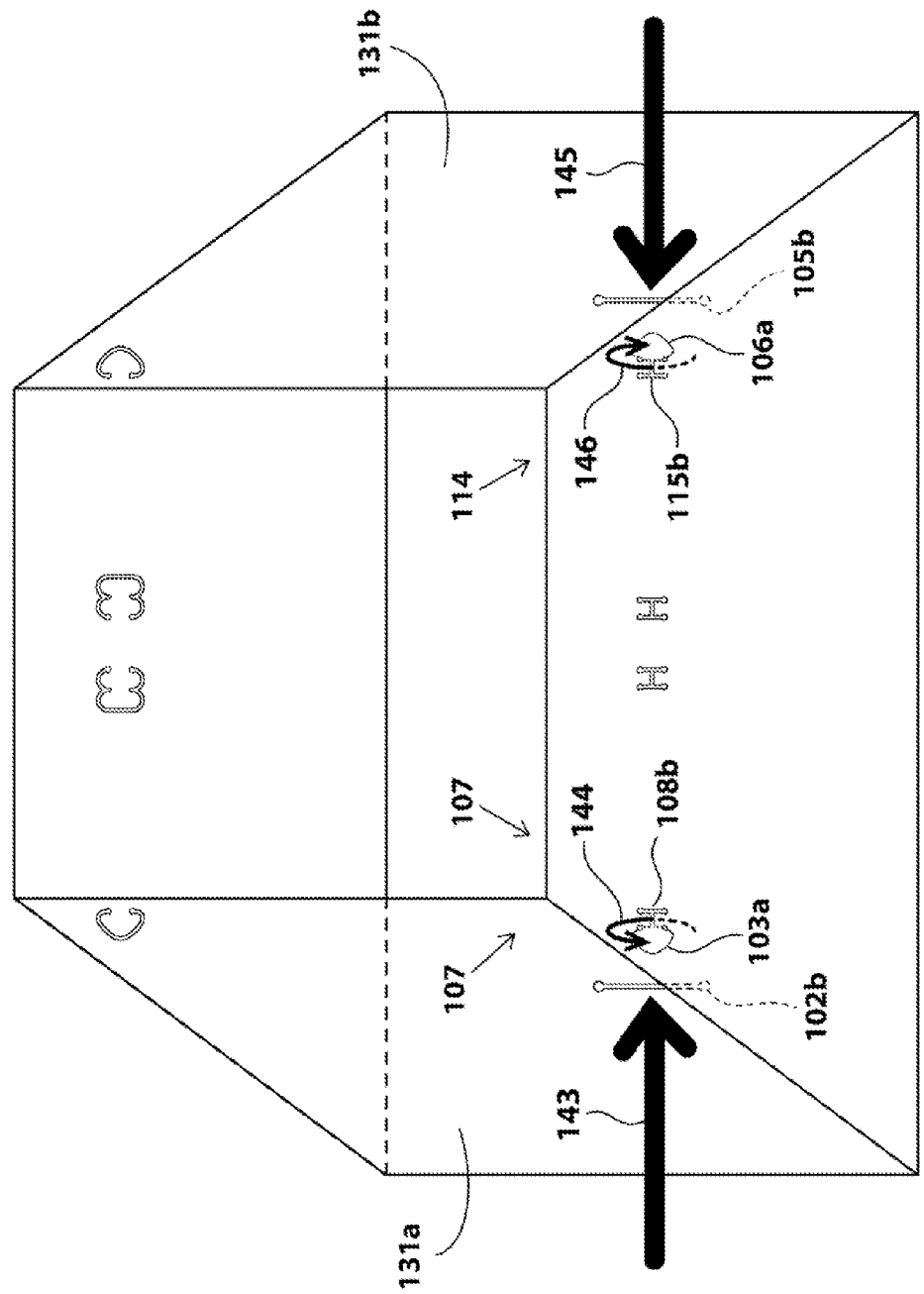

First Method for Folding, Stacking, and Locking Eight Stacked-Reinforced Handles Together, to Reinforce them and to Seal the Top of the Unique Eight-Stacked-Reinforced-Handle Eight-Stacked-and-Reinforced-Latch Biodegradable Bag (Referring to FIGS. 7A and 7B)

Figure 7D:
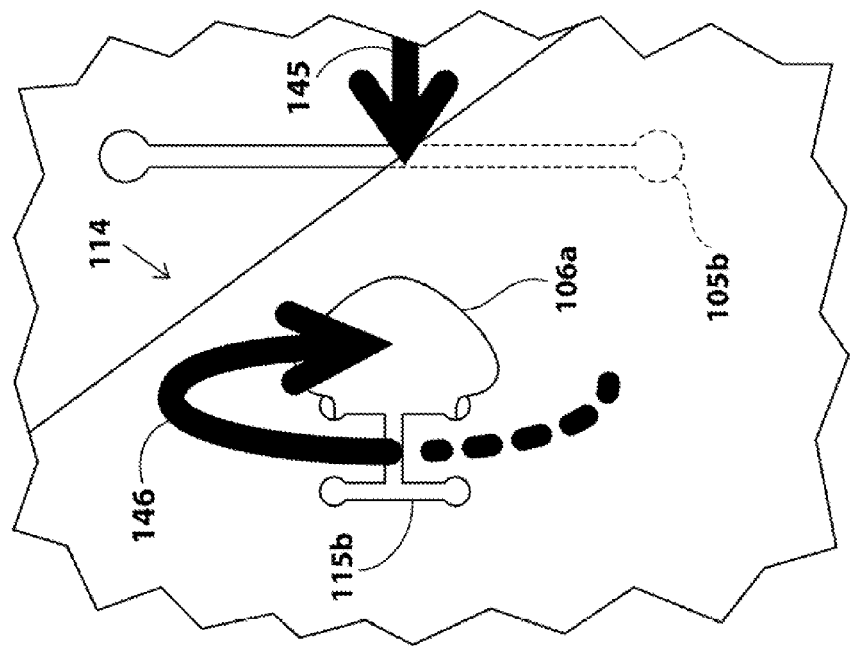
Figure 7E:
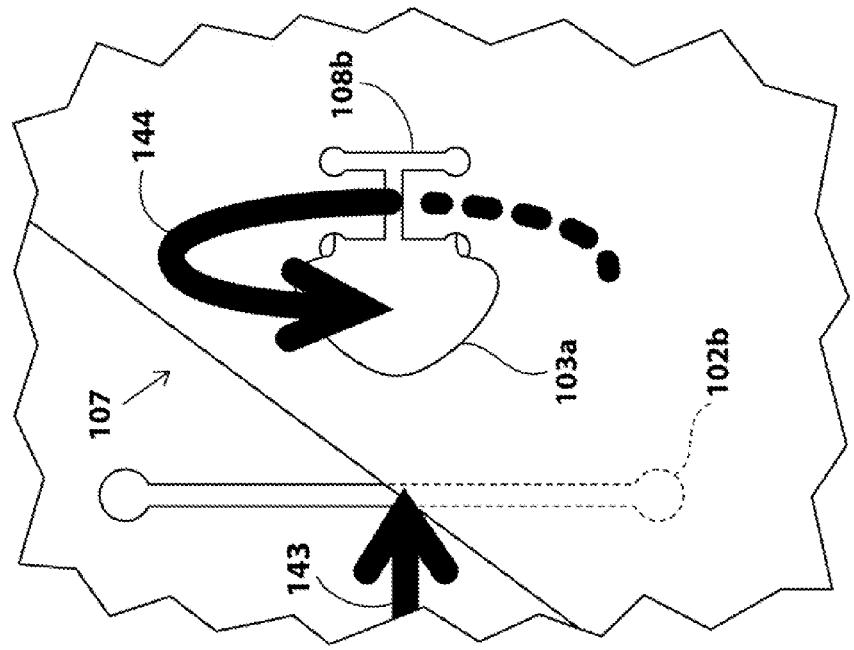

1) Folding bag-top left section 131*a*, in the direction of arrow 140,
   to fold left-front handle 108*a* in half to re-inforce it, and
   to fold left-rear handle 112*a* in half to re-inforce it;
2) Folding bag-top right section 131*b*, in the direction of arrow 141,
   to fold right-front handle 115*a* in half to re-inforce it, and
   to fold right-rear handle 119*a* in half to re-inforce it;
3) Folding bag-top front section 131*c*, in the direction of arrow 142,
   to stack left-front handle 108*a* on top of left-side handle 102*a*, and
   to stack right-front handle 115*a* on top of right-side handle 105*a*;
   (Referring to FIGS. 7C, 7D, and 7E)
4) Inserting a hand through left-side first handle opening 102*b*, in the direction of arrow 143;
5) Pushing left-side triple-locking latch 103*a* up through left-front first handle opening 108*b* and left-front second handle opening 108*c*, in the direction of arrow 144, such that left-side triple-locking latch 103*a*, left-front first quadruple-locking walls 109*a*, left-front second quadruple-locking walls 109*b*, left-front first double-locking doors 110*a*, and left-front second double-locking doors 110*b*:
   triple-lock left-side handle 102*a* in place,
   triple-lock left-front handle 108*a* in place,
   triple-lock bag-top left section 131*a* in place, and
   triple-lock bag-top front section 131*c* in place;
6) Inserting a hand through right-side first handle opening 105*b*, in the direction of arrow 145;
7) Pushing right-side triple-locking latch 106*a* up through right-front first handle opening 115*b* and right-front second handle opening 115*c*, in the direction of arrow 146, such that right-side triple-locking latch 106*a*, right-front first quadruple-locking walls 116*a*, right-front second quadruple-locking walls 116*b*, right-front first double-locking doors 117*a*, and right-front second double-locking doors 117*b*:
   triple-lock right-side handle 105*a* in place,
   triple-lock right-front handle 115*a* in place,
   triple-lock bag-top right section 131*b* in place, and
   triple-lock bag-top front section 131*c* in place;
   (Referring to FIGS. 7F, 7G, 7H, and 7I)
8) Folding bag-top rear section 131*d*, in the direction of arrow 147,
   to stack left-rear handle 112*a* on top of left-front handle 108*a* and left-side handle 102*a*,
   to stack right-rear handle 119*a* on top of right-front handle 115*a* and right-side handle 105*a*, and
   to stack middle-rear handle 126*a* on top of middle-front handle 122*a*;
9) Pushing left-rear first triple-locking latch 113*a* and left-rear second triple-locking latch 113*b* down through left-front first handle opening 108*b* and left-front second handle opening 108*c*, in the direction of arrow 148, such that left-rear first triple-locking latch 113*a*, left-rear second triple-locking latch 113*b*, left-front first quadruple-locking walls 109*a*, left-front second quadruple-locking walls 109*b*, left-front first double-locking doors 110*a*, and left-front second double-locking doors 110*b*:
   triple-lock left-side handle 102*a* in place,
   triple-lock left-front handle 108*a* in place,
   triple-lock left-rear handle 112*a* in place,
   triple-lock bag-top left section 131*a* in place,
   triple-lock bag-top front section 131*c* in place, and
   triple-lock bag-top rear section 131*d* in place;
10) Pushing right-rear first triple-locking latch 120*a* and right-rear second triple-locking latch 120*b* down through right-front first handle opening 115*b* and right-front second handle opening 115*c*, in the direction of arrow 149, such that right-rear first triple-locking latch 120*a*, right-rear second triple-locking latch 120*b*, right-front first quadruple-locking walls 116*a*, right-front second quadruple-locking walls 116*b*, right-front first double-locking doors 117*a*, and right-front second double-locking doors 117*b*:
    triple-lock right-side handle 105*a* in place,
    triple-lock right-front handle 115*a* in place,
    triple-lock right-rear handle 119*a* in place,
    triple-lock bag-top right section 131*b* in place,
    triple-lock bag-top front section 131*c* in place, and
    triple-lock bag-top rear section 131*d* in place;
    (Referring to FIGS. 7G, 7J, 7K, 7L, 7M, and 7N)
11) Pushing middle-rear first springable-quadruple-locking latch 127*a* down through middle-front first handle opening 122*b*, in the direction of arrow 150, such that middle-rear first springable-quadruple-locking latch 127*a*, middle-front first quadruple-locking walls 123*a*, and middle-front first double-locking doors 124*a*:
    quadruple-lock middle-front handle 122*a* in place,
    quadruple-lock middle-rear handle 126*a* in place,
    quadruple-lock bag-top front section 131*c* in place, and quadruple-lock bag-top rear section 131d in place; and
12) Pushing middle-rear second springable-quadruple-locking latch 127b down through middle-front second handle opening 122c, in the direction of arrow 151, such that middle-rear second springable-quadruple-locking latch 127b, middle-front second quadruple-locking walls 123b, and middle-front second double-locking doors 124b:
    quadruple-lock middle-front handle 122a in place,
    quadruple-lock middle-rear handle 126a in place,
    quadruple-lock bag-top front section 131c in place, and
    quadruple-lock bag-top rear section 131d in place.

Figure 8B:
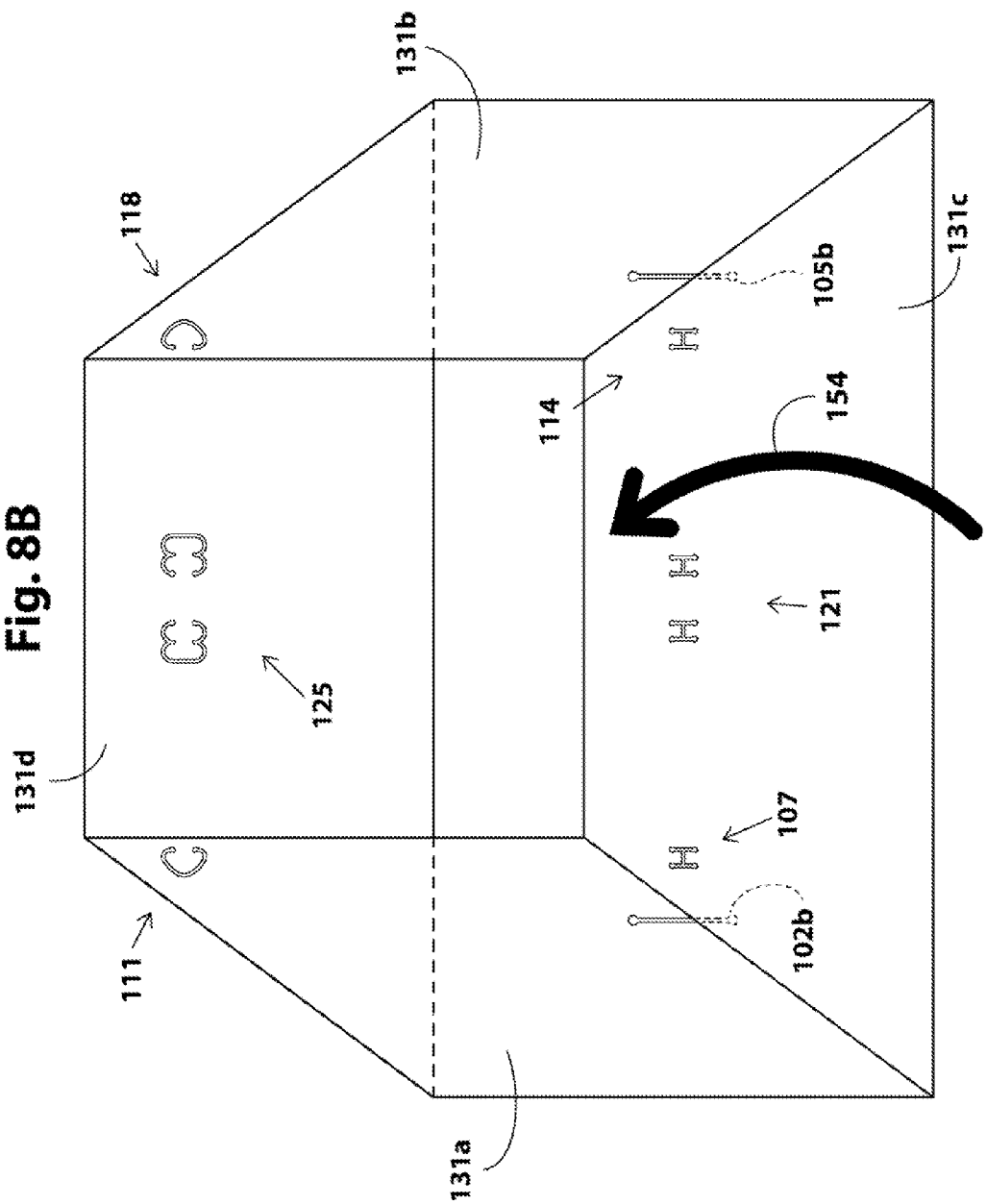
Figure 8C:
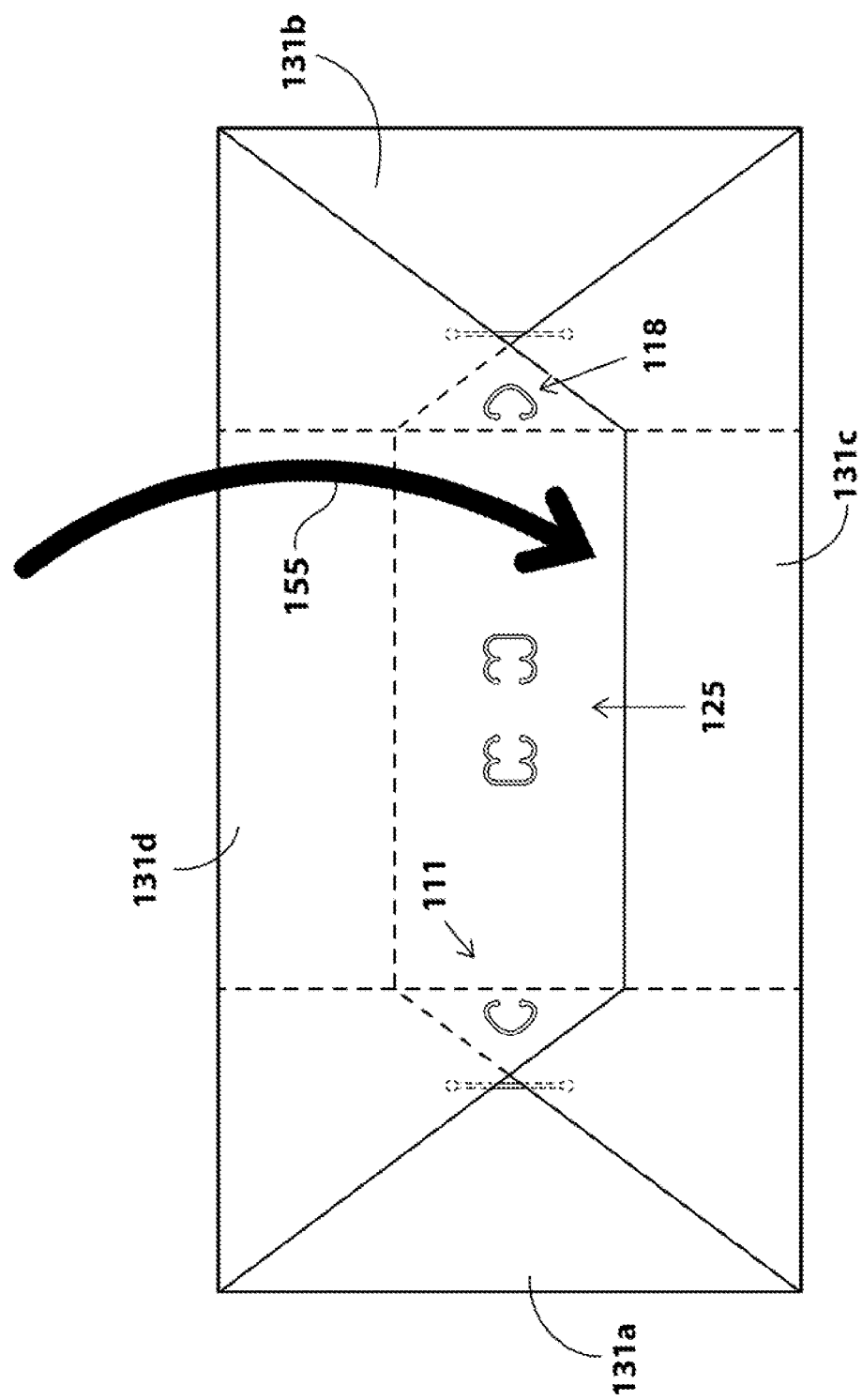
Figure 8E:
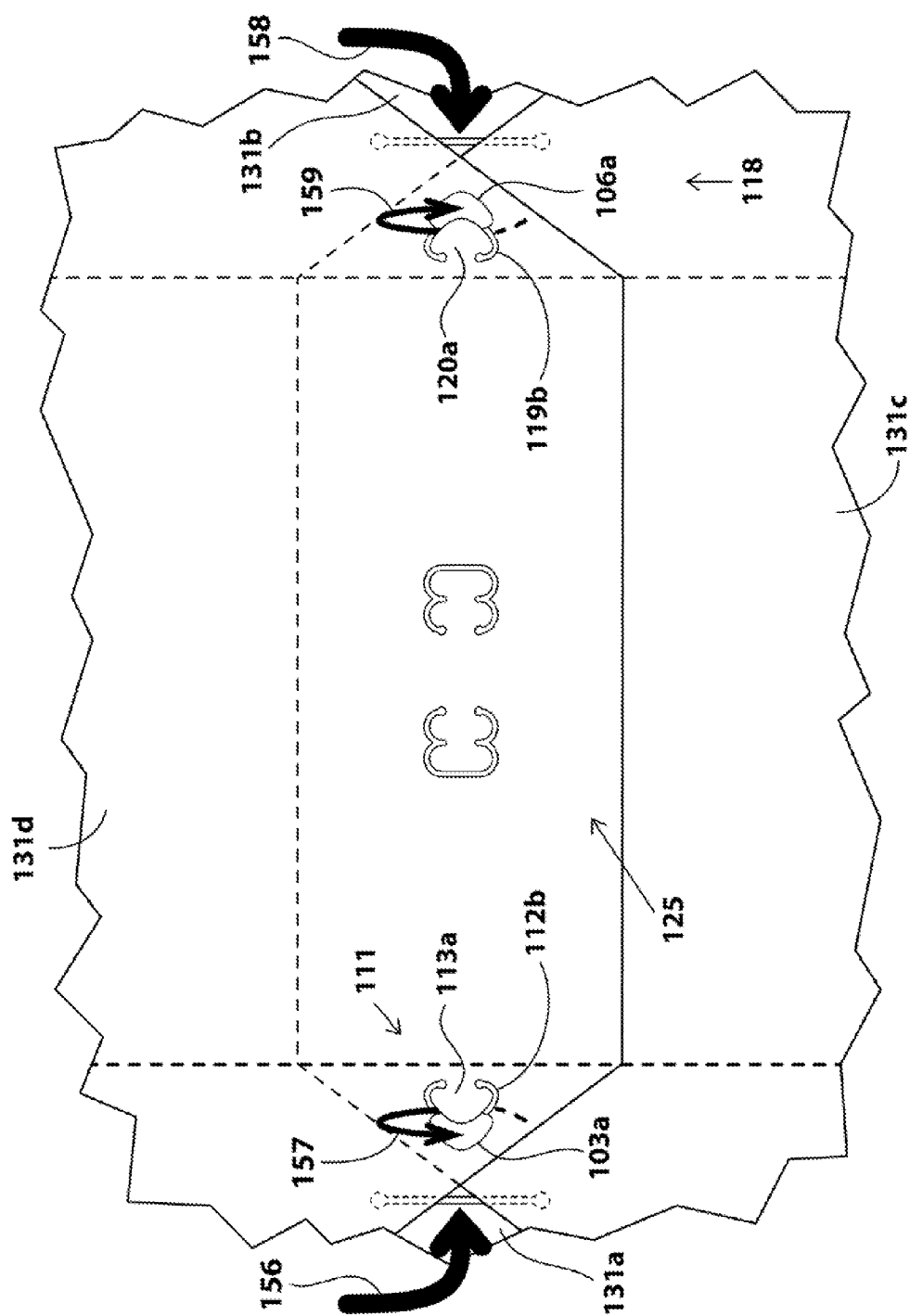
Figure 8H:
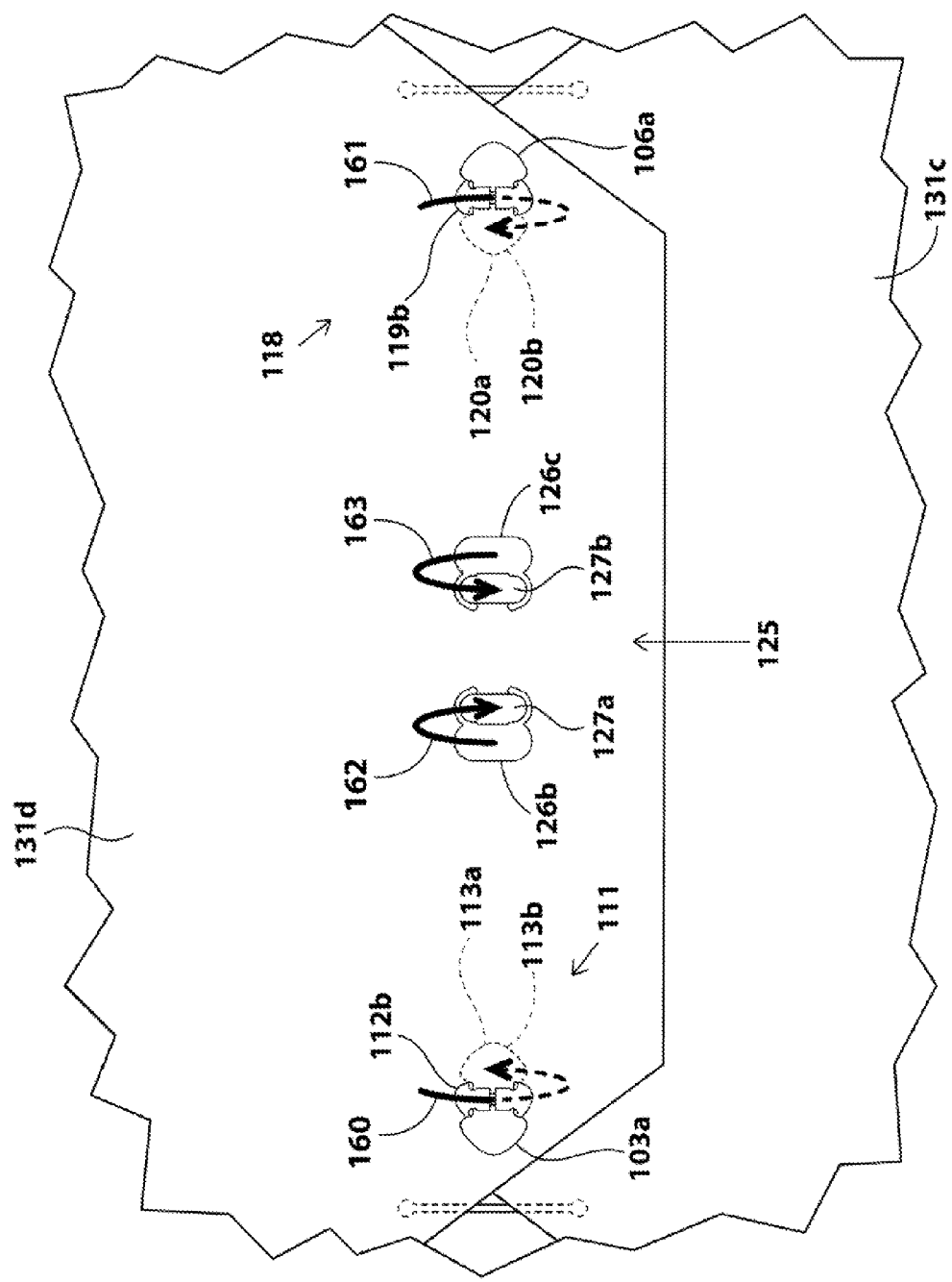

Second Method for Folding, Stacking, and Locking Eight Stacked-Reinforced Handles Together, to Reinforce them and to Seal the Top of the Unique Eight-Stacked-Reinforced-Handle Eight-Stacked-and-Reinforced-Latch Biodegradable Bag
    (Referring to FIGS. 8A, 8B, 8C, and 8D)
1) Folding bag-top left section 131a, in the direction of arrow 152,
    to fold left-front handle 108a in half to re-inforce it, and
    to fold left-rear handle 112a in half to re-inforce it;
2) Folding bag-top right section 131b, in the direction of arrow 153,
    to fold right-front handle 115a in half to re-inforce it, and
    to fold right-rear handle 119a in half to re-inforce it;
3) Folding bag-top front section 131c, in the direction of arrow 154,
    to stack left-front handle 108a on top of left-side handle 102a, and
    to stack right-front handle 115a on top of right-side handle 105a;
4) Folding bag-top rear section 131d, in the direction of arrow 155,
    to stack left-rear handle 112a on top of left-front handle 108a and left-side handle 102a,
    to stack right-rear handle 119a on top of right-front handle 115a and right-side handle 105a,
    to stack middle-rear handle 126a on top of middle-front handle 122a;
    (Referring to FIGS. 8E, 8F, and 8G)
5) Inserting a hand through left-side first handle opening 102b, in the direction of arrow 156;
6) Pushing left-side triple-locking latch 103a up through left-front first handle opening 108b, left-front second handle opening 108c, left-rear first handle opening 112b, and left-rear second handle opening 112c, in the direction of arrow 157, such that left-side triple-locking latch 103a, left-front first quadruple-locking walls 109a, left-front second quadruple-locking walls 109b, left-front first double-locking doors 110a, and left-front second double-locking doors 110b:
    triple-lock left-side handle 102a in place,
    triple-lock left-front handle 108a in place,
    triple-lock left-rear handle 112a in place,
    triple-lock bag-top left section 131a in place,
    triple-lock bag-top front section 131c in place, and
    triple-lock bag-top rear section 131d in place;
7) Inserting a hand through right-side first handle opening 105b, in the direction of arrow 158;
8) Pushing right-side triple-locking latch 106a up through right-front first handle opening 115b, right-front second handle opening 115c, right-rear first handle opening 119b, and right-rear second handle opening 119c, in the direction of arrow 159, such that right-side triple-locking latch 106a, right-front first quadruple-locking walls 116a, right-front second quadruple-locking walls 116b, right-front first double-locking doors 117a, and right-front second double-locking doors 117b:
    triple-lock right-side handle 105a in place,
    triple-lock right-front handle 115a in place,
    triple-lock right-rear handle 119a in place,
    triple-lock bag-top right section 131b in place,
    triple-lock bag-top front section 131c in place, and
    triple-lock bag-top rear section 131d in place;
    (Referring to FIGS. 8H, 8I, and 8J)
9) Pushing left-rear first triple-locking latch 113a and left-rear second triple-locking latch 113b down through left-front first handle opening 108b and left-front second handle opening 108c, in the direction of arrow 160, such that left-rear first triple-locking latch 113a, left-rear second triple-locking latch 113b, left-front first quadruple-locking walls 109a, left-front second quadruple-locking walls 109b, left-front first double-locking doors 110a, and left-front second double-locking doors 110b:
    triple-lock left-side handle 102a in place,
    triple-lock left-front handle 108a in place,
    triple-lock left-rear handle 112a in place,
    triple-lock bag-top left section 131a in place,
    triple-lock bag-top front section 131c in place, and
    triple-lock bag-top rear section 131d in place;
10) Pushing right-rear first triple-locking latch 120a and right-rear second triple-locking latch 120b down through right-front first handle opening 115b and right-front second handle opening 115c, in the direction of arrow 161, such that right-rear first triple-locking latch 120a, right-rear second triple-locking latch 120b, right-front first quadruple-locking walls 116a, right-front second quadruple-locking walls 116b, right-front first double-locking doors 117a, and right-front second double-locking doors 117b:
    triple-lock right-side handle 105a in place,
    triple-lock right-front handle 115a in place,
    triple-lock right-rear handle 119a in place,
    triple-lock bag-top right section 131b in place,
    triple-lock bag-top front section 131c in place, and
    triple-lock bag-top rear section 131d in place;
    (Referring to FIGS. 8H, 8K, 8L, 8M, 8N, and 8O)
11) Pushing middle-rear first springable-quadruple-locking latch 127a down through middle-front first handle opening 122b, in the direction of arrow 162, such that middle-rear first springable-quadruple-locking latch 127a, middle-front first quadruple-locking walls 123a, and middle-front first double-locking doors 124a:
    quadruple-lock middle-front handle 122a in place,
    quadruple-lock middle-rear handle 126a in place,
    quadruple-lock bag-top front section 131c in place, and
    quadruple-lock bag-top rear section 131d in place; and
12) Pushing middle-rear second springable-quadruple-locking latch 127b down through middle-front second handle opening 122c, in the direction of arrow 163, such that middle-rear second springable-quadruple-locking latch 127b, middle-front second quadruple-locking walls 123b, and middle-front second double-locking doors 124b:
    quadruple-lock middle-front handle 122a in place,
    quadruple-lock middle-rear handle 126a in place,
    quadruple-lock bag-top front section 131c in place, and
    quadruple-lock bag-top rear section 131d in place.

First Method for Picking Up to Transport the Unique Eight-Stacked-Reinforced-Handle Eight-Stacked-and-Reinforced-Latch Biodegradable Bag
    (Referring to FIG. 9)
1) Inserting a hand through left-side first handle opening 102b, left-side second handle opening 102c, left-front first handle opening 108*b*, left-front second handle opening 108*c*, left-rear first handle opening 112*b*, and left-rear second handle opening 112*c*, under left-side handle 102*a*, left-front handle 108*a*, and left-rear handle 112*a*, in the direction of arrow 164;

2) Inserting a hand through right-side first handle opening 105*b*, right-side second handle opening 105*c*, right-front first handle opening 115*b*, right-front second handle opening 115*c*, right-rear first handle opening 119*b*, and right-rear second handle opening 119*c*, under right-side handle 105*a*, right-front handle 115*a*, and right-rear handle 119*a*, in the direction of arrow 165;

3) Picking up left-side handle 102*a*, left-front handle 108*a*, and left-rear handle 112*a*; and 4) Picking up right-side handle 105*a*, right-front handle 115*a*, and right-rear handle 119*a*.

Second Method for Picking Up to Transport the Unique Eight-Stacked-Reinforced-Handle Eight-Stacked-and-Reinforced-Latch Biodegradable Bag (Referring to FIG. 10)

1) Inserting a hand through middle-rear first handle opening 126*b*, middle-front first handle opening 122*b*, middle-front second handle opening 122*c*, and middle-rear second handle opening 126*c*, under middle-front handle 122*a*, and middle-rear handle 126*a*, in the direction of arrow 166; and 2) Picking up middle-front handle 122*a*, and middle-rear handle 126*a*.

Third Method for Picking Up to Transport the Unique Eight-Stacked-Reinforced-Handle Eight-Stacked-and-Reinforced-Latch Biodegradable Bag The third method for picking up to transport the unique eight-stacked-reinforced-handle eight-stacked-and-reinforced-latch biodegradable bag comprises at least one of all the steps from the first and second methods for picking up to transport the unique bag described above.

Variation

Figure 12:
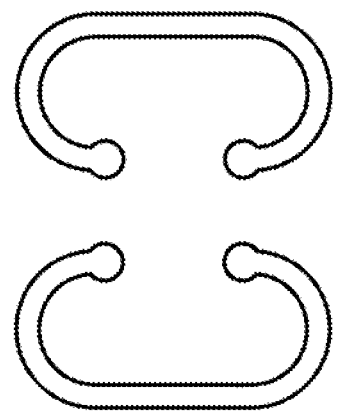
FIGS. 11 and 12 illustrate top views of variations of the triple-locking latches of the unique eight-stacked-reinforced-handle eight-stacked-and-reinforced-latch biodegradable bag.
Figure 11:
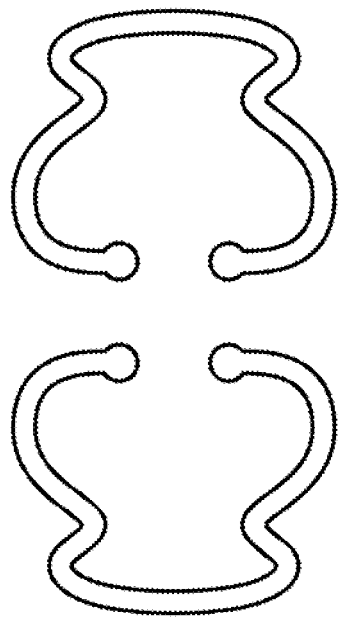
Figure 13:
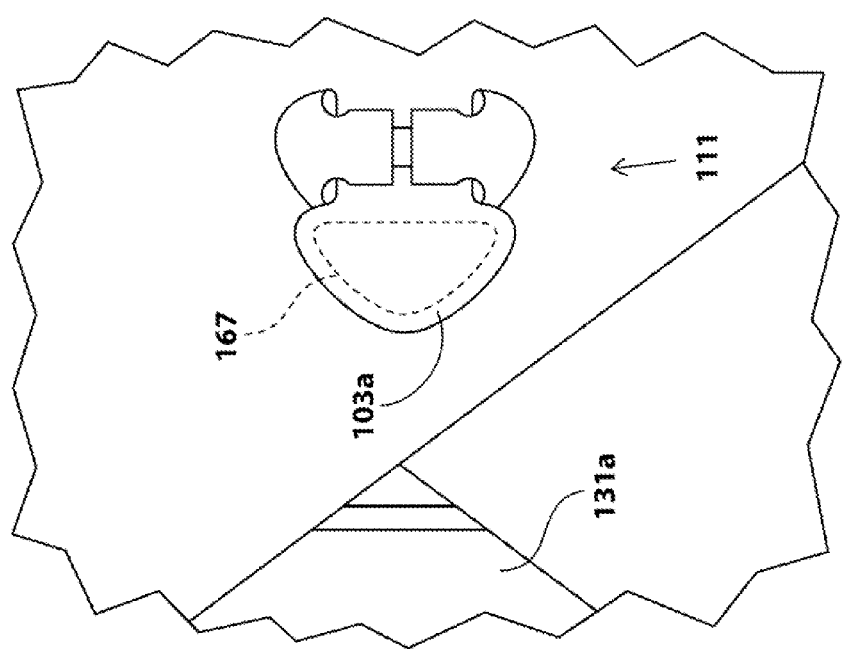
FIG. 13 illustrates a top view of a resilient strip of the unique eight-stacked-reinforced-handle eight-stacked-and-reinforced-latch biodegradable bag, to reinforce and to return a latch back to its original shape to lock it in place.

Any component of the unique eight-stacked-reinforced-handle eight-stacked-and-reinforced-latch biodegradable bag can have any shape and size. For example, FIGS. 11 and 12 each illustrate two latches, which are equivalent to and can replace latches 127*a* and 127*b*. For another example, FIGS. 11 and 12 each illustrate two latches, each of which is equivalent to and can replace any one of the latches of the unique eight-stacked-reinforced-handle eight-stacked-and-reinforced-latch biodegradable bag. For another example, openings 102*b*, 102*c*, 108*b*, 112*b*, 122*b* and 126*b* each can have any shape and size. For another example, openings 102*b*, 102*c*, 108*b*, 112*b*, 122*b* and 126*b* each can have a square, rectangular, oval, or trapezoidal shape. The unique eight-stacked-reinforced-handle eight-stacked-and-reinforced-latch biodegradable bag can be built with or without middle-front quadruple-locking-wall double-locking-door handle system 121, and/or can be built with or without middle-rear springable-quadruple-locking-latch handle system 125. The unique eight-stacked-reinforced-handle eight-stacked-and-reinforced-latch biodegradable bag can be built with or without doors 110*a* and 110*b*, and/or can be built with or without doors 117*a* and 117*b*. The unique eight-stacked-reinforced-handle eight-stacked-and-reinforced-latch biodegradable bag can comprise at least one resilient strip attached to at least one portion of the unique eight-stacked-reinforced-handle eight-stacked-and-reinforced-latch biodegradable bag, to reinforce the at least one portion and to return the at least one portion back to the at least one portion's original shape(s) after being pushed through at least one opening of the unique eight-stacked-reinforced-handle eight-stacked-and-reinforced-latch biodegradable bag, to further lock the at least one portion in place. For example, at least one resilient strip can be attached to at least one of handles, latches, braces, walls, doors, reinforcing strips, and/or portions of the unique eight-stacked-reinforced-handle eight-stacked-and-reinforced-latch biodegradable bag, to reinforce them and to return them back to their original shapes to further lock them in place, after being pushed through an opening of the unique eight-stacked-reinforced-handle eight-stacked-and-reinforced-latch biodegradable bag. For example, FIG. 13 illustrates a biodegradable resilient strip 167. The unique eight-stacked-reinforced-handle eight-stacked-and-reinforced-latch biodegradable bag can comprise: a) at least one biodegradable glue, b) at least one biodegradable glue strip, or c) at least one biodegradable glue and at least one removable glue-covering strip, attached to at least one portion of the unique eight-stacked-reinforced-handle eight-stacked-and-reinforced-latch biodegradable bag. For example, the unique eight-stacked-reinforced-handle eight-stacked-and-reinforced-latch biodegradable bag can comprise: a) at least one biodegradable glue, b) at least one biodegradable glue strip, or c) at least one biodegradable glue and at least one removable glue-covering strip, attached to at least one of handles, latches, braces, walls, doors, reinforcing strips, and/or portions of the unique eight-stacked-reinforced-handle eight-stacked-and-reinforced-latch biodegradable bag, to glue them to the unique eight-stacked-reinforced-handle eight-stacked-and-reinforced-latch biodegradable bag. Further, the unique eight-stacked-reinforced-handle eight-stacked-and-reinforced-latch biodegradable bag can comprise at least one flap. For example, FIG. 14 illustrates the unique eight-stacked-reinforced-handle eight-stacked-and-reinforced-latch biodegradable bag, which, further, can comprise a biodegradable flap 168 (attached to reinforcing-strip front section 129*c* and/or bag-top front section 131*c*) and a biodegradable glue 169 (attached to the undersurface of biodegradable flap 168), to glue biodegradable flap 168 to bag-body front section 133*c* of the unique eight-stacked-reinforced-handle eight-stacked-and-reinforced-latch biodegradable bag.

CONCLUSION

Figure 15A:
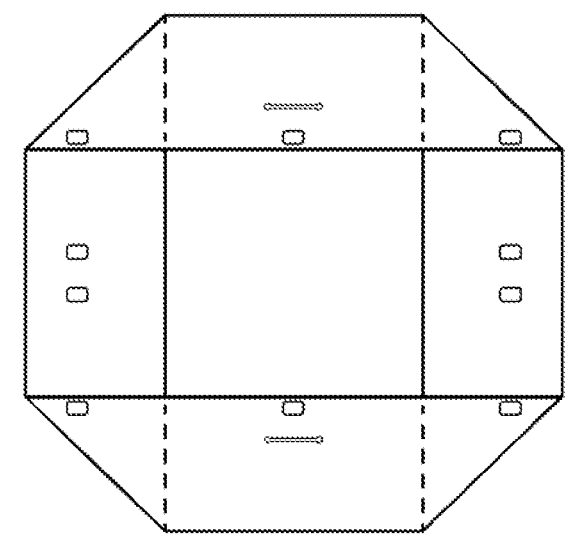

The unique eight-stacked-reinforced-handle eight-stacked-and-reinforced-latch biodegradable bag provides many unique advantages, and can have many equivalents. As illustrated earlier in FIGS. 7A and 8A, bag-top system 130 can function as a long and broad funnel. For example, FIGS. 15A, 15B, and 15C illustrate bag-top system 130 of the unique eight-stacked-reinforced-handle eight-stacked-and-reinforced-latch biodegradable bag functioning as a long and broad funnel for debris to easily be loaded in the unique eight-stacked-reinforced-handle eight-stacked-and-reinforced-latch biodegradable bag, in the directions of arrows 170.

Figure 16:
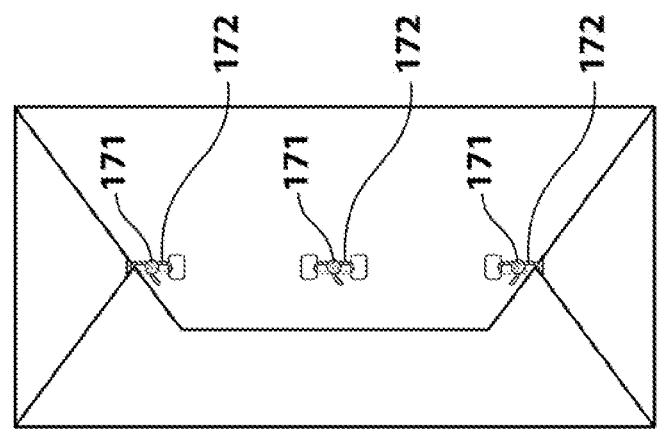
FIG. 16 illustrates a top view of an equivalent of the triple-locking latch of the unique eight-stacked-reinforced-handle eight-stacked-and-reinforced-latch biodegradable bag.

FIG. 16 illustrates a top view of an equivalent of the latches of the unique eight-stacked-reinforced-handle eight-stacked-and-reinforced-latch biodegradable bag. The equivalent comprises a button 171 attached to the unique eight-stacked-reinforced-handle eight-stacked-and-reinforced-latch biodegradable bag and a string 172 attached to button 171. String 172 is for being pushed through at least one of the openings punched in bag-top system 130, and is for being tied to button 171. The equivalent functions similarly as the latches (for example, locking together eight stacked and reinforced handles of the unique eight-stackedreinforced-handle eight-stacked-and-reinforced-latch biodegradable bag). For another example, an equivalent of the latches of the unique eight-stacked-reinforced-handle eight-stacked-and-reinforced-latch biodegradable bag can be a clip attached to the unique eight-stacked-reinforced-handle eight-stacked-and-reinforced-latch biodegradable bag. The equivalent functions similarly as the latches illustrated in FIGS. 8K and 8L (for example, locking together eight stacked and reinforced handles of the unique eight-stacked-reinforced-handle eight-stacked-and-reinforced-latch biodegradable bag).

MAJOR ADVANTAGES OF THE INVENTION

The present invention substantially departs from the conventional concepts and designs of the prior art. In doing so, the present invention provides a unique eight-stacked-and-reinforced-handle eight-stacked-and-reinforced-latch biodegradable bag for debris and garden, having many unique and significant features, functions, and advantages, which overcome all the disadvantages of the prior art, as follows:

1) It is an object of the present invention to provide the unique eight-stacked-and-reinforced-handle eight-stacked-and-reinforced-latch biodegradable bag, having eight stacked and reinforced handles (side handles, front handles, and rear handles), which can be:
   a) Formed by folding all four top sections of the eight-stacked-and-reinforced-handle eight-stacked-and-reinforced-latch biodegradable bag on top of one another to be reinforced,
   b) Folded individually to be reinforced,
   c) Stacked on top of each other to be reinforced,
   d) Latched together into one unit to be reinforced, and
   e) Latched together into one unit to provide easy and comfort of operation.

Therefore, the unique eight-stacked-and-reinforced-handle eight-stacked-and-reinforced-latch biodegradable bag can:
   a) Be easy to carry,
   b) Eliminate additional hardware to seal,
   c) Eliminate additional tools to produce additional hardware,
   d) Eliminate additional production costs, and
   e) Eliminate personal injuries from using additional tools to produce additional hardware.

2) It is another object of the present invention to provide the unique eight-stacked-and-reinforced-handle eight-stacked-and-reinforced-latch biodegradable bag, having all eight stacked and reinforced handles (side handles, front handles, and rear handles) additionally reinforced with reinforcing device, which can:
   a) Strengthen all eight stacked and reinforced handles (side handles, front handles, and rear handles), to prevent them from being torn, and to securely carry the weight of the content of the eight-stacked-and-reinforced-handle eight-stacked-and-reinforced-latch biodegradable bag.
   b) Strengthen all eight stacked and reinforced locking latches (side latches, front latches, and rear latches), to prevent them from being torn, and to securely seal the eight-stacked-and-reinforced-handle eight-stacked-and-reinforced-latch biodegradable bag,
   c) Strengthen all six stacked and reinforced locking doors (left doors, middle doors, and right doors), to prevent them from being torn, and to securely lock all eight stacked and reinforced locking latches,
   d) Strengthen two stacked and reinforced locking braces (left and right braces), to prevent them from being torn, and to securely lock all eight stacked and reinforced locking latches, and
   e) Strengthen all eight stacked and reinforced locking walls (side walls, front walls, and rear walls), to prevent them from being torn, and to securely lock all eight stacked and reinforced locking latches.

Therefore, the unique eight-stacked-and-reinforced-handle eight-stacked-and-reinforced-latch biodegradable bag can:
   a) Securely seal themselves,
   b) Prevent themselves from accidentally unlocking themselves and popping open following closure, and
   c) Prevent accidental releasing of its content.

3) It is a further object of the present invention to provide the unique eight-stacked-and-reinforced-handle eight-stacked-and-reinforced-latch biodegradable bag, having eight stacked and reinforced handles (side handles, front handles, and rear handles), which can:
   a) Be stacked into one unit of multiple handles,
   b) Be easily held onto to pick up and carry the eight-stacked-and-reinforced-handle eight-stacked-and-reinforced-latch biodegradable bag,
   c) Efficiently carry the weight of the content of the eight-stacked-and-reinforced-handle eight-stacked-and-reinforced-latch biodegradable bag, and
   d) Resist tearing.

Therefore, the unique eight-stacked-and-reinforced-handle eight-stacked-and-reinforced-latch biodegradable bag can:
   a) Resist tear,
   b) Be sealed securely following closure, and
   c) Prevent accidental releasing of its content.

4) It is an even further object of the present invention to provide the unique eight-stacked-and-reinforced-handle eight-stacked-and-reinforced-latch biodegradable bag, having its bag top forming and functioning as a long and broad funnel, which can:
   a) Provide a long and broad funnel opening for easy loading,
   b) Function as a long and broad funnel opening, to save loading time and labor,
   c) Allow the debris to quickly and easily slide into the eight-stacked-and-reinforced-handle eight-stacked-and-reinforced-latch biodegradable bag.

Therefore, the unique eight-stacked-and-reinforced-handle eight-stacked-and-reinforced-latch biodegradable bag can:
   a) Facilitate efficient bag loading, without spillage,
   b) Save time and labor,
   c) Eliminate the need for additional people to hold the bag open while loading, and
   b) Require less time and labor to load and unload.

5) It is another object of the present invention to provide the unique eight-stacked-and-reinforced-handle eight-stacked-and-reinforced-latch biodegradable bag, having the stability achieved by resting horizontally on its long side on the ground, which can:
   a) Keep its long and broad funnel opening close to the ground,
   b) Reduce the debris-lifting distances, and
   c) Keep itself stable while loading (by resting on its long side on the ground), to prevent the eight-stacked-and-reinforced-handle eight-stacked-and-reinforced-latch biodegradable bag from tipping over, and to prevent accidental spillage of its content.

Therefore, the unique eight-stacked-and-reinforced-handle eight-stacked-and-reinforced-latch biodegradable bag can:
   a) Provide easy loading,
   b) Provide easy unloading,
   c) Require less time and labor to load and unload, and
   d) Save one's back during loading and unloading.
6) It is yet another object of the present invention to provide the unique eight-stacked-and-reinforced-handle eight-stacked-and-reinforced-latch biodegradable bag, having eight stacked and reinforced locking latches (side latches, front latches, and rear latches), which can be:
   a) All completely hidden and protected inside the eight-stacked-and-reinforced-handle eight-stacked-and-reinforced-latch biodegradable bag, to prevent eight stacked and reinforced locking latches from being torn, and to keep the eight-stacked-and-reinforced-handle eight-stacked-and-reinforced-latch biodegradable bag secured.
   b) Quickly and easily operated, to seal the eight-stacked-and-reinforced-handle eight-stacked-and-reinforced-latch biodegradable bag on the inside,
   c) Interlocked on the inside, to prevent accidental unlocking of eight stacked and reinforced locking latches.
Therefore, the unique eight-stacked-and-reinforced-handle eight-stacked-and-reinforced-latch biodegradable bag can:
   a) Protect the bag-locking mechanism from damage,
   b) Hide and protect the bag-locking mechanism completely inside the eight-stacked-and-reinforced-handle eight-stacked-and-reinforced-latch biodegradable bag,
   c) Prevent the bag-locking mechanism from being torn off, and
   d) Prevent accidental spillage of its contents.
7) It is still yet another object of the present invention to provide the unique eight-stacked-and-reinforced-handle eight-stacked-and-reinforced-latch biodegradable bag, having eight stacked and reinforced locking latches (side latches, front latches, and rear latches), which can:
   a) Oppositely interlock all four top sections of the eight-stacked-and-reinforced-handle eight-stacked-and-reinforced-latch biodegradable bag, to stack all its components on top of one another for added strength and efficiency, and
   b) Oppositely interlock all eight stacked and reinforced handles (side handles, front handles, and rear handles), to allow them to function as one unit.
Therefore, the unique eight-stacked-and-reinforced-handle eight-stacked-and-reinforced-latch biodegradable bag can:
   a) Oppositely interlock its four top sections, and
   b) Oppositely interlock eight stacked and reinforced handles for efficient pickup and transport.
8) It is still yet a further object of the present invention to provide the unique eight-stacked-and-reinforced-handle eight-stacked-and-reinforced-latch biodegradable bag, having all six stacked and reinforced locking doors (left doors, middle doors, and right doors), which can:
   a) Oppositely interlock eight stacked and reinforced locking latches (side latches, front latches, and rear latches), to allow them to function as one unit, and
   b) Oppositely interlock all eight stacked and reinforced handles (side handles, front handles, and rear handles), to allow them to function as one unit.
Therefore, the unique eight-stacked-and-reinforced-handle eight-stacked-and-reinforced-latch biodegradable bag can:
   a) Oppositely interlock eight stacked and reinforced locking latches,
   b) Oppositely interlock its four top sections, and
   c) Oppositely interlock eight stacked and reinforced handles for efficient pickup and transport.
9) It is still yet an even further object of the present invention to provide the unique eight-stacked-and-reinforced-handle eight-stacked-and-reinforced-latch biodegradable bag, having eight stacked and reinforced locking walls and two stacked and reinforced locking braces, which can:
   a) Oppositely interlock eight stacked and reinforced locking latches (side latches, front latches, and rear latches), to allow them to function as one unit, and
   b) Oppositely interlock all eight stacked and reinforced handles (side handles, front handles, and rear handles), to allow them to function as one unit.
Therefore, the unique eight-stacked-and-reinforced-handle eight-stacked-and-reinforced-latch biodegradable bag can:
   a) Oppositely interlock eight stacked and reinforced locking latches,
   b) Oppositely interlock its four top sections, and
   c) Oppositely interlock eight stacked and reinforced handles for efficient pickup and transport.
10) It is still yet an even further object of the present invention to provide the unique eight-stacked-and-reinforced-handle eight-stacked-and-reinforced-latch biodegradable bag, having all its stacked and reinforced components (eight stacked and reinforced handles, eight stacked and reinforced locking latches, six stacked and reinforced locking doors, left and right locking braces, and eight stacked and reinforced locking walls), which can:
   a) Be mechanically punched in the eight-stacked-and-reinforced-handle eight-stacked-and-reinforced-latch biodegradable bag, to make the eight-stacked-and-reinforced-handle eight-stacked-and-reinforced-latch biodegradable bag and all its stacked and reinforced components function as one unit,
   b) Have no separate components to keep production cost affordable,
   c) Have no separate components to ship and store,
   d) Have no separate components to lose, and
   e) Have no separate components to assemble.
Therefore, the unique eight-stacked-and-reinforced-handle eight-stacked-and-reinforced-latch biodegradable bag can:
   a) Provide the eight-stacked-and-reinforced-handle eight-stacked-and-reinforced-latch biodegradable bag, with all its stacked and reinforced components mechanically punched therein, as one unit,
   b) Provide the eight-stacked-and-reinforced-handle eight-stacked-and-reinforced-latch biodegradable bag, with all its stacked and reinforced components, affordably produced,
   c) Provide the eight-stacked-and-reinforced-handle eight-stacked-and-reinforced-latch biodegradable bag, with all its stacked and reinforced components, easily shipped and stored,
   d) Provide the eight-stacked-and-reinforced-handle eight-stacked-and-reinforced-latch biodegradable bag, with all its stacked and reinforced components punched therein, having no separate components to lose, and
   e) Provide the eight-stacked-and-reinforced-handle eight-stacked-and-reinforced-latch biodegradable bag, with all its stacked and reinforced components punched therein, requiring no assembly.

What is claimed is:

1. A bag, for debris or goods, comprising:
a bag top, said bag top comprising:
  bag-top first section,
  bag-top second section,
  bag-top third section, and
  bag-top fourth section;
a bag body, said bag body attached to said bag top;
a bag bottom, said bag bottom comprising:
  a plurality of bag-bottom sections,
  said bag bottom attached to said bag body,
  said bag-bottom sections attached together;
reinforcing means, said reinforcing means attached to said bag top,
  said reinforcing means for reinforcing said bag top;
a first system, said first system comprising:
  at least one first handle,
  at least one first opening, and
  at least one first latching means,
  said at least one first opening punched in said bag-top first section
  to form said at least one first handle next to said at least one first opening, and to form said at least one first latching means inside said at least one first opening, said at least one first latching means for latching said bag top, said at least one first handle for carrying the bag;
a second system, said second system comprising:
  at least one second handle,
  at least one second opening, and
  at least one second latching means,
  said at least one second opening punched in said bag-top second section
  to form said at least one second handle next to said at least one second opening, and to form said at least one second latching means inside said at least one second opening, said at least one second latching means for latching said bag top, said at least one second handle for carrying the bag;
a third system, said third system comprising:
  at least one third handle,
  at least one third opening, and
  at least one third latching means,
  said at least one third opening punched in said bag-top third section
  to form said at least one third handle next to said at least one third opening, and to form said at least one third latching means inside said at least one third opening, said at least one third latching means for latching said bag top, said at least one third handle for carrying the bag; and
a fourth system, said fourth system comprising:
  at least one fourth handle,
  at least one fourth opening, and
  at least one fourth latching means,
  said at least one fourth opening punched in said bag-top fourth section
  to form said at least one fourth handle next to said at least one fourth opening, and to form said at least one fourth latching means inside said at least one fourth opening, said at least one fourth latching means for latching said bag top, said at least one fourth handle for carrying the bag,
wherein
  said bag-top first section,
  said bag-top second section,
  said bag-top third section, and
  said bag-top fourth section
  are for being folded such that at least one of
    said at least one first handle,
    said at least one second handle,
    said at least one third handle,
    said at least one fourth handle,
    said at least one first latching means,
    said at least one second latching means,
    said at least one third latching means, and
    said at least one fourth latching means
  is folded or stacked or both,
wherein
  the bag has a left gravitational center and a right gravitational center,
  said bag-top first section, and
  said bag-top second section,
  are for being folded such that
    said at least one first handle,
    said at least one second handle,
    said at least one first latching means, and
    said at least one second latching means
    lay and stack horizontally generally over said left gravitational center,
  said bag-top third section, and
  said bag-top fourth section
  are for being folded such that
    said at least one third handle,
    said at least one fourth handle,
    said at least one third latching means, and
    said at least one fourth latching means
    lay and stack horizontally generally over said right gravitational center,
wherein
  the bag has an internal volume,
  said bag body stands vertically when the bag is closed
    to prevent wasting said internal volume and
    to maximize said internal volume,
wherein
  said at least one first latching means
  is for being pushed in an upward direction through at least one of
    said at least one first opening,
    said at least one second opening,
    said at least one third opening, and
    said at least one fourth opening,
  said at least one second latching means
  is for being pushed in a downward direction through at least one of
    said at least one first opening,
    said at least one second opening,
    said at least one third opening, and
    said at least one fourth opening,
  said at least one third latching means
  is for being pushed in an upward direction through at least one of
    said at least one first opening,
    said at least one second opening,
    said at least one third opening, and
    said at least one fourth opening,
  said at least one fourth latching means
  is for being pushed in a downward direction through at least one of
    said at least one first opening,
    said at least one second opening,
    said at least one third opening, and
    said at least one fourth opening,
whereby the bag:
  can provide said at least one first handle
    reinforced, stacked, and latched
      horizontally generally over said left gravitational center,
  can provide said at least one second handle
    reinforced, stacked, and latched
      horizontally generally over said left gravitational center,
  can provide said at least one third handle
    reinforced, stacked, and latched
      horizontally generally over said right gravitational center, and
  can provide said at least one fourth handle
    reinforced, stacked, and latched
      horizontally generally over said right gravitational center,
  can provide said at least one first latching means
    reinforced, stacked, and latched
      horizontally generally over said left gravitational center,
  can provide said at least one second latching means
    reinforced, stacked, and latched
      horizontally generally over said left gravitational center,
  can provide said at least one third latching means
    reinforced, stacked, and latched
      horizontally generally over said right gravitational center, and
  can provide said at least one fourth latching means
    reinforced, stacked, and latched
      horizontally generally over said right gravitational center,
  can provide said at least one first opening
    reinforced, stacked, and latched
      horizontally generally over said left gravitational center,
  can provide said at least one second opening
    reinforced, stacked, and latched
      horizontally generally over said left gravitational center,
  can provide said at least one third opening
    reinforced, stacked, and latched
      horizontally generally over said right gravitational center, and
  can provide said at least one fourth opening
    reinforced, stacked, and latched
      horizontally generally over said right gravitational center,
  can provide secure latching of said bag top with
    said at least one first latching means
      horizontally generally over said left gravitational center,
    said at least one second latching means
      horizontally generally over said left gravitational center,
    said at least one third latching means
      horizontally generally over said right gravitational center, and
    said at least one fourth latching means
      horizontally generally over said right gravitational center,
  can provide secure sealing of the bag with
    said at least one first latching means
      horizontally generally over said left gravitational center,
    said at least one second latching means
      horizontally generally over said left gravitational center,
    said at least one third latching means
      horizontally generally over said right gravitational center, and
    said at least one fourth latching means
      horizontally generally over said right gravitational center,
  can provide efficient pickup and transport of the bag with
    said at least one first handle
      horizontally generally over said left gravitational center,
    said at least one second handle
      horizontally generally over said left gravitational center,
    said at least one third handle
      horizontally generally over said right gravitational center, and
    said at least one fourth handle
      horizontally generally over said right gravitational center, and
  can provide the bag as one unit with
    said at least one first handle punched therein
      horizontally generally over said left gravitational center,
    said at least one second handle punched therein
      horizontally generally over said left gravitational center,
    said at least one third handle punched therein
      horizontally generally over said right gravitational center,
    said at least one fourth handle punched therein
      horizontally generally over said right gravitational center,
    said at least one first latching means punched therein
      horizontally generally over said left gravitational center,
    said at least one second latching means punched therein
      horizontally generally over said left gravitational center,
    said at least one third latching means punched therein
      horizontally generally over said right gravitational center, and
    said at least one fourth latching means punched therein
      horizontally generally over said right gravitational center.

2. The bag of claim 1, wherein,
said at least one first handle,
said at least one second handle,
said at least one third handle,
said at least one fourth handle,
at least one first opening,
at least one second opening,
at least one third opening,
at least one fourth opening,
at least one first latching means,
at least one second latching means,
at least one third latching means, and
at least one fourth latching means,
  are horizontally stacked or hidden inside the bag, respectively.

3. The bag of claim 1, wherein, said bag-top third section or said bag-top fourth section is longer than said bag-top first section or said bag-top second section.

4. The bag of claim 1, wherein, each of said at least one first latching means, said at least one second latching means, said at least one third latching means, and said at least one fourth latching means has a shape selected from the group consisting of:
   a square shape,
   a rectangular shape,
   an oval shape,
   a round shape,
   a hexagonal shape,
   a trapezoidal shape,
   a geometrical shape,
   a man-made shape, and
   a nature-made shape.

5. The bag of claim 1, wherein, each of said at least one first opening, said at least one second opening, said at least one third opening, and said at least one fourth opening has a shape selected from the group consisting of
   a square shape,
   a rectangular shape,
   an oval shape,
   a round shape,
   a hexagonal shape,
   a trapezoidal shape,
   a geometrical shape,
   a man-made shape, and
   a nature-made shape.

6. The bag of claim 1, wherein, said reinforcing means comprises at least one element selected from the group consisting of:
   paper,
   card,
   cardboard,
   corrugated material, and
   sheet of material.

7. The bag of claim 1, further,
   at least one of said bag top, said bag body, and said bag bottom comprising at least one resilient or reinforcing strip of material attached thereto for reinforcing at least one of said bag top, said bag body, and said bag bottom.

* * * * *